United States Patent [19]
Grigorescu et al.

[11] Patent Number: 6,016,014
[45] Date of Patent: Jan. 18, 2000

[54] VERTICAL AXIS WIND ENERGY CONVERSION DEVICE HAVING PANELS GUIDED BY CARDIOID RAILS

[76] Inventors: Virgil Grigorescu; Anca Grigorescu, both of 555 The West Mall #207, Etobicoke, Ontario, Canada, M9C 1G8

[21] Appl. No.: 08/699,444

[22] Filed: Aug. 19, 1996

[51] Int. Cl.[7] .................................................. F03D 9/00
[52] U.S. Cl. ............................................ 290/55; 290/44
[58] Field of Search ..................... 290/44, 55; 415/4.1, 415/164, 235, 60

[56] References Cited

U.S. PATENT DOCUMENTS

| | | | |
|---|---|---|---|
| 4,156,580 | 5/1979 | Pohl | 415/2 |
| 4,303,835 | 12/1981 | Bair | 290/55 |
| 4,350,898 | 9/1982 | Benoit | 290/55 |
| 4,419,587 | 12/1983 | Benton | 290/44 |
| 4,575,639 | 3/1986 | Rogow et al. | 290/55 |
| 4,792,700 | 12/1988 | Ammons | 290/55 |
| 5,332,925 | 7/1994 | Thomas | 290/44 |
| 5,463,257 | 10/1995 | Yea | 290/55 |

*Primary Examiner*—Steven L. Stephan
*Assistant Examiner*—Elvin G. Enad

[57] ABSTRACT

A wind energy conversion system which converts wind energy into electrical energy using the cardioid principle. The system includes a mobile surface reacting to wind power and constrained to move by rail guide supports having a shape of a cardioid. The system is coupled to an electric generator via belts to the shaft to transmit and convert the cardioid movement of the mobile surface moving on the rail support unto useful electrical energy.

10 Claims, 65 Drawing Sheets

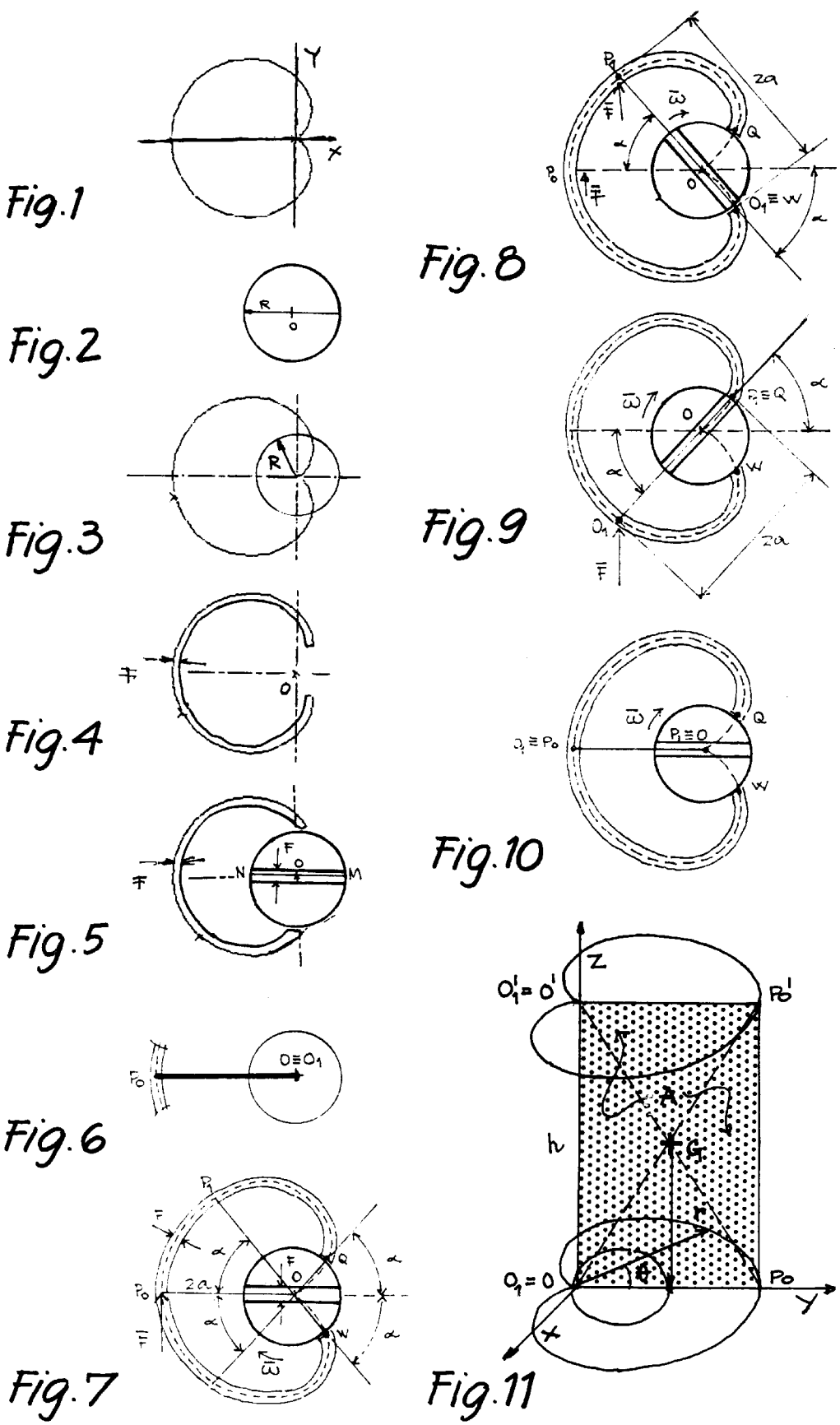

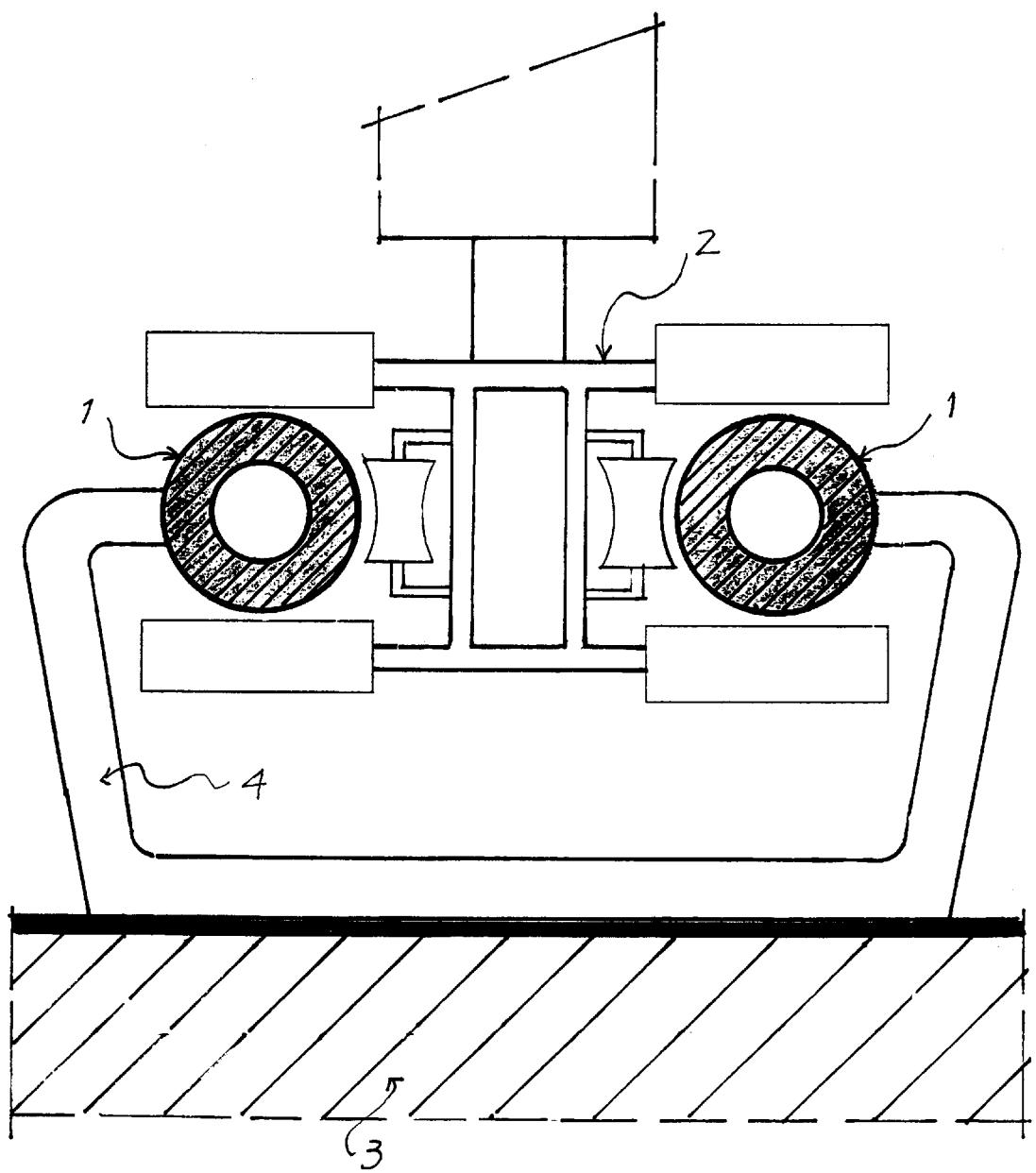
Fig. 21a    Section A

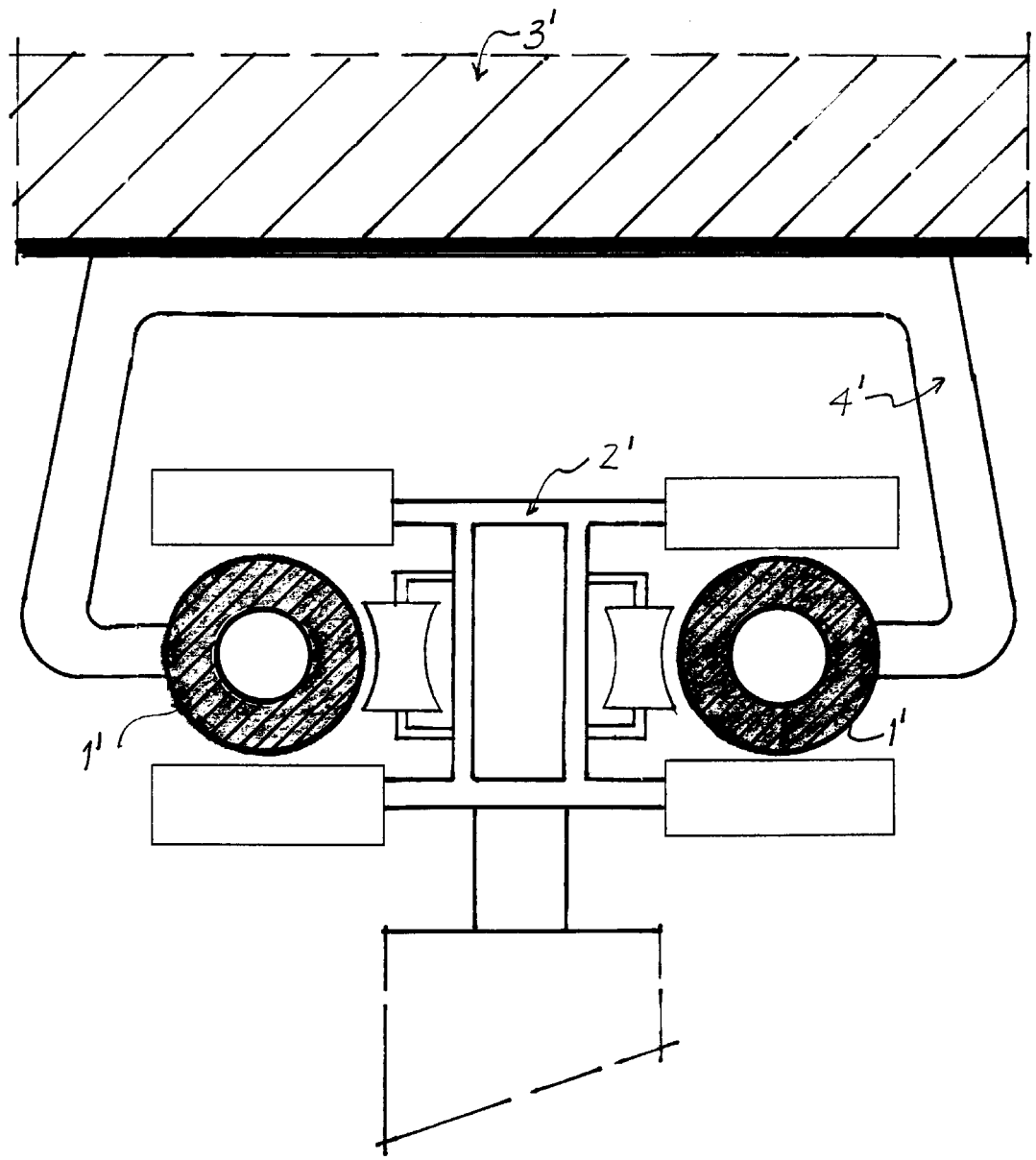
Fig. 21a'  Section A'

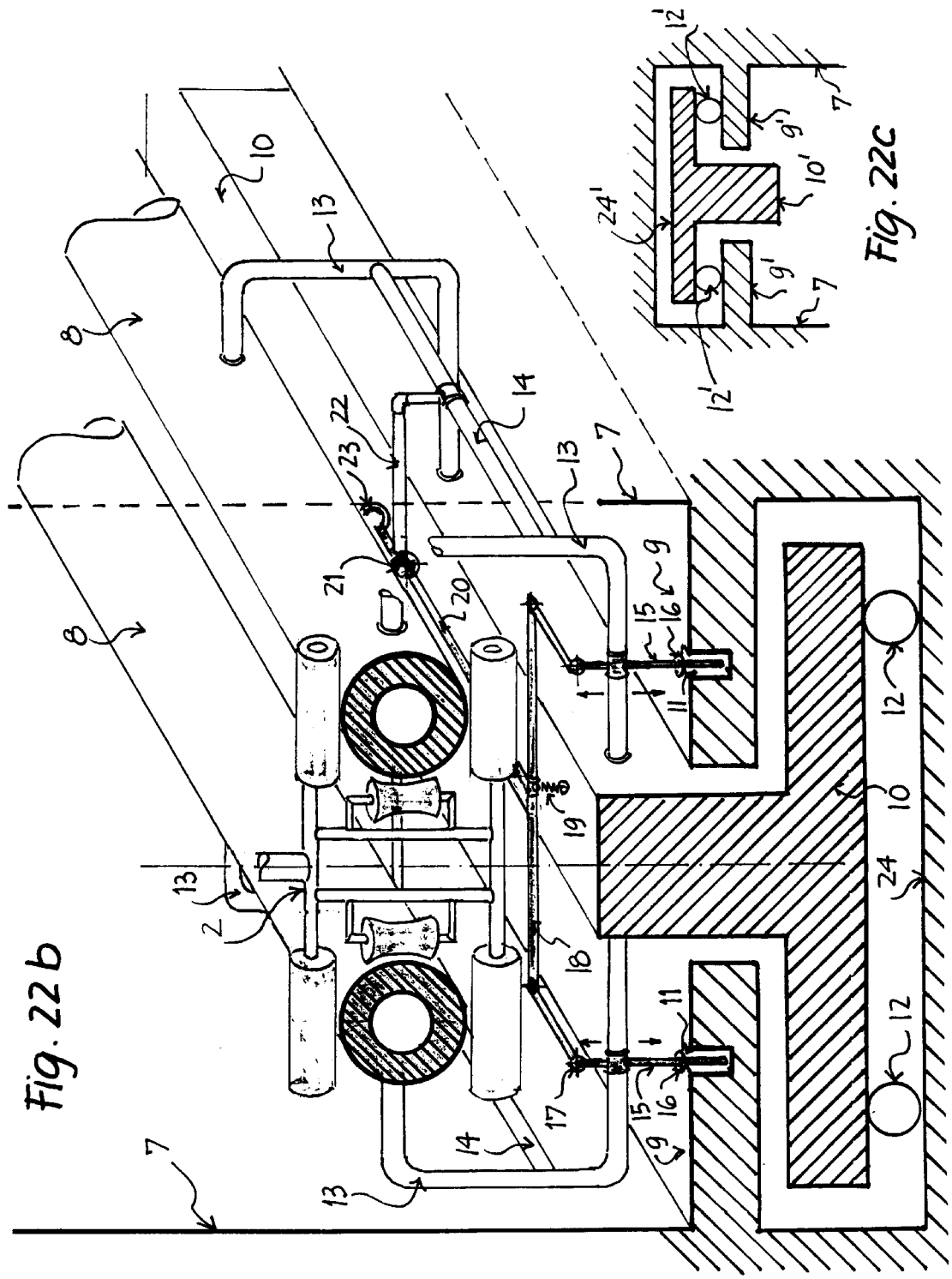

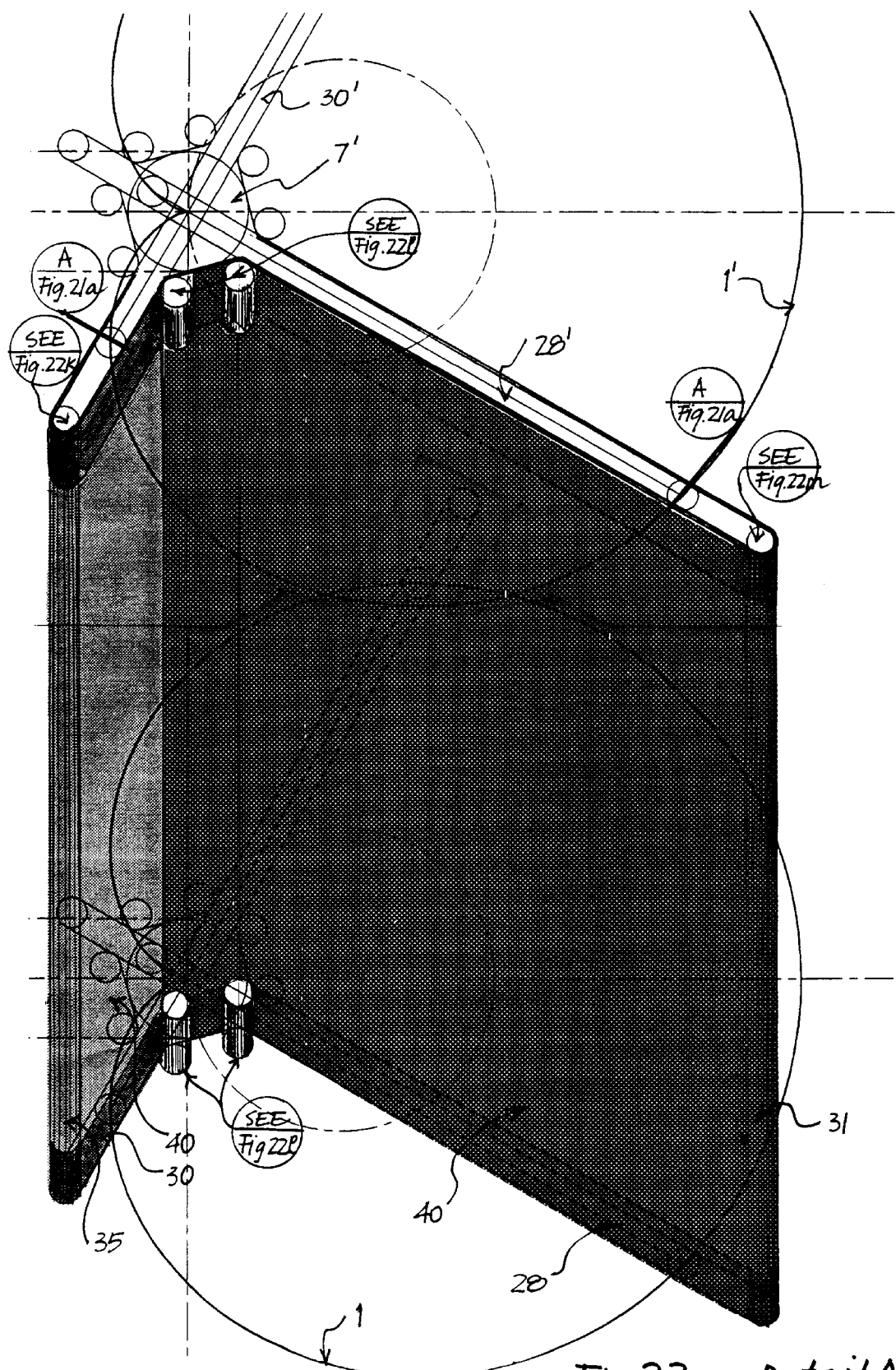
Fig. 22n - Detail A

VERTICAL AXIS WIND ENERGY CONVERSION DEVICE HAVING PANELS GUIDED BY CARDIOID RAILS

BACKGROUND OF THE INVENTION

This invention is in the field of windmills. It uses a new approach to convert wind energy into electricity. For operating this windmill, the invention consists of a system based on a geometric property of the cardioid, from the epicycloides family, which is applied to mobile vertical surfaces, constrained to move by two parallel cardioids rail guides coupled shaft via sliding mechanism to the generator.

Extensive research was not carried out empirically by testing or experiment. The conclusion and performance are extracted from mathematical models, theoretical analysis and physical interpretation. The Cardioid Principle as shown in this patent application, could be used in many fields with multiple applications.

DESCRIPTION OF THE PRIOR ART

In our extensive Patent search, it was unable to find another system such as this, which uses the cardioid's property, and therefore, there are no other technical applications at this time. The unique combination of elements of this invention combined with the geometrical properties of the railing system, constitutes a novel approach in the field of harnessing the wind energy.

SUMMARY OF THE INVENTION

As described above, it is the objective of this invention to provide a mobile vertical surface that travels along a cardioid path and transfers the forces via a sliding mechanism to a shaft. With respect to this motion principle and the wind energy, this invention constitutes an energy conversion device. The system is able to capture substantially more energy from the wind then it would be possible by using other systems of similar same size.

Some of the benefits of this invention are:

High efficiency (when the sails rotate 180 degrees, the shaft turns 360 degrees).

High output to size ratio that enhances commercial feasibility.

Low environmentally disturbing factors such as noise.

Compact and safe device due to the low speeds involved.

BRIEF DESCRIPTION OF THE DRAWINGS

The present invention can be better understood in reference with the following detailed drawings.

FIG. 1 is a graphic representation on the plane XOY of the cardioid's equation in polar coordinates.

FIG. 2 is a graphic representation of the shaft with the radius R.

FIG. 3 is a view of the shaft which has the same center with the cardioid.

FIG. 4 is a view of the rail guide by the cardioid shape.

FIG. 5 is a section view through the opening shaft.

FIG. 6 is a view of the arm which has one head on the rail guide and the other head on the center of the cardioid.

FIG. 7 is a representation of the shafts motion (phase 1).

FIG. 8 is a representation of the shafts motion (phase 2).

FIG. 9 is a representation of the shafts motion (phase 3).

FIG. 10 is a representation of the shafts motion (phase 4).

FIG. 11 is a 3D representation of the surface between the inferior and the superior arms.

FIG. 21' is the plane of the superior rail guide with the structural support.

FIG. 21a is a vertical section A through the inferior rail guide.

FIG. 21a' is a vertical section A' through the superior rail guide.

FIG. 22b is a 3D detail in the opening of the shaft in phase 1.

FIG. 22c is a specific section of the superior carriage truck.

FIG. 22n is an ensemble view of the system double two sails Crosswise (C2).

DETAILED DESCRIPTION AND SPECIFICATION OF THE INVENTION

Figure 12:
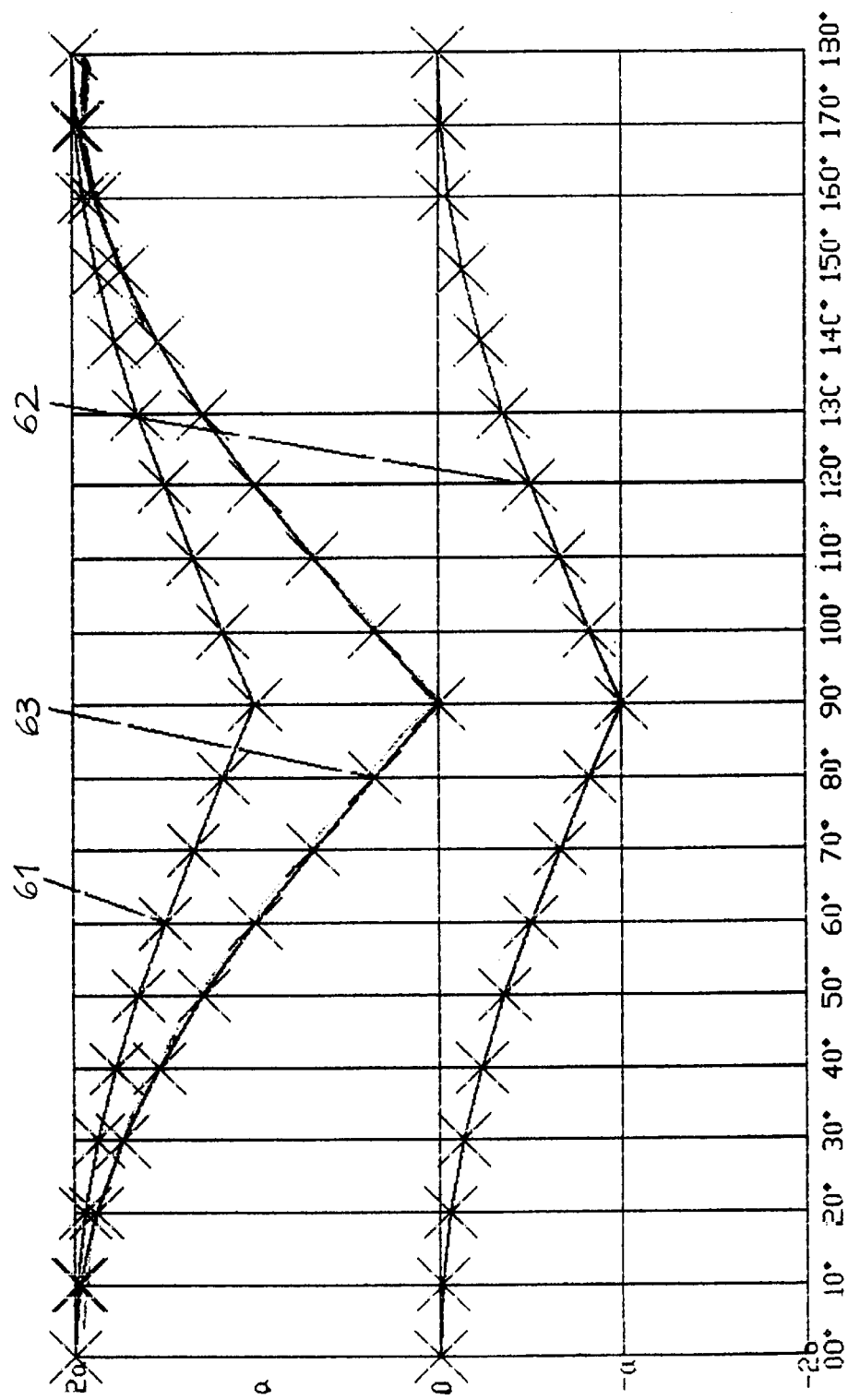
FIG. 12 is the graphic of the resultant radius variation adding active and reactive momentum.
Figure 13:
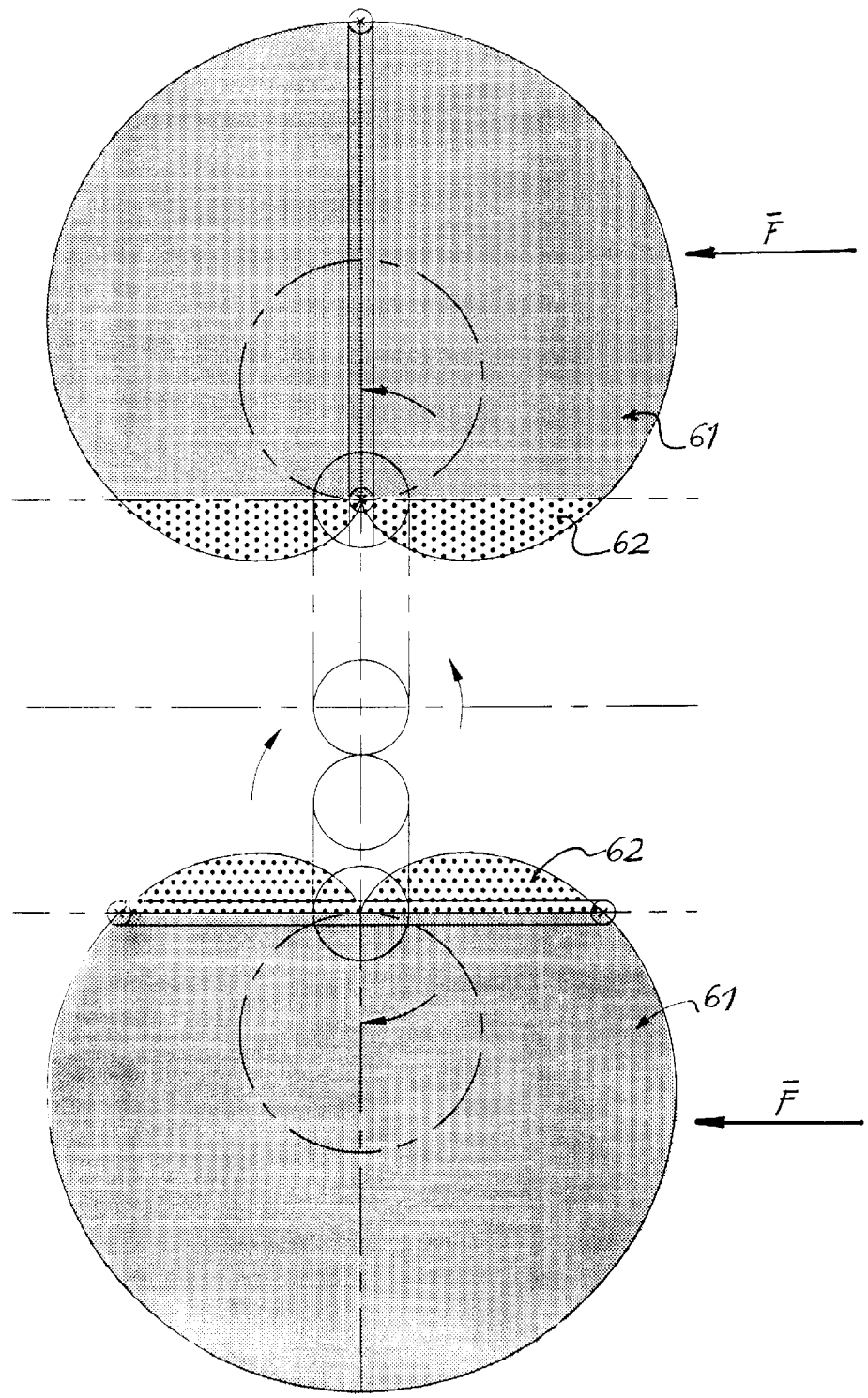
FIG. 13 is a view of the two complementary cardioids with the active and the reactive zones.

It is the objective of this invention to apply the Cardioid's Principle using the cardioid property which states that the length of any connecting two points on the cardioid passing through its center is a constant. The application, thereotical and construction details of this principle will now be illustrated in wind energy conversion systems.

The Cardioid equation in polar cordinates is as follows:

$$r = a(1 - \cos \theta) \tag{1}$$

where r is the radius of the cardioid extended in an angle $\theta$. FIGS. 1 through 7 show the cardioid radius r, and angle $\theta$ with values provided. The wind energy conversion system of the present invention is primarily comprised of a fixed rail mounted on a rail guide, a moving shaft whose path runs in a cardioid motion on a vertical axis. The radius, R of the shaft is determined based from the calculation of the radius of the cardioid. With the radius of the shaft R in the center of the cardioid, a circle is constructed forming the rail guide having an axis coinciding with the shaft and center of the cardioid.

The wind energy conversion system has the following critical points:

1. When $OP_0 = 2a; \theta = \pi \rightarrow r_{max} = 2a$; O being the center point and $P_0$ a line drawn from the center point O to a point P on the cardioid rail, the vertical axis of the shaft coincides with the center of the cardioid O.

2. When a force F is applied to point $P_0$. The force F will create a rotational moment with angular speed $\omega$. As illustrated in FIG. 8, force F causes the shaft to rotate from point $P_0$ to $P_1$. At the same time, the shaft moves linearly from point O to point $O_1$ and subsequently coincide with point W where W is a common point for the shaft and the cardioid.

3. When point $P_1 = Q$ is tangent between the cardioid and shaft. Point $O_1$ will be where wind force is applied with an angular speed $\omega$ and will be constrained by the shape of the cardioid rail guide to follow its own path around the cardioid as it revolves. As seen in FIG. 9, point $O_1$ is symmetric with point $P_1$.

A 3-D graphic representation of rotation of the system in XYZ axis is shown in FIG. 11. In the XOY plane there is an inferior cardioid with the center in origin O. At the height Z=h, parallel with the inferior cardioid is a superior cardioid with center O'. These two cardioids represent the rail guides which steer the inferior plane and superior plane of the cardioids in which $OP_0$ is the inferior arm and $O'P'_0$ is the superior arm. The head of the inferior arm O and head of superior arm O' slides with linearity in the free space of the interior shaft and superior shaft respectively. Between the two arms, $OP_0$ and $O'P'_0$ a surface A is created having the feature A=2ah. In addition, parameters including the center of gravity of surface A, momentum, active and reactive zones of the cardioid are determined since they are necessary for the construction of the rail guides for achieving optimum performance.

First Embodiment

Figure 14A:
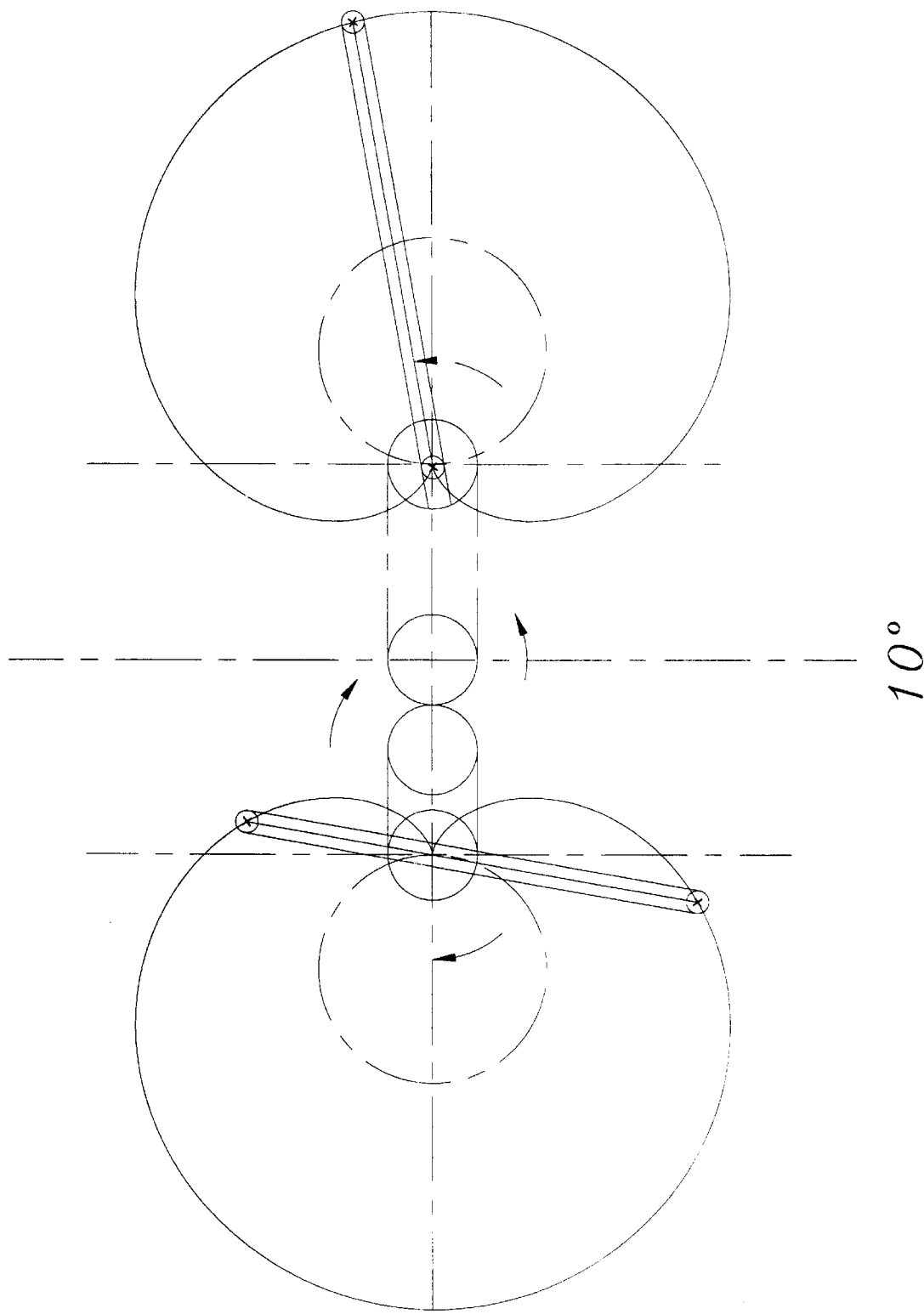
FIG. 14a is a representation of the projection on plane of the two sails by an angle 10 degrees.
Figure 14B:
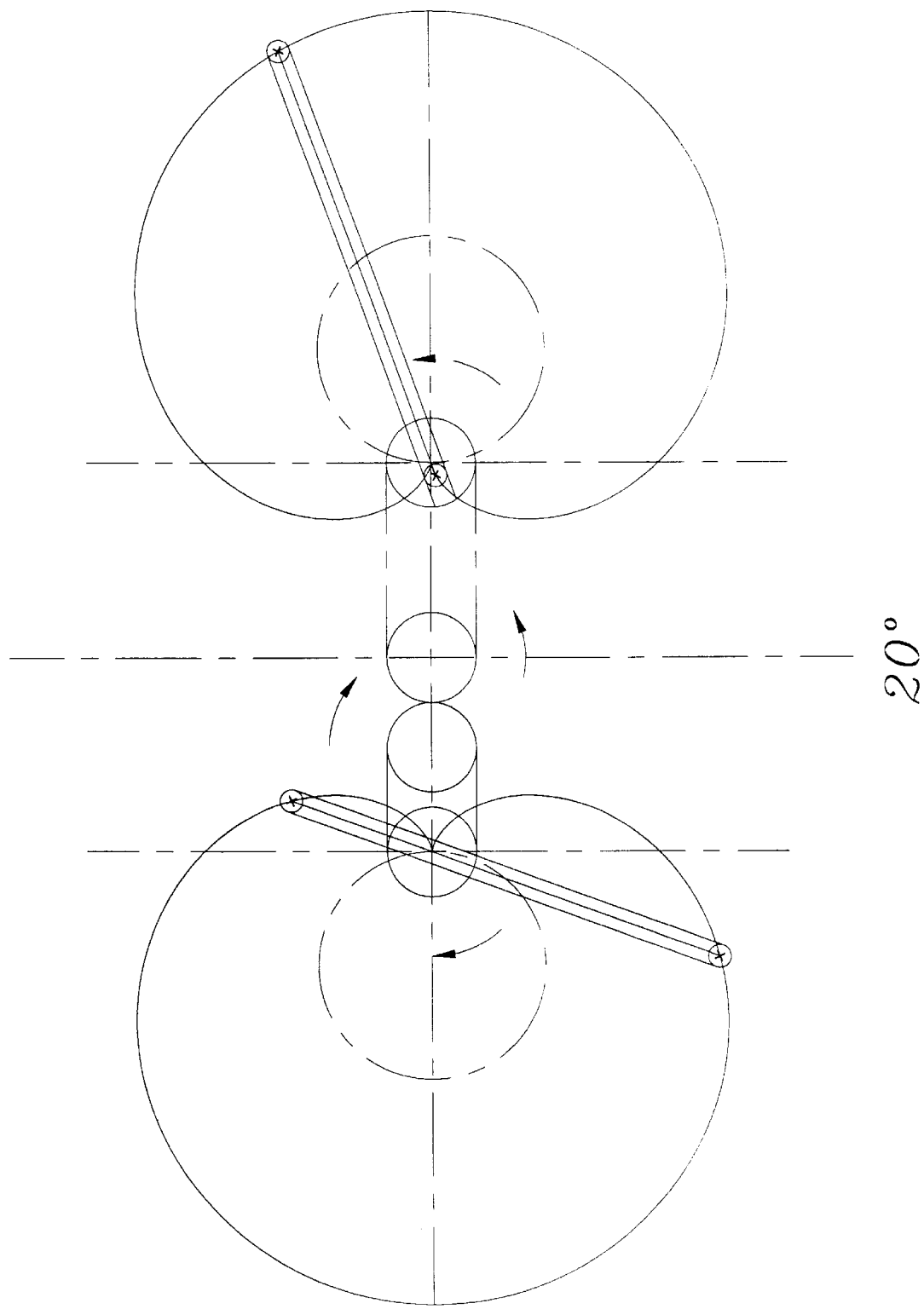
FIG. 14b is a representation of the projection on plane of the two sails by an angle 20 degrees.
Figure 14C:
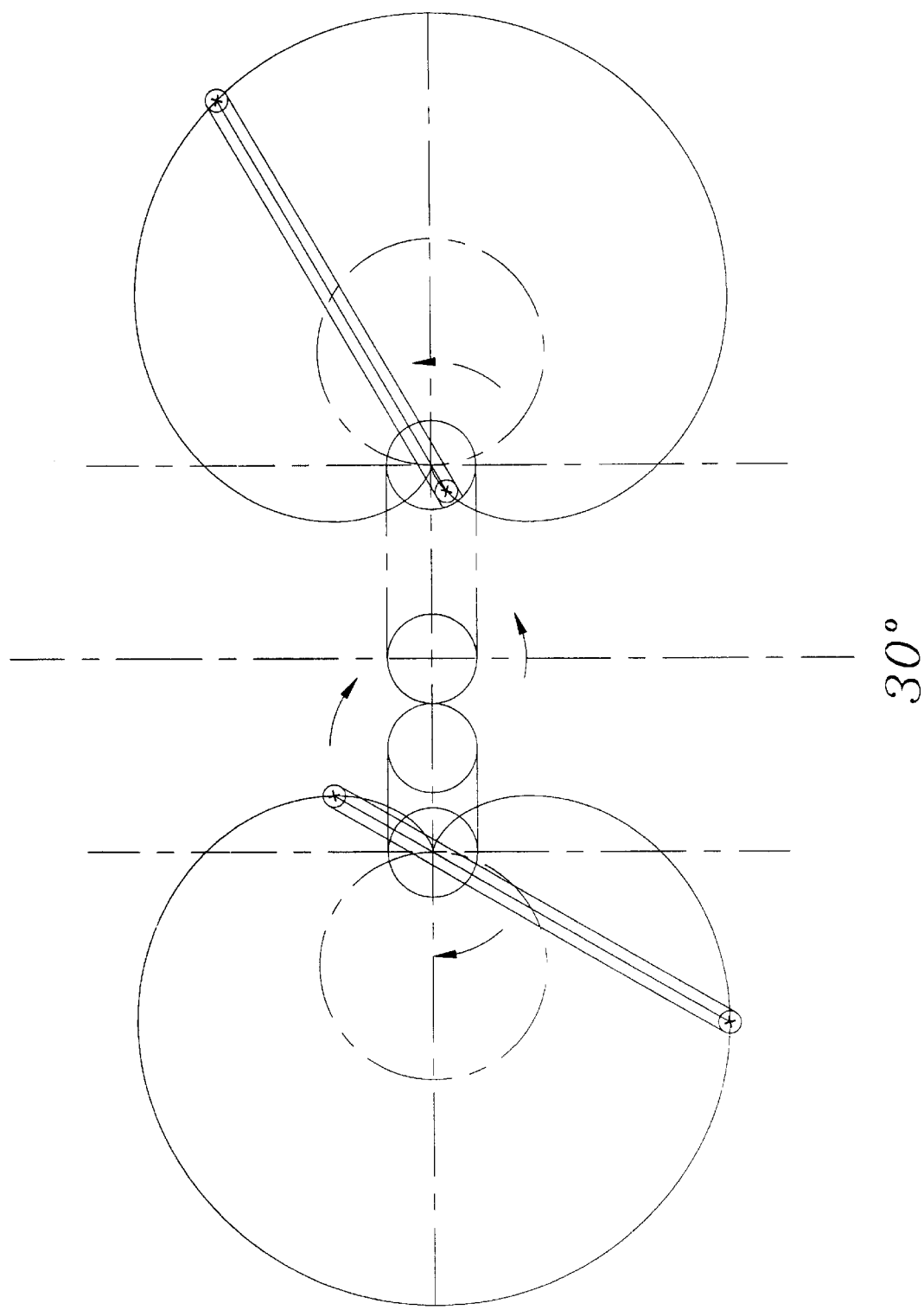
FIG. 14c is a representation of the projection on plane of the two sails by an angle 30 degrees.
Figure 14D:
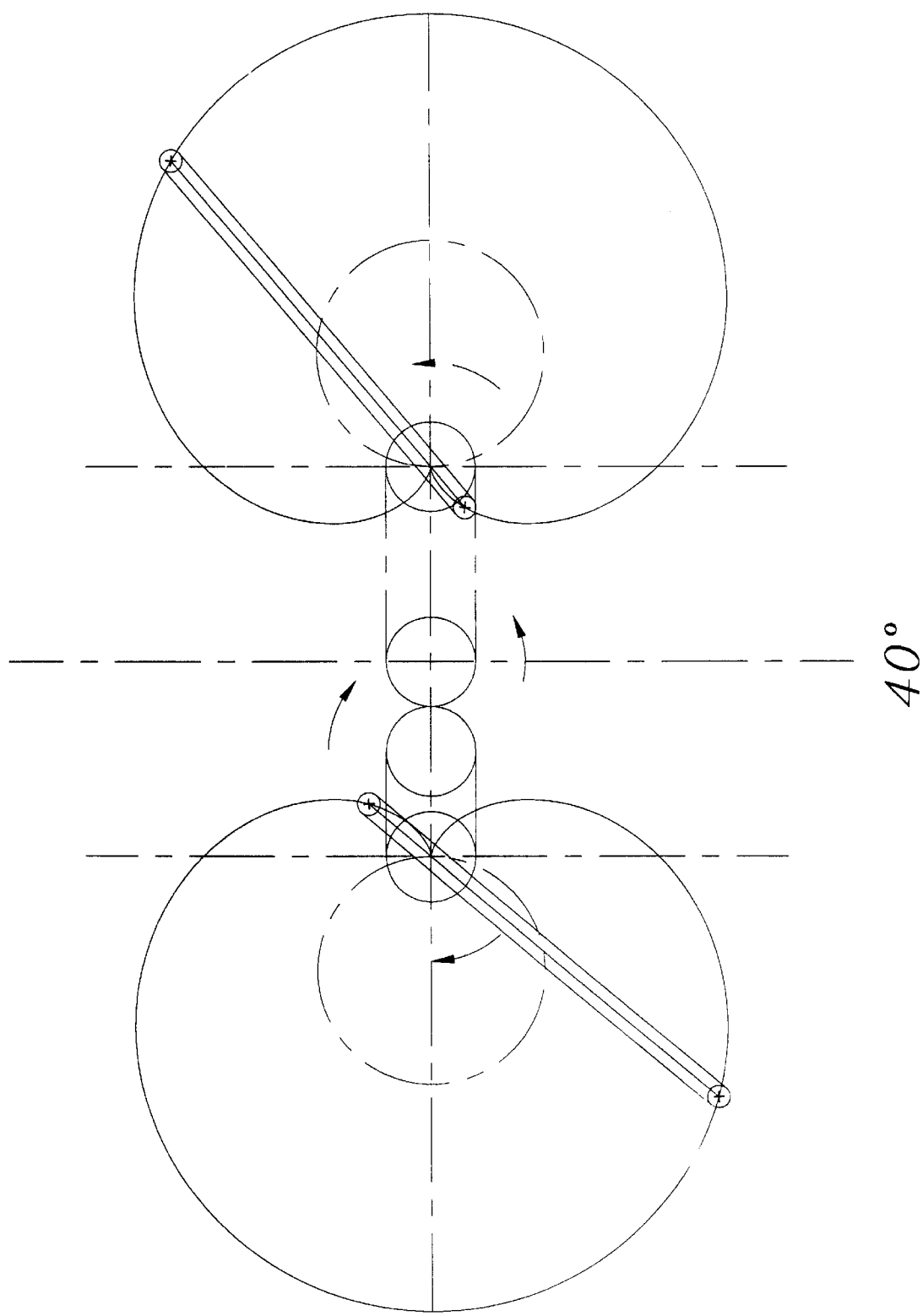
FIG. 14d is a representation of the projection on plane of the two sails by an angle 40 degrees.
Figure 14E:
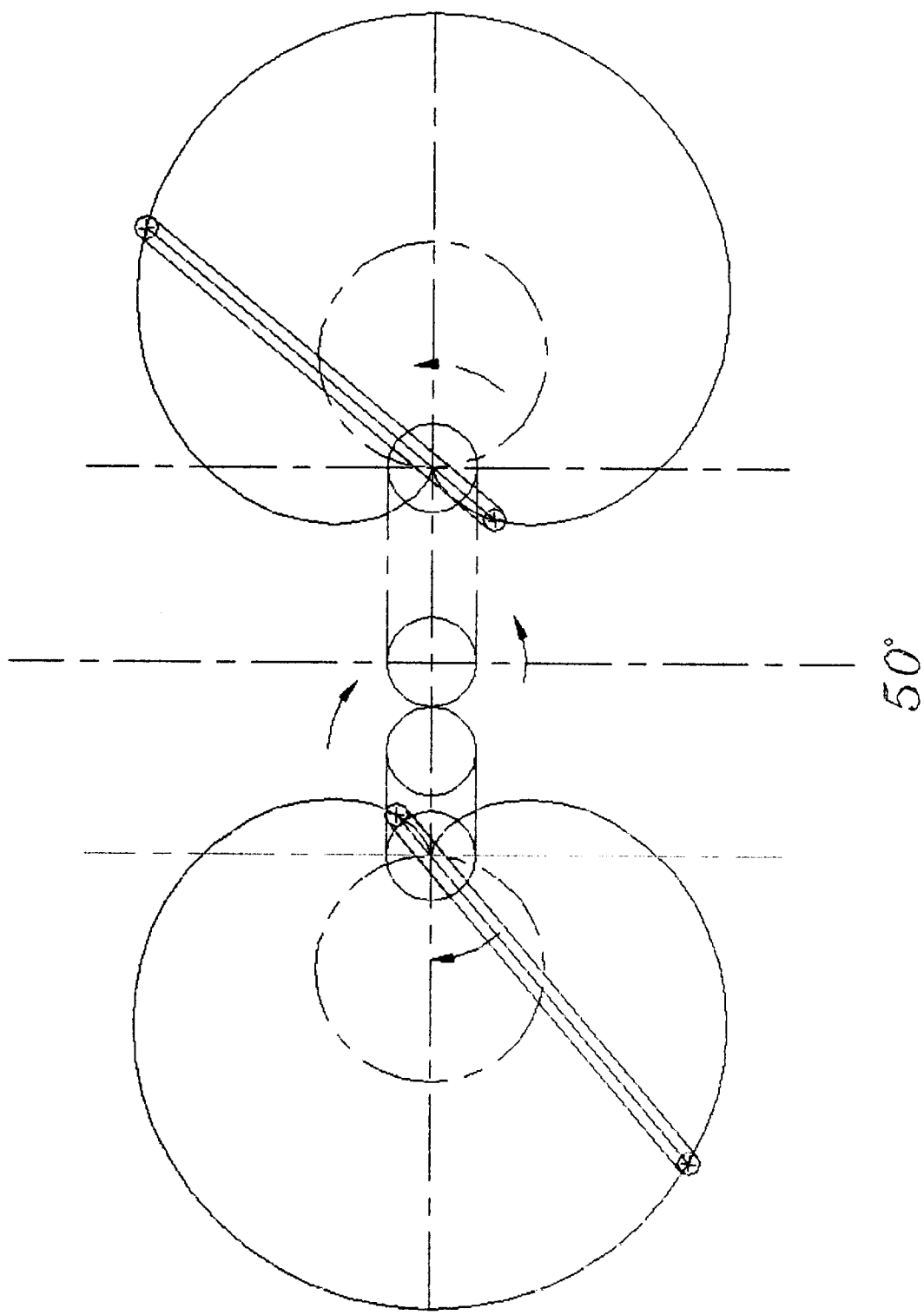
FIG. 14e is a representation of the projection on plane of the two sails by an angle 50 degrees.
Figure 14F:
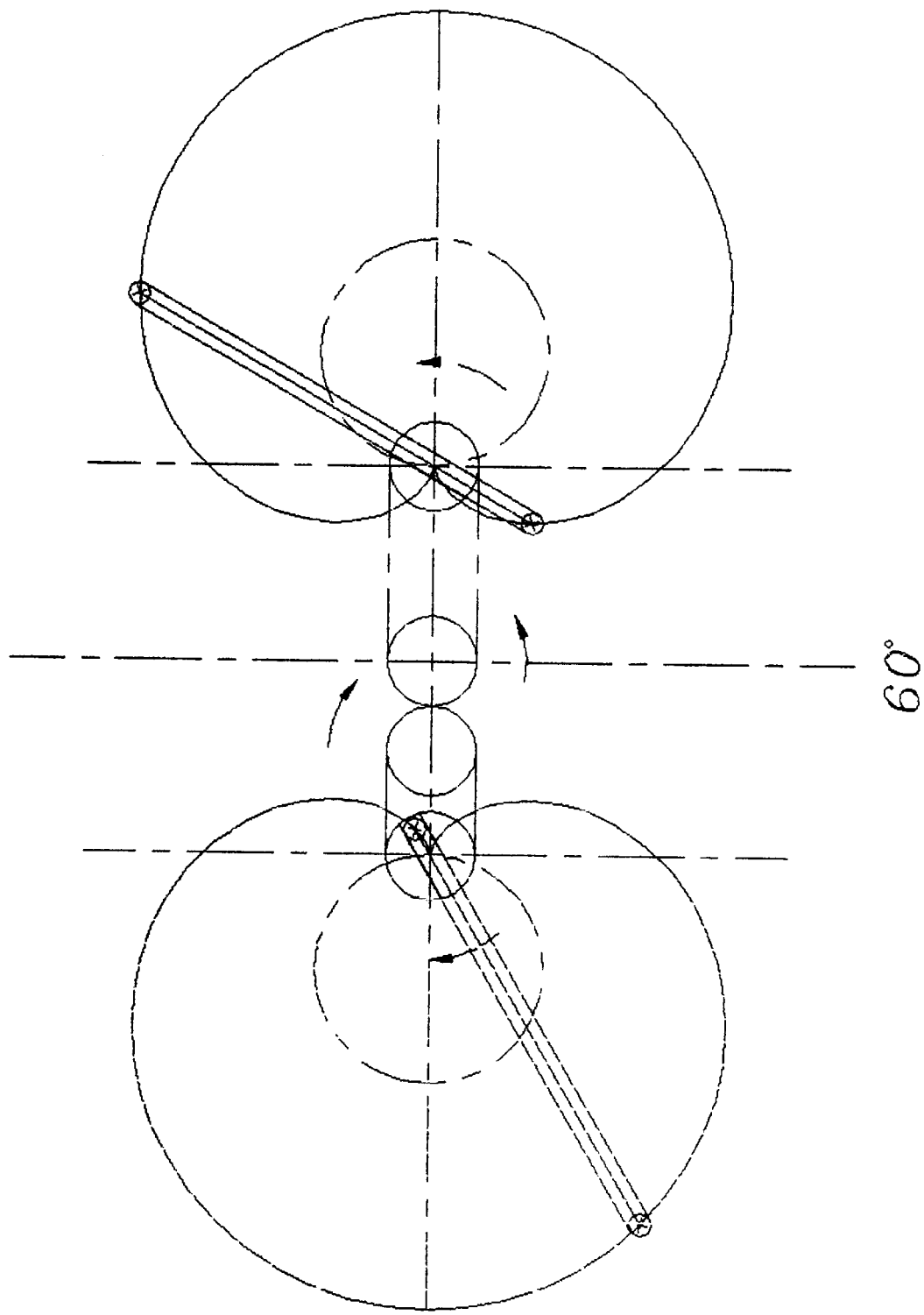
FIG. 14f is a representation of the projection on plane of the two sails by an angle 60 degrees.
Figure 14G:
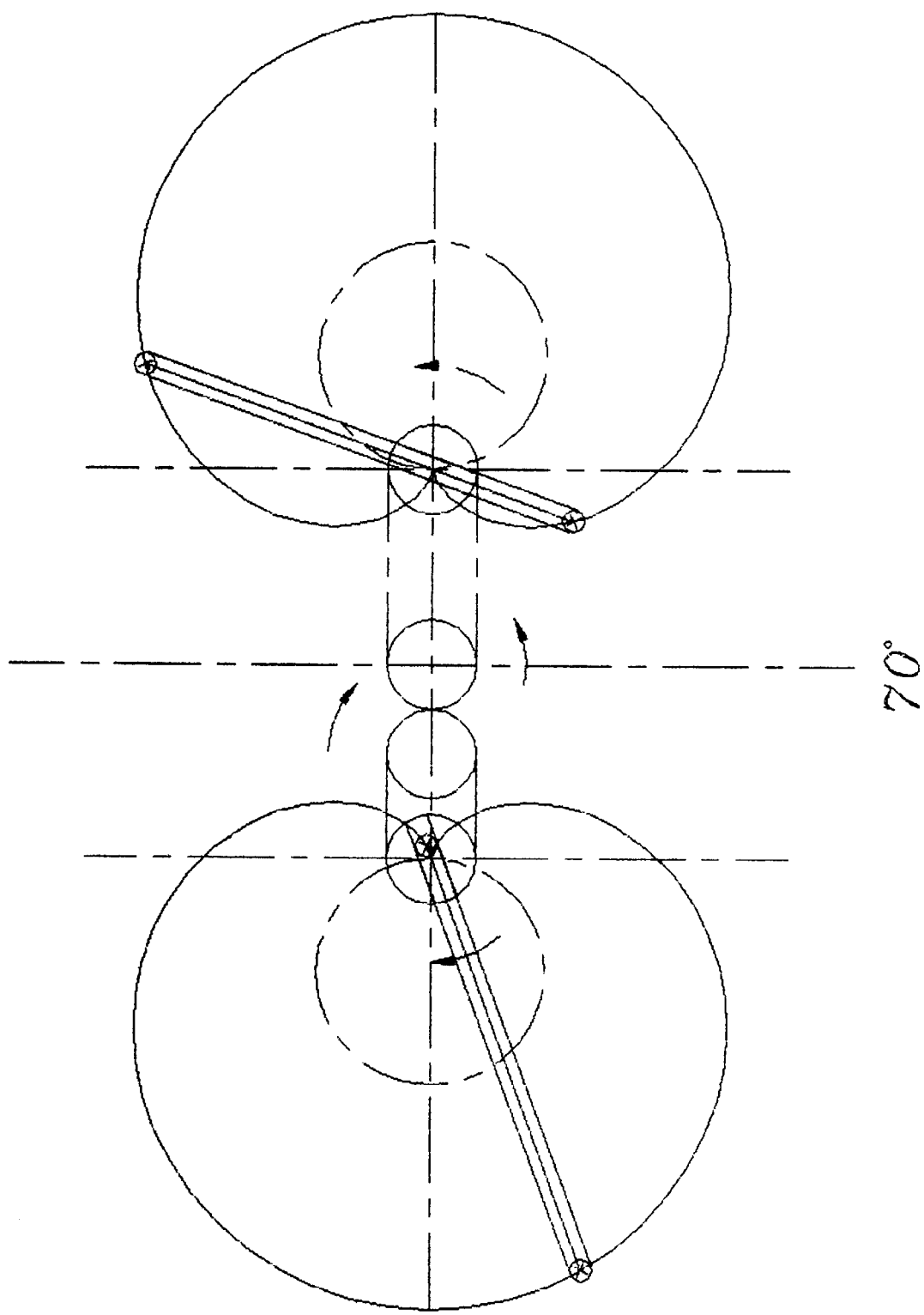
FIG. 14g is a representation of the projection on plane of the two sails by an angle 70 degrees.
Figure 14H:
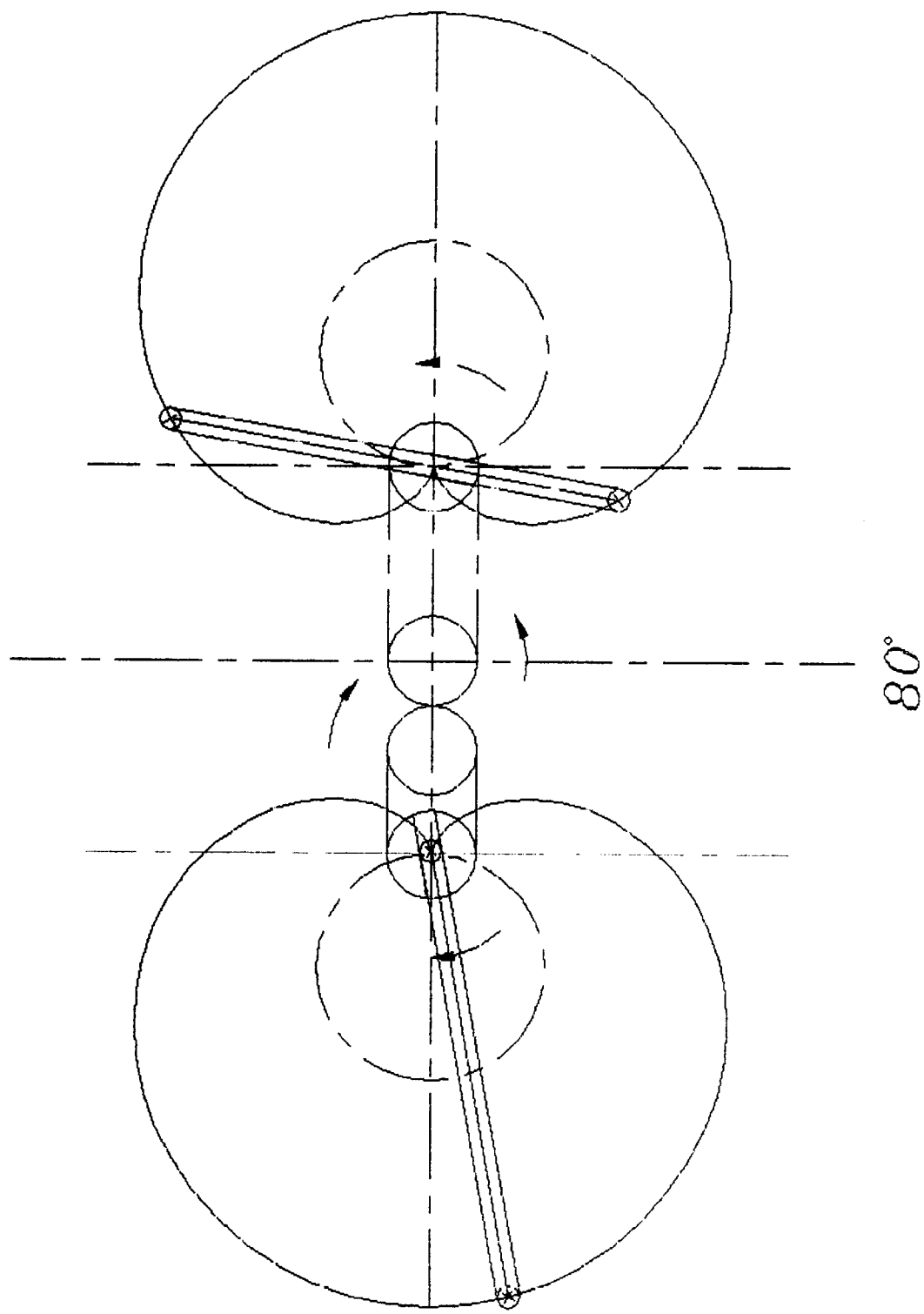
FIG. 14h is a representation of the projection on plane of the two sails by an angle 80 degrees.
Figure 14:
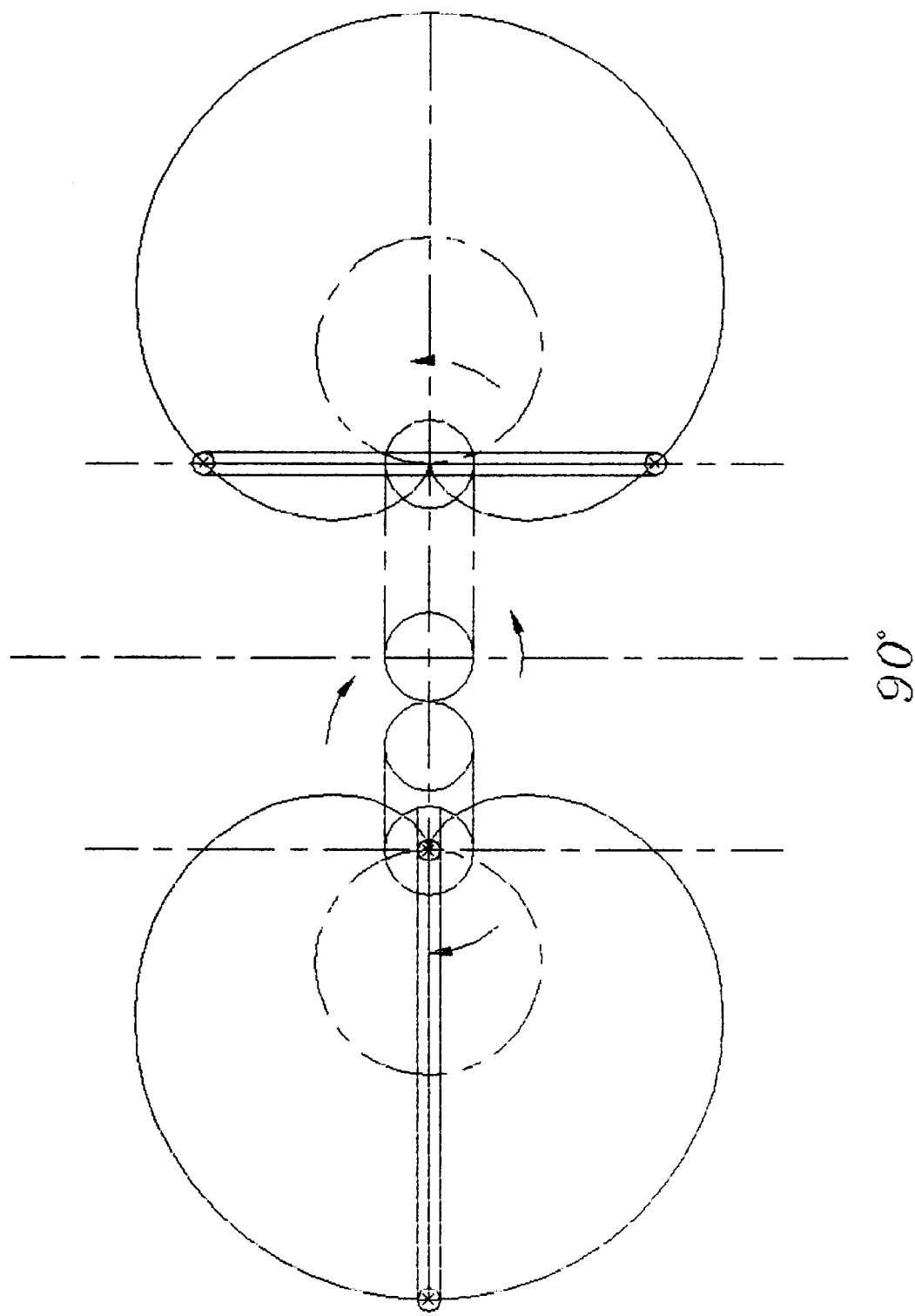
FIG. 14i is a representation of the projection on plane of the two sails by an angle 90 degrees.
FIG. 14j is a representation of the projection on plane of the two sails by an angle 100 degrees.
FIG. 14k is a representation of the projection on plane of the two sails by an angle 110 degrees.
FIG. 14l is a representation of the projection on plane of the two sails by an angle 120 degrees.
FIG. 14m is a representation of the projection on plane of the two sails by an angle 130 degrees.
FIG. 14n is a representation of the projection on plane of the two sails by an angle 140 degrees.
FIG. 14o is a representation of the projection on plane of the two sails by an angle 150 degrees.
FIG. 14p is a representation of the projection on plane of the two sails by an angle 160 degrees.
FIG. 14q is a representation of the projection on plane of the two sails by an angle 170 degrees.
FIG. 14r is a representation of the projection on plane of the two sails by an angle 180 degrees.
Figure 14J:
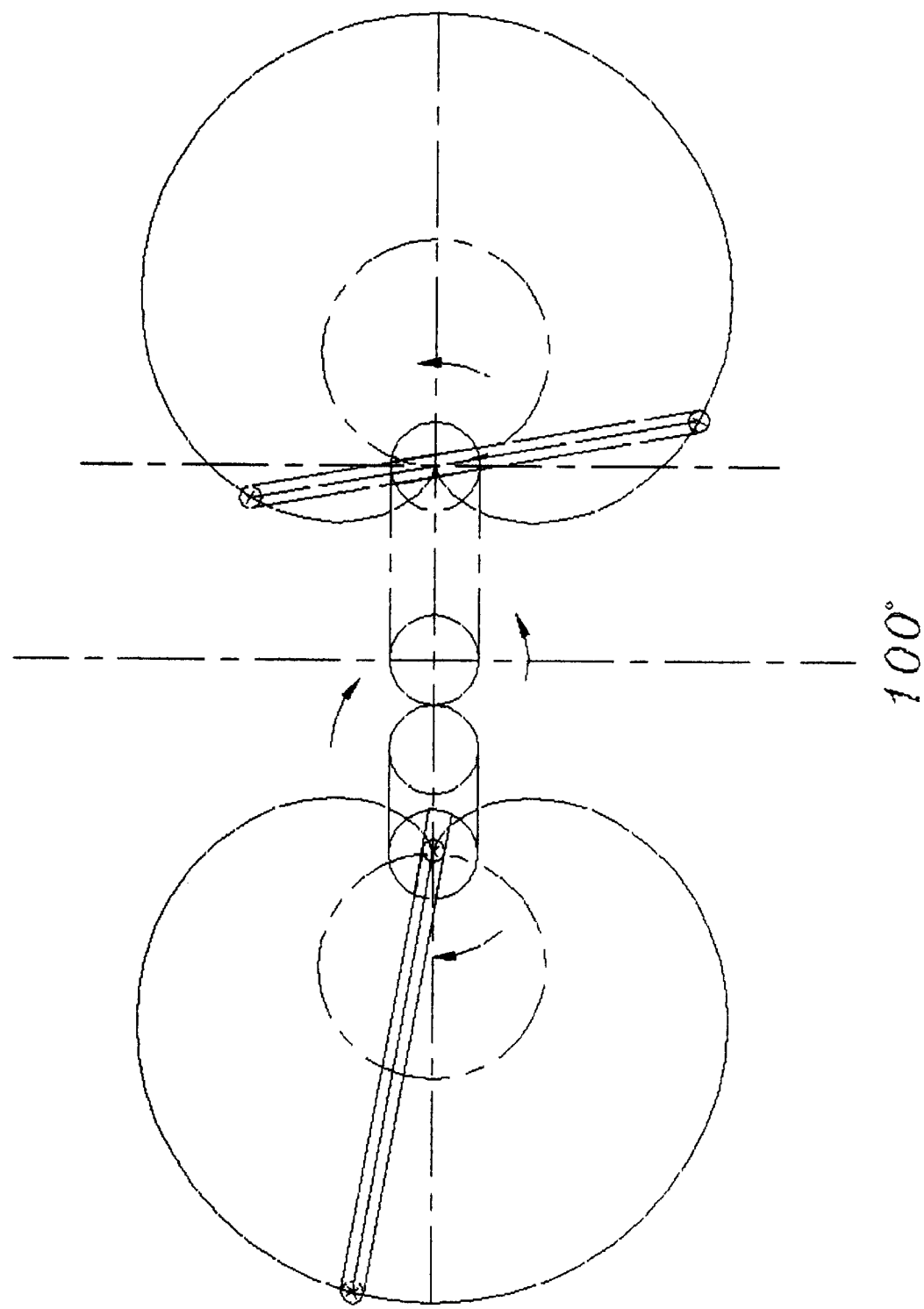
Figure 14K:
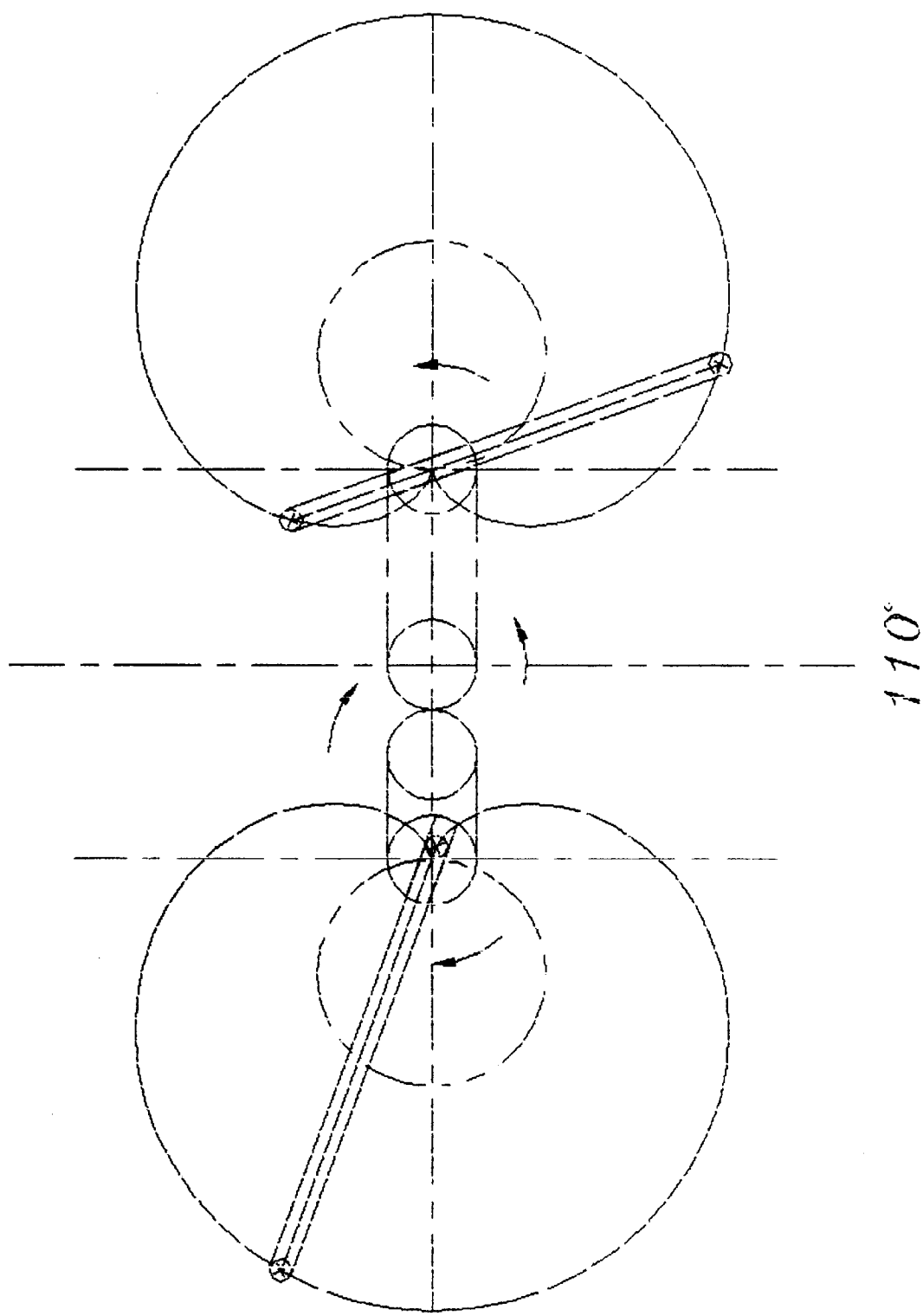
Figure 14L:
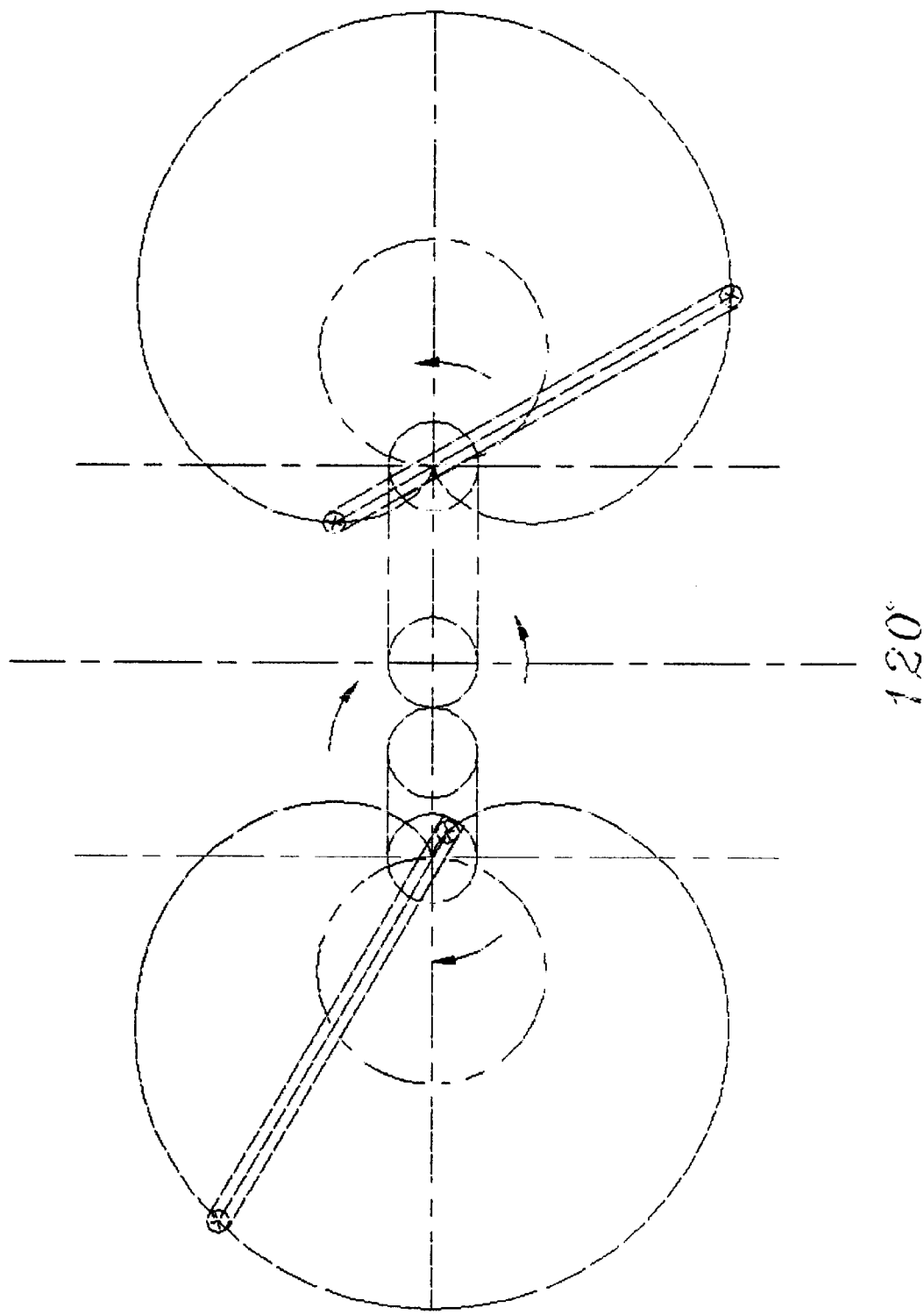
Figure 14M:
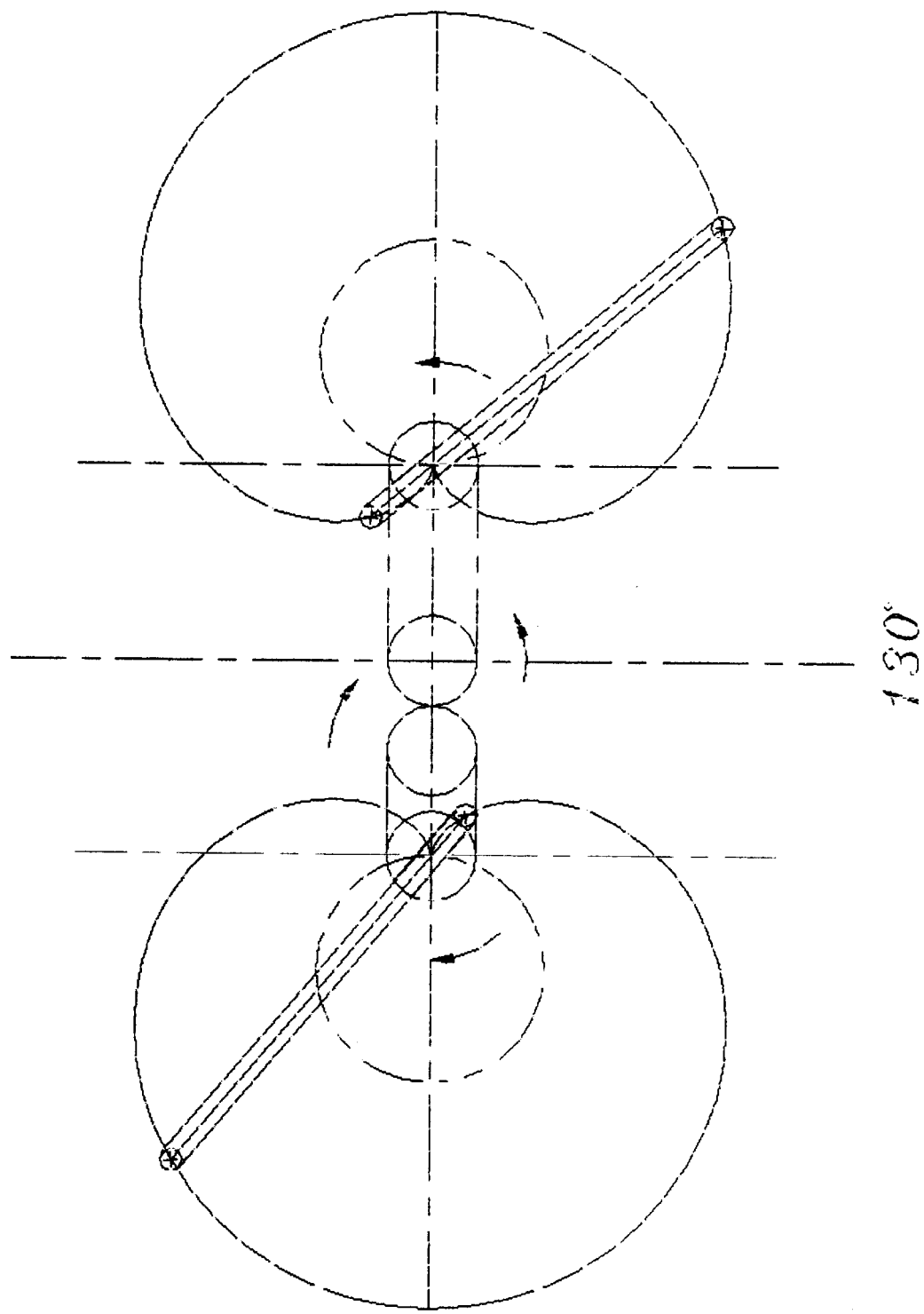
Figure 14:
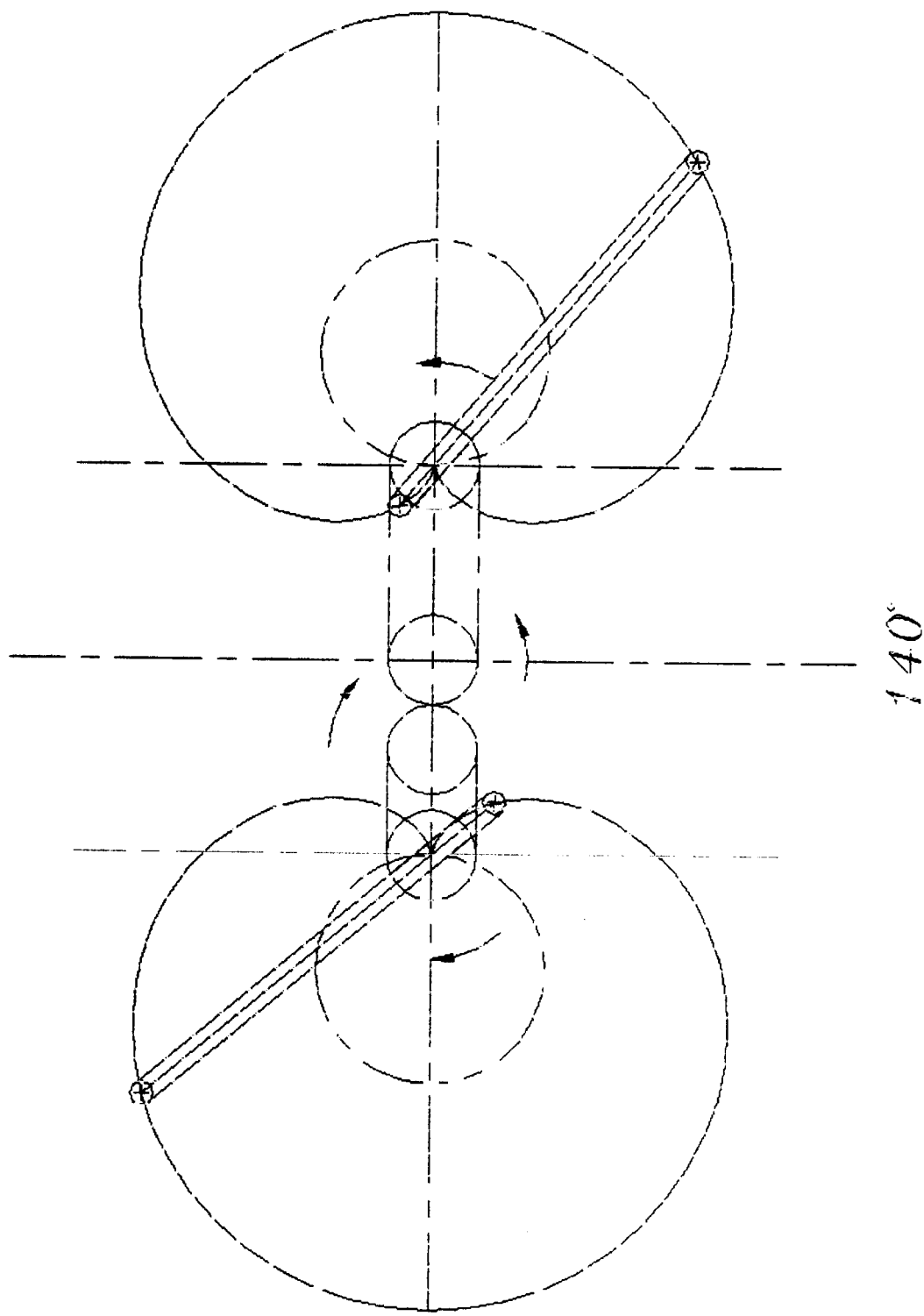
Figure 14O:
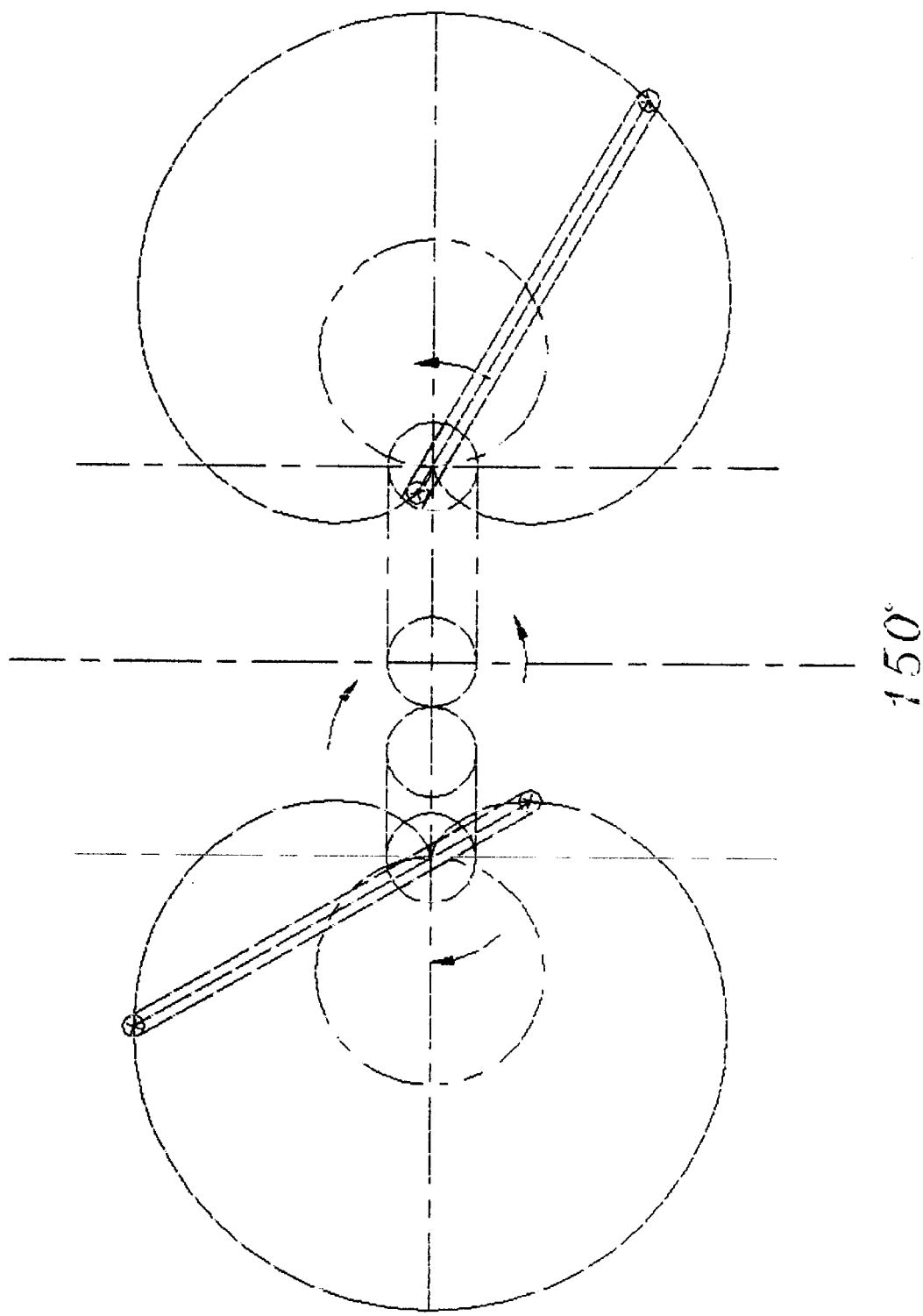
Figure 14:
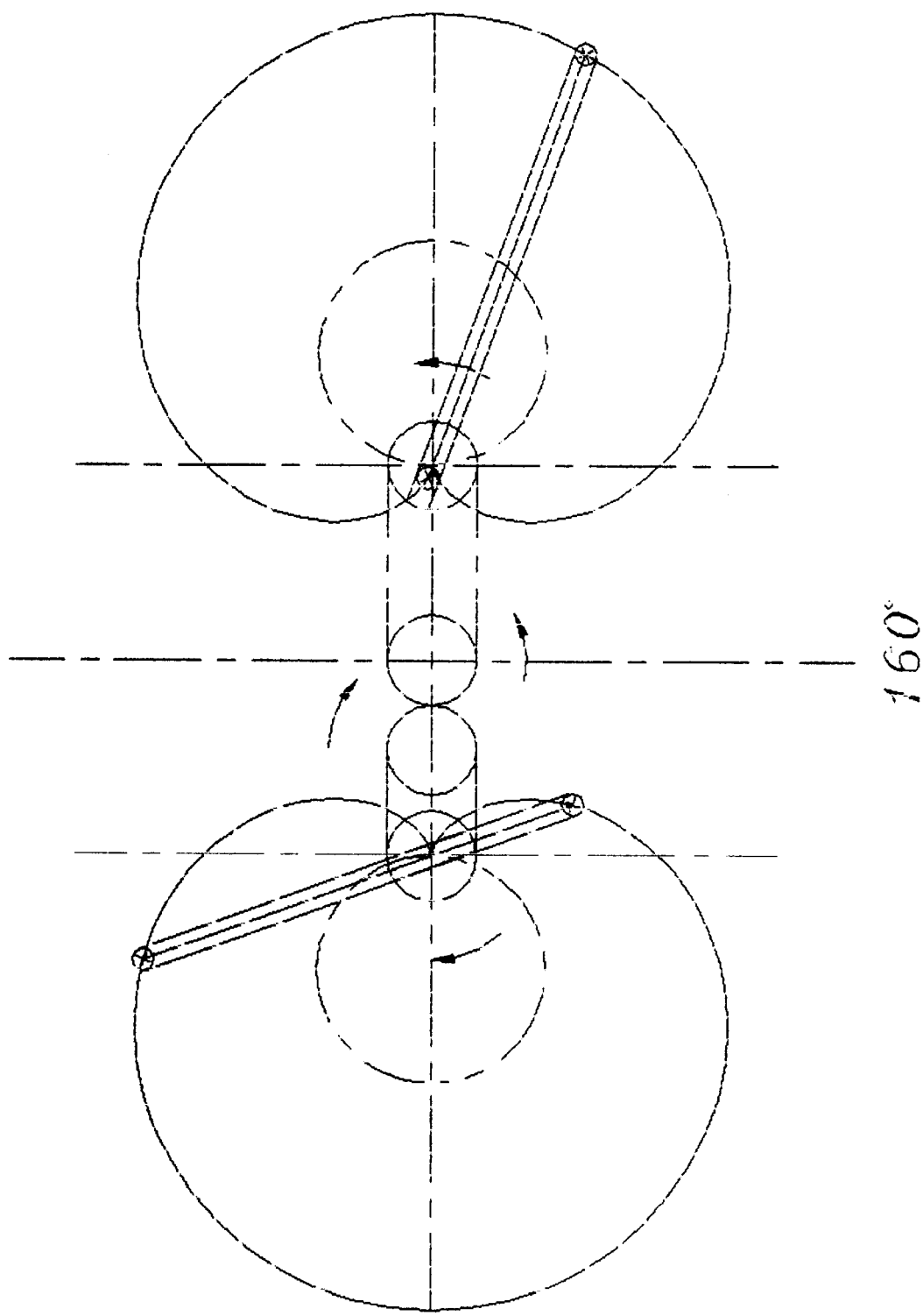
Figure 14Q:
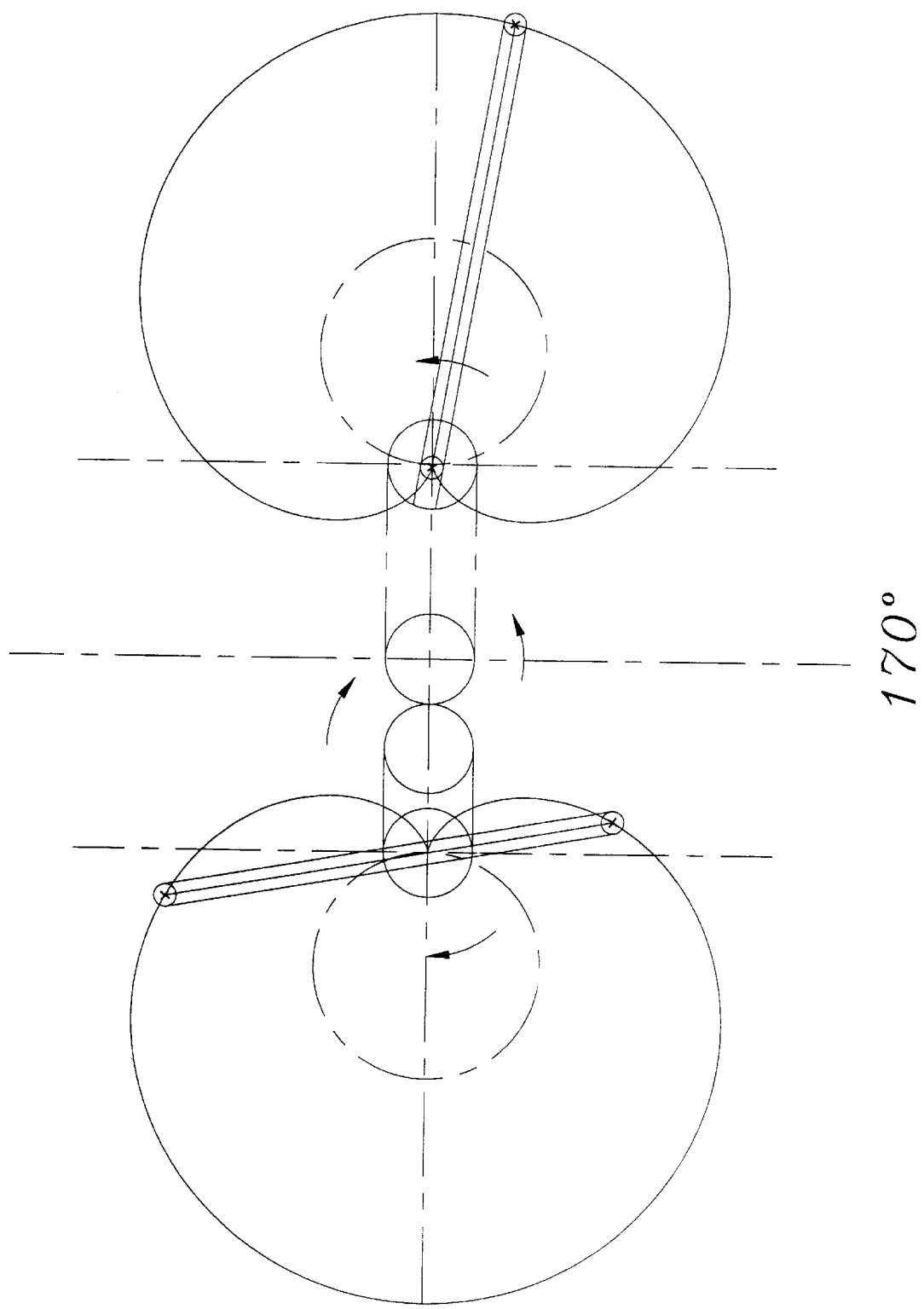
Figure 14R:
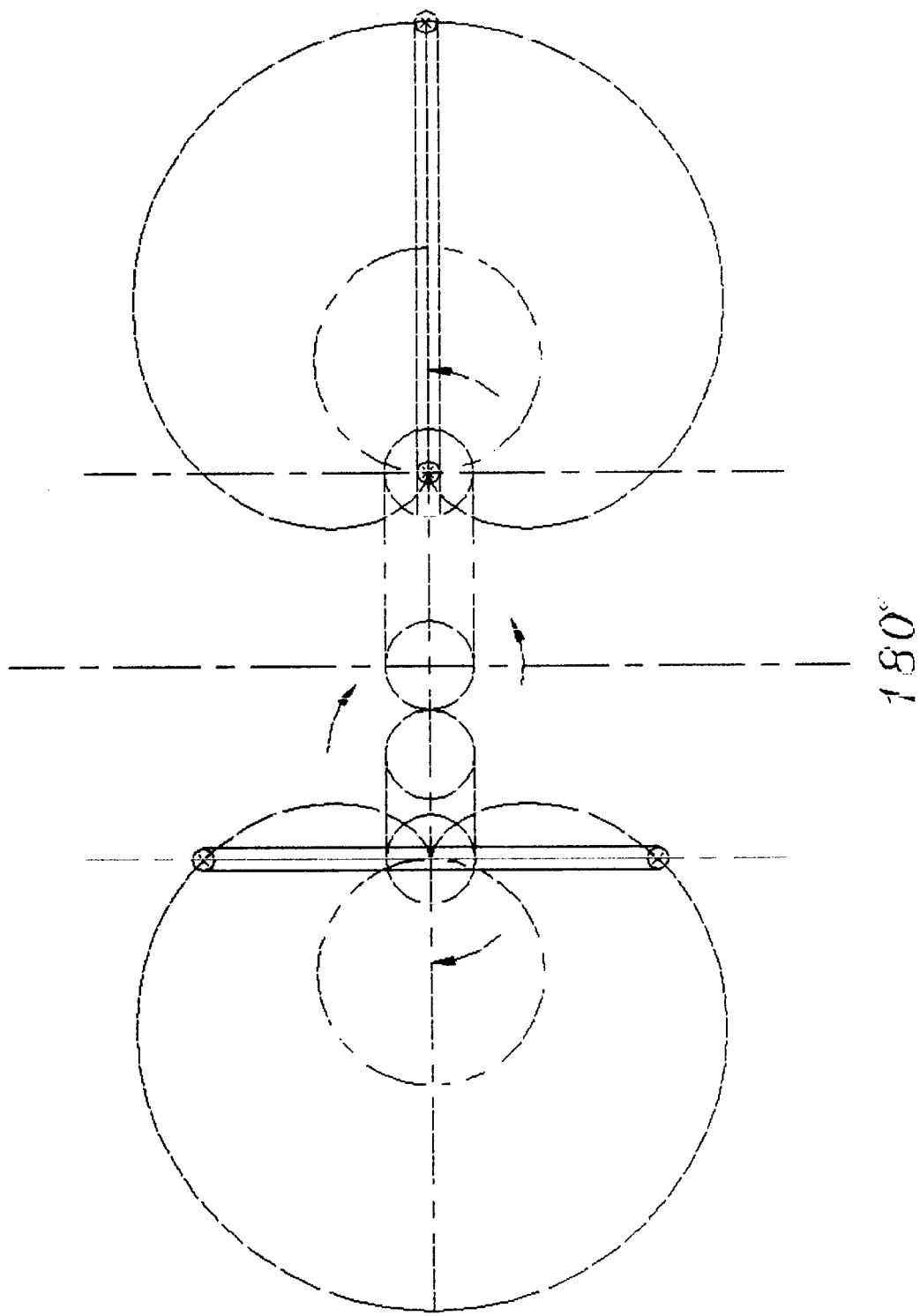
Figure 15:
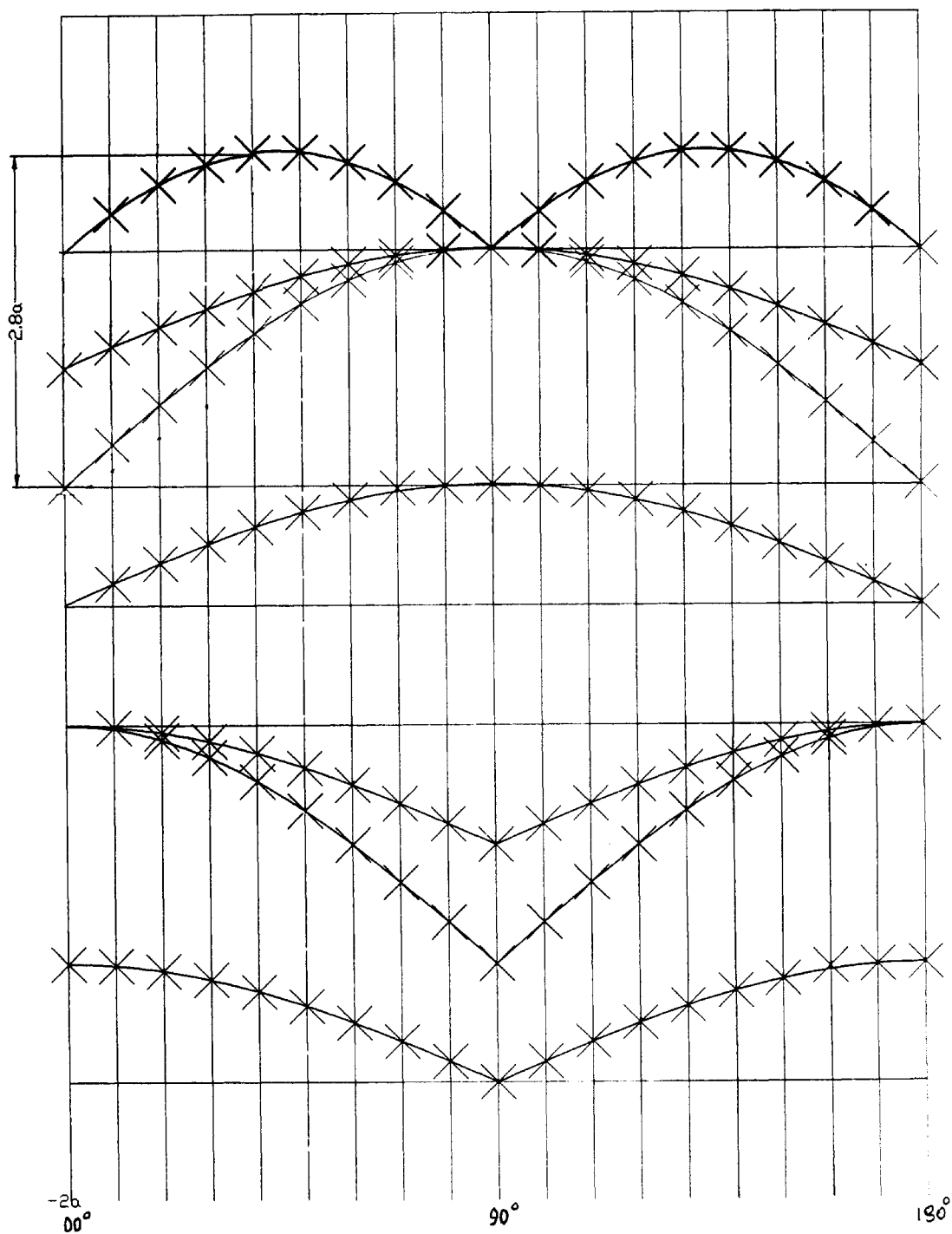
FIG. 15 is the graphic of the resultant of radius' variation in the system with two cardioids.
Figure 16:
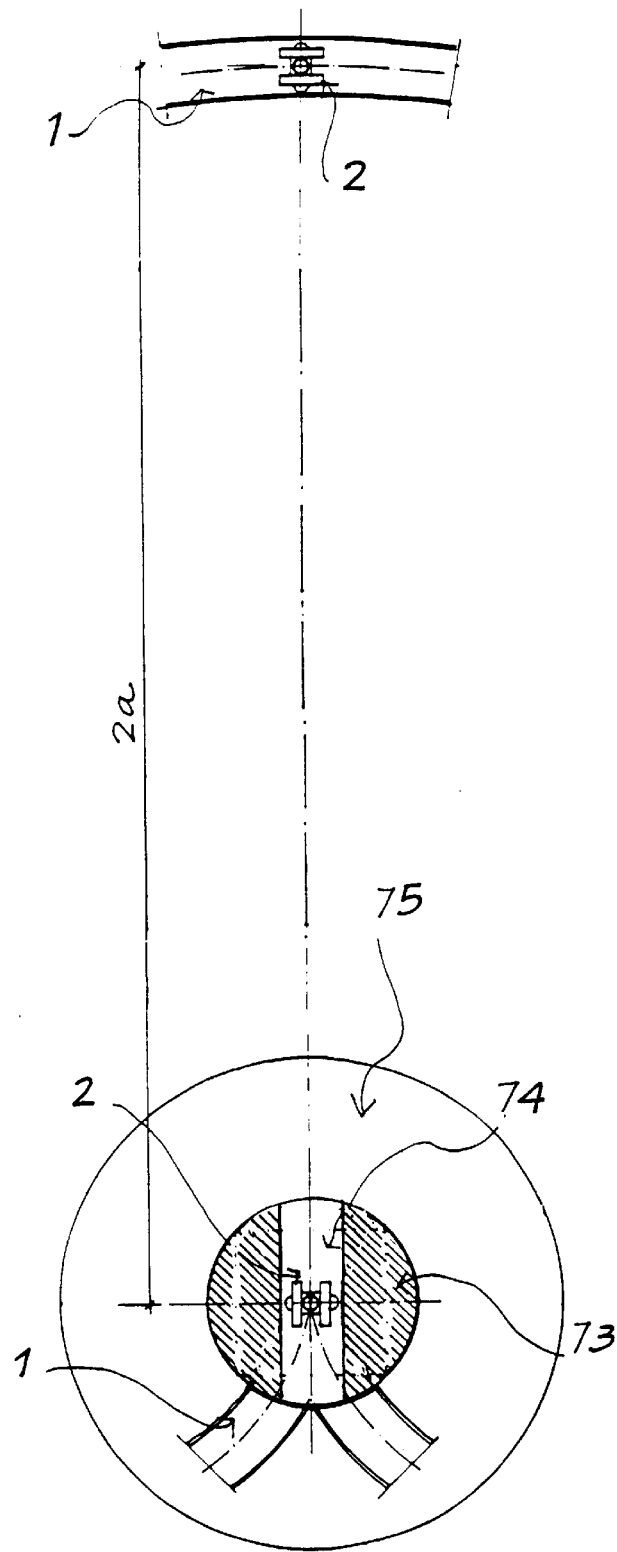
FIG. 16 is an horizontal section through the opening of interior shaft.
Figure 16B:
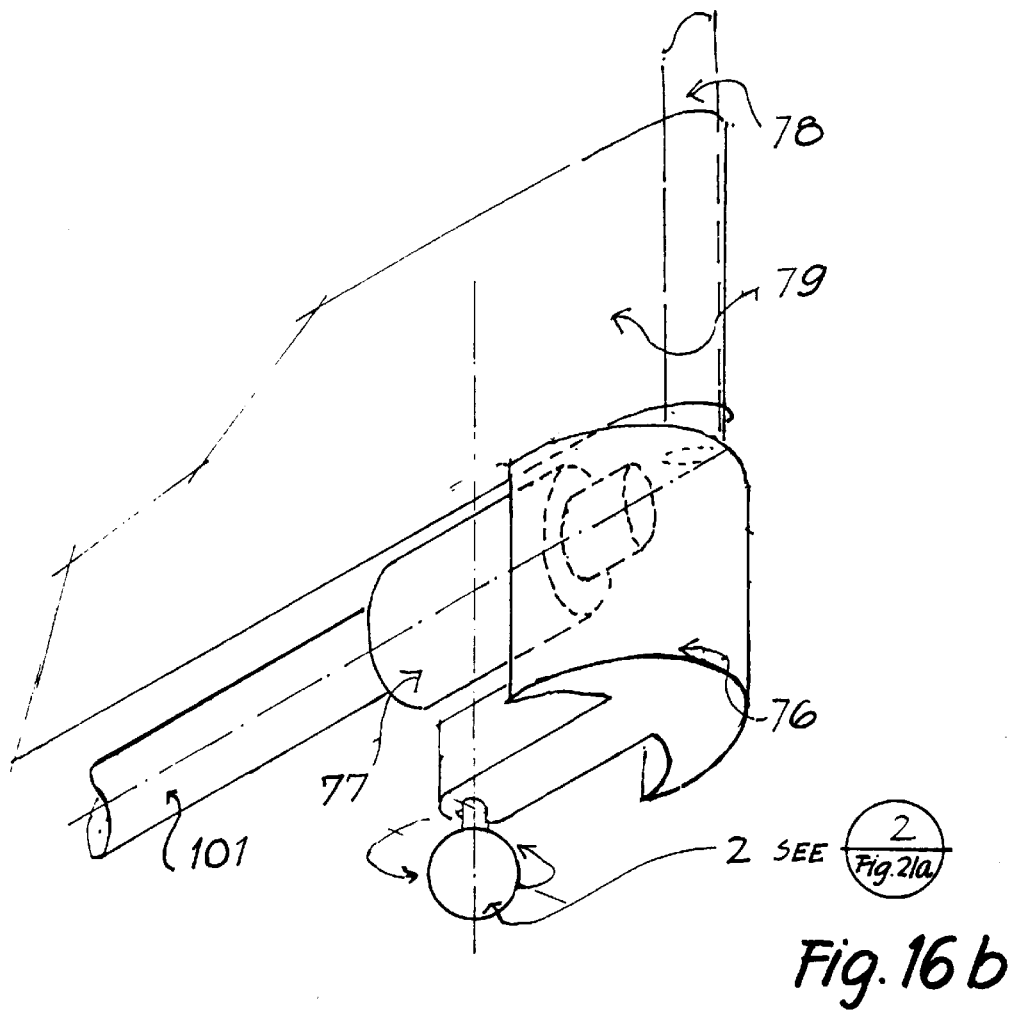
FIG. 16b is a 3D representation of the inferior arm.
Figure 16A:
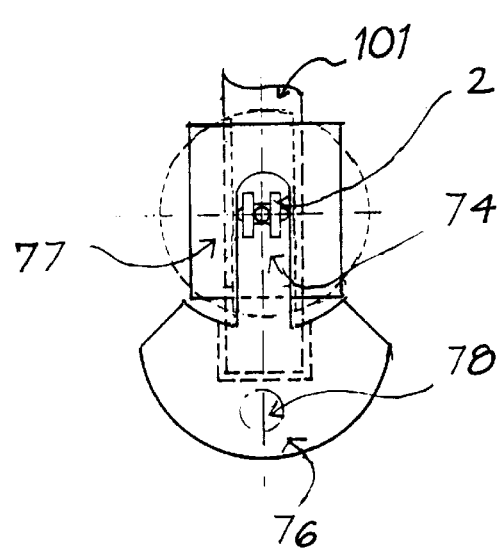
FIG. 16a is a detail-section through the opening of inferior shaft.
Figure 16C:
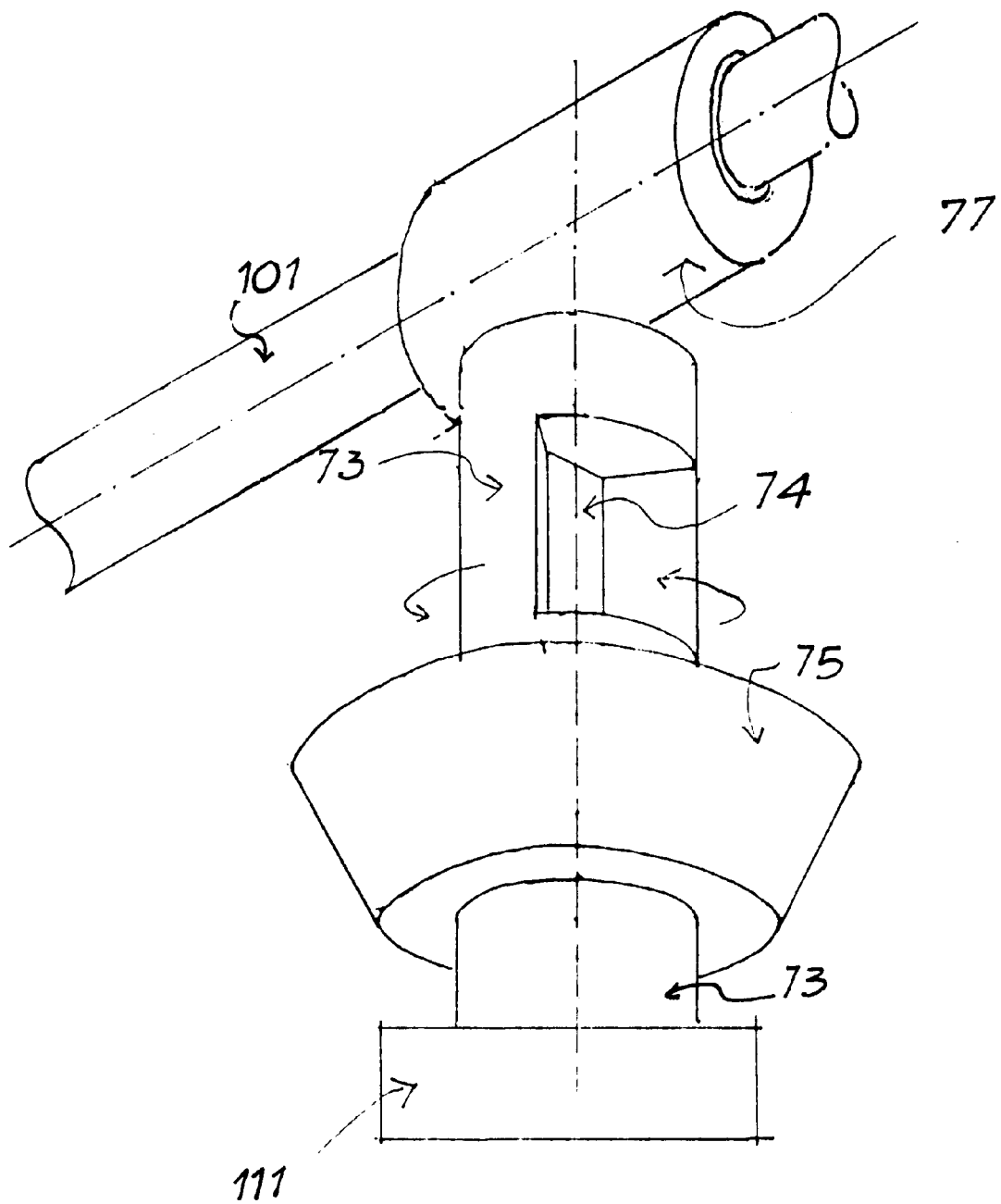
FIG. 16c is a 3D representation of the inferior shaft.
Figure 17:
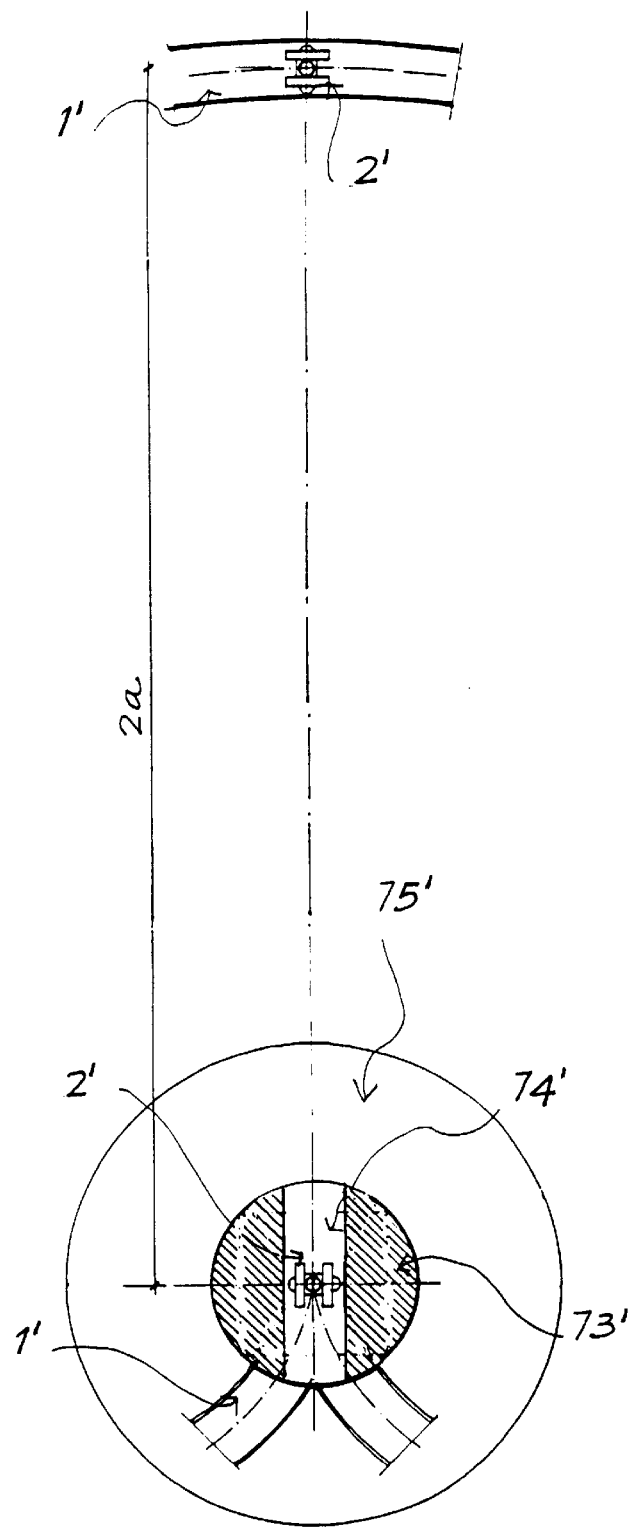
FIG. 17 is an horizontal section through the opening of superior shaft.
Figure 17B:
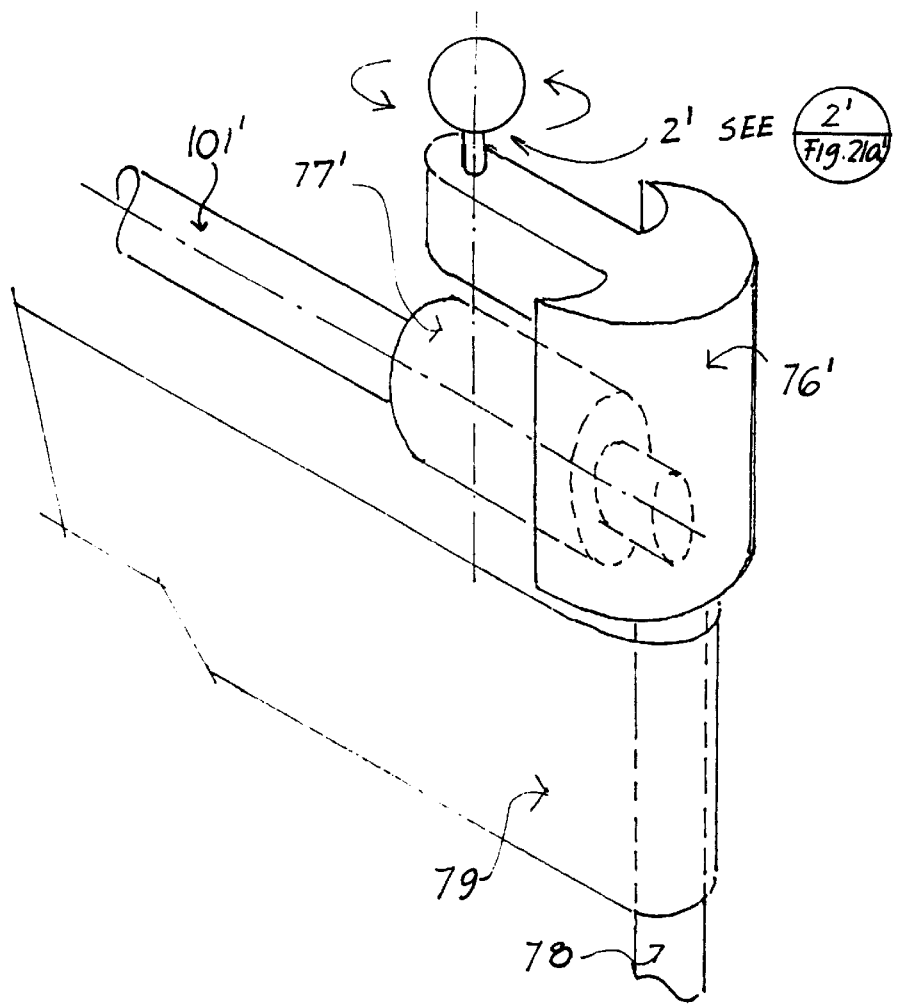
FIG. 17b is a 3D representation of the superior arm.
Figure 17A:
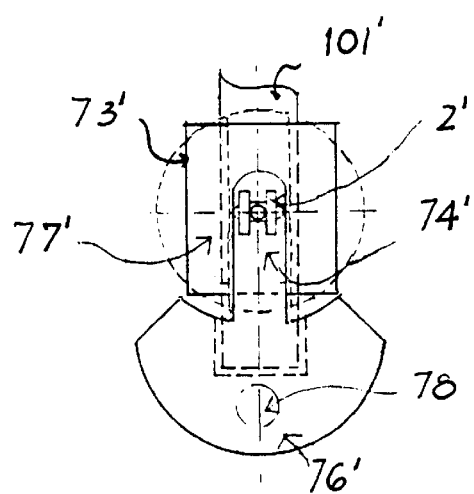
FIG. 17a is a detail-section through the opening of superior shaft.
Figure 17C:
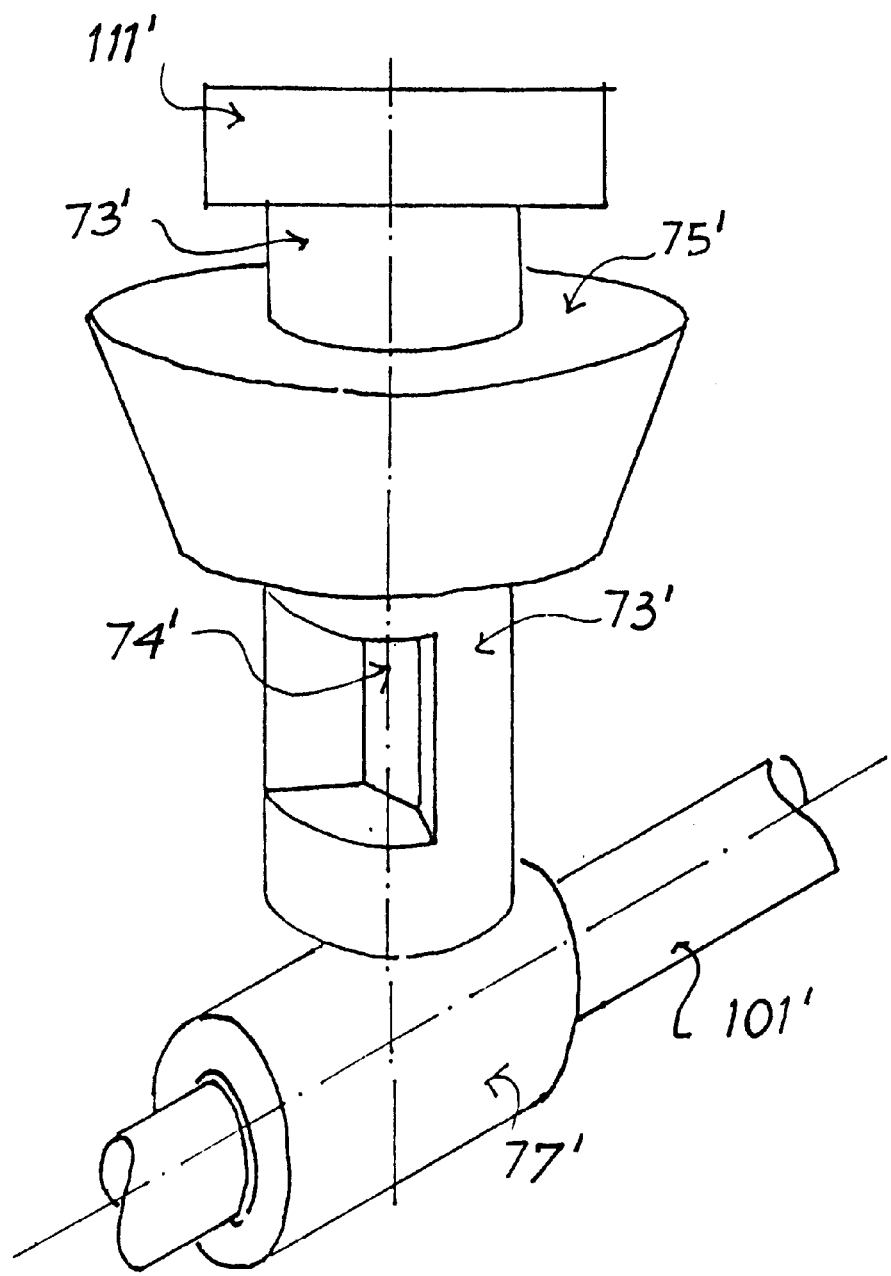
FIG. 17c is a 3D representation of the superior shaft.
Figure 17D:
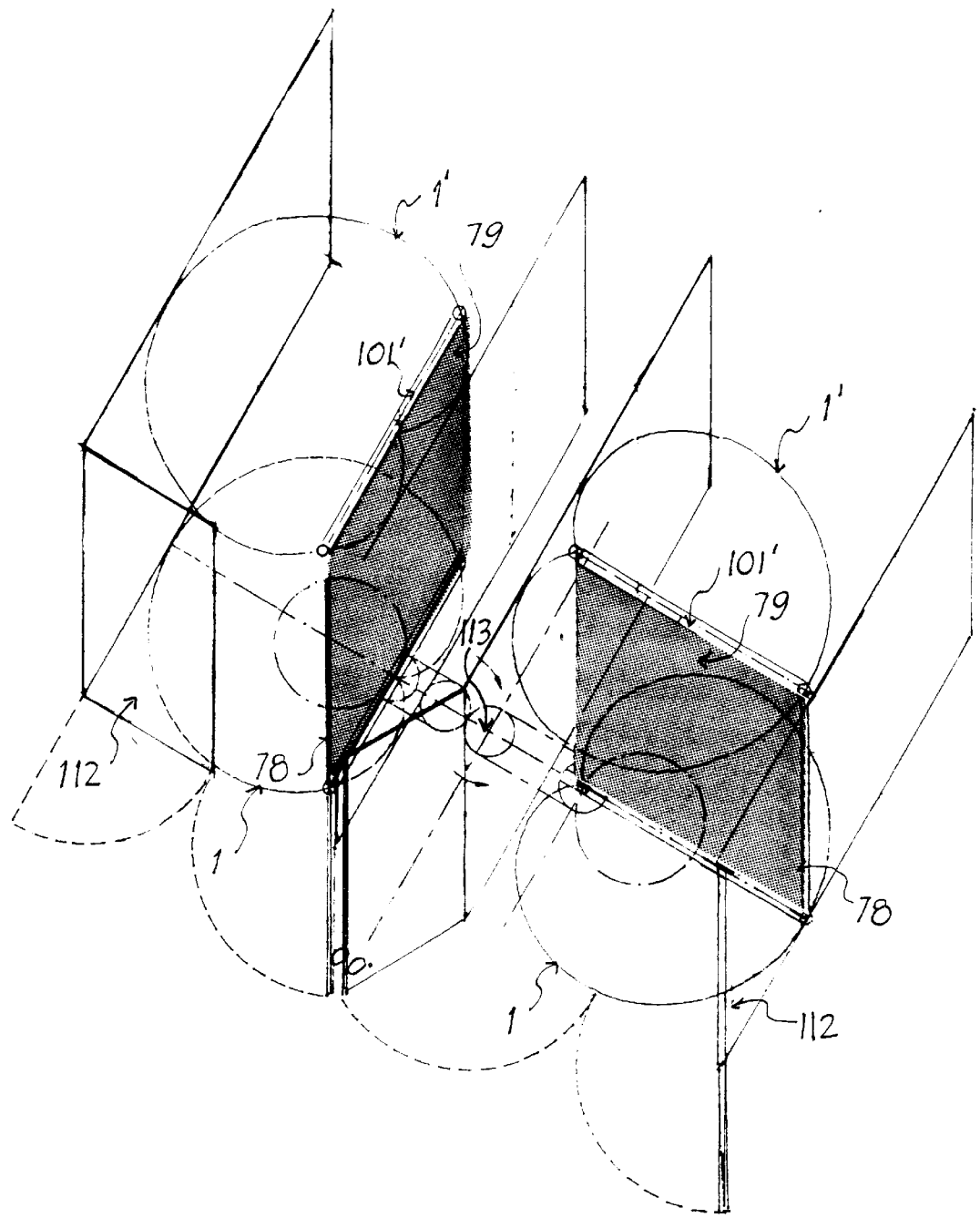
FIG. 17d is a 3D representation of the moving surfaces.
Figure 18A:
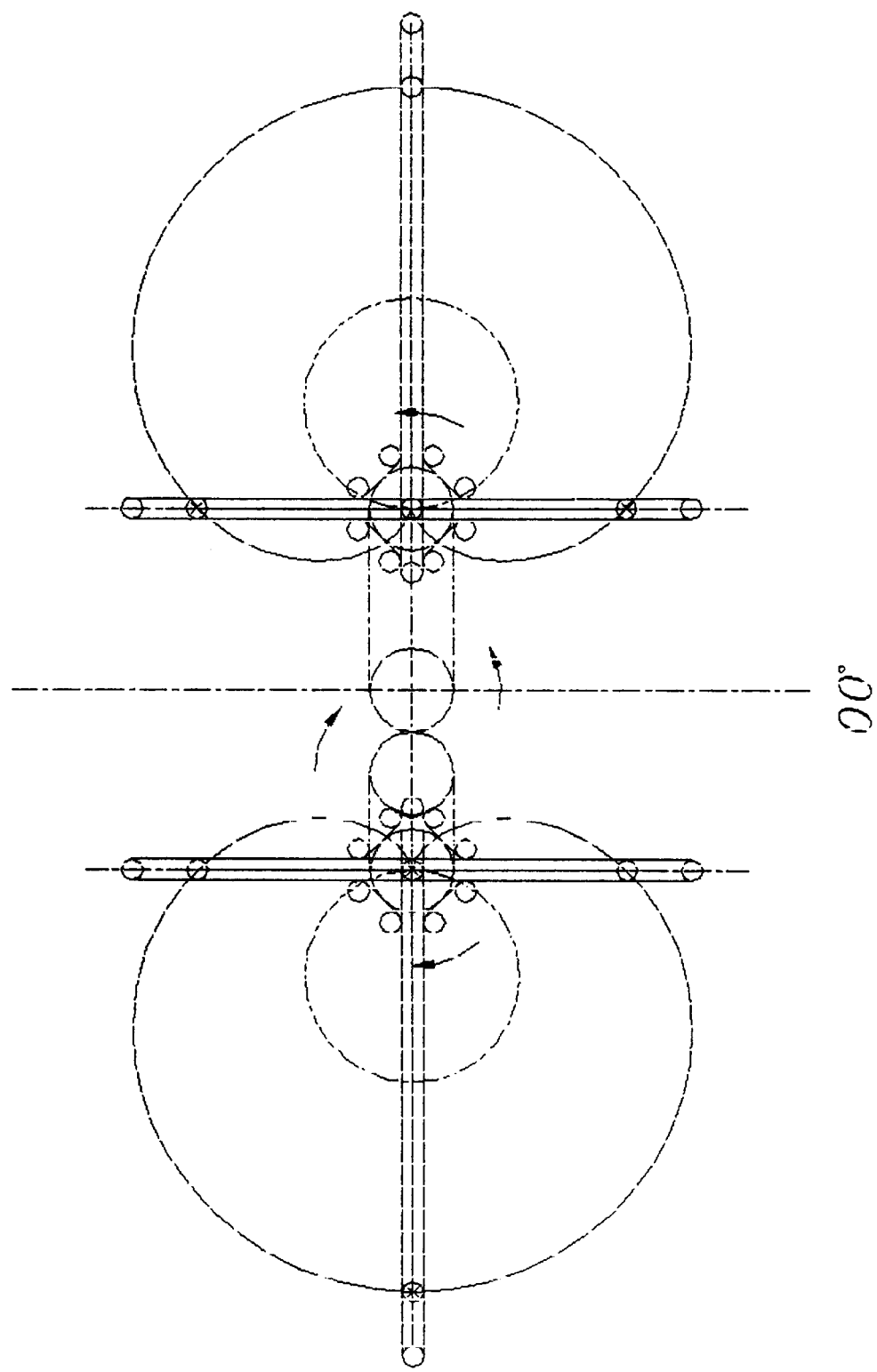
FIG. 18a is a representation of the projection on plane of the double two sails crosswise by an angle of 0 degrees.
Figure 18B:
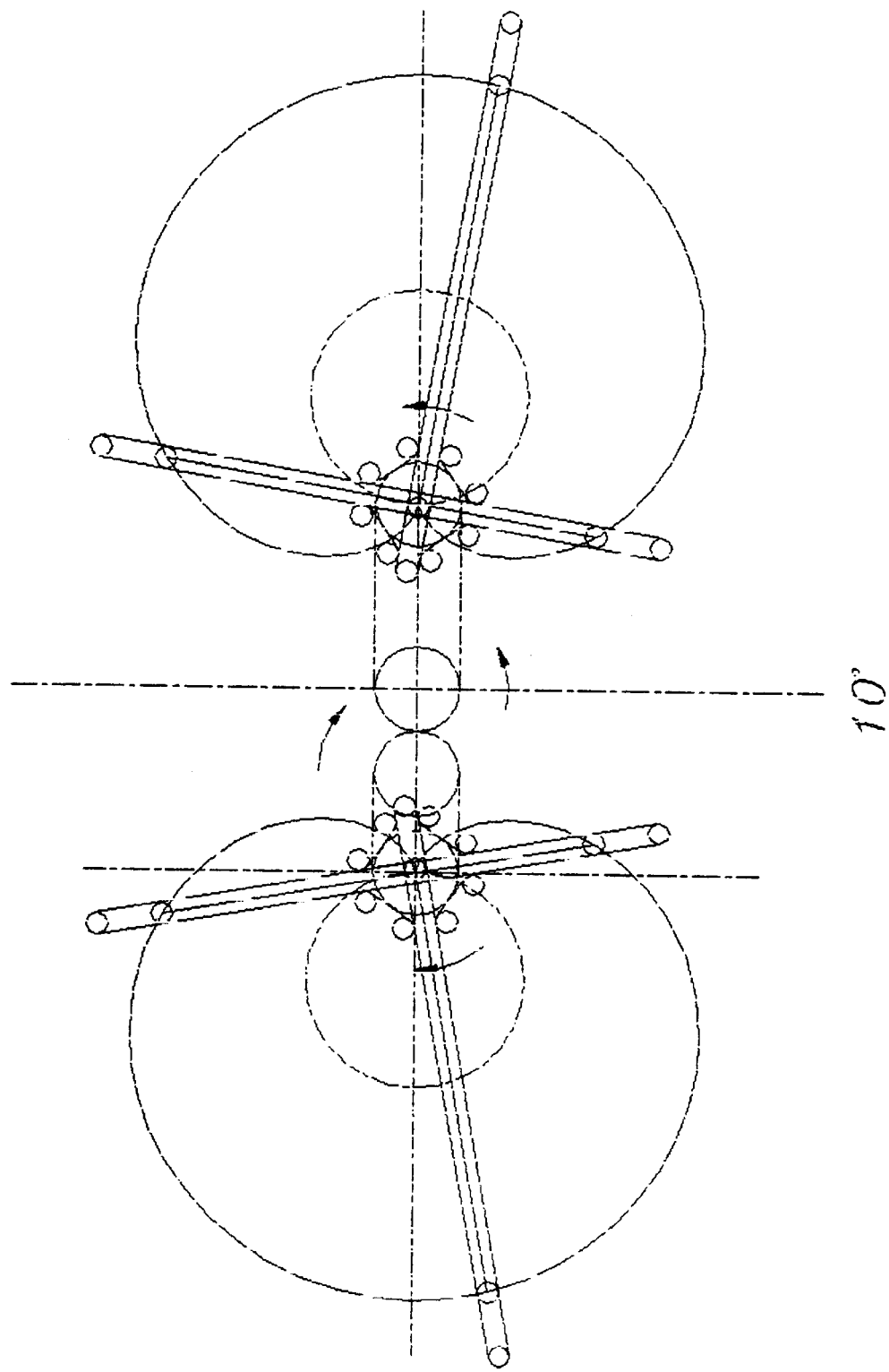
FIG. 18b is a representation of the projection on plane of the double two sails crosswise by an angle of 10 degrees.
Figure 18C:
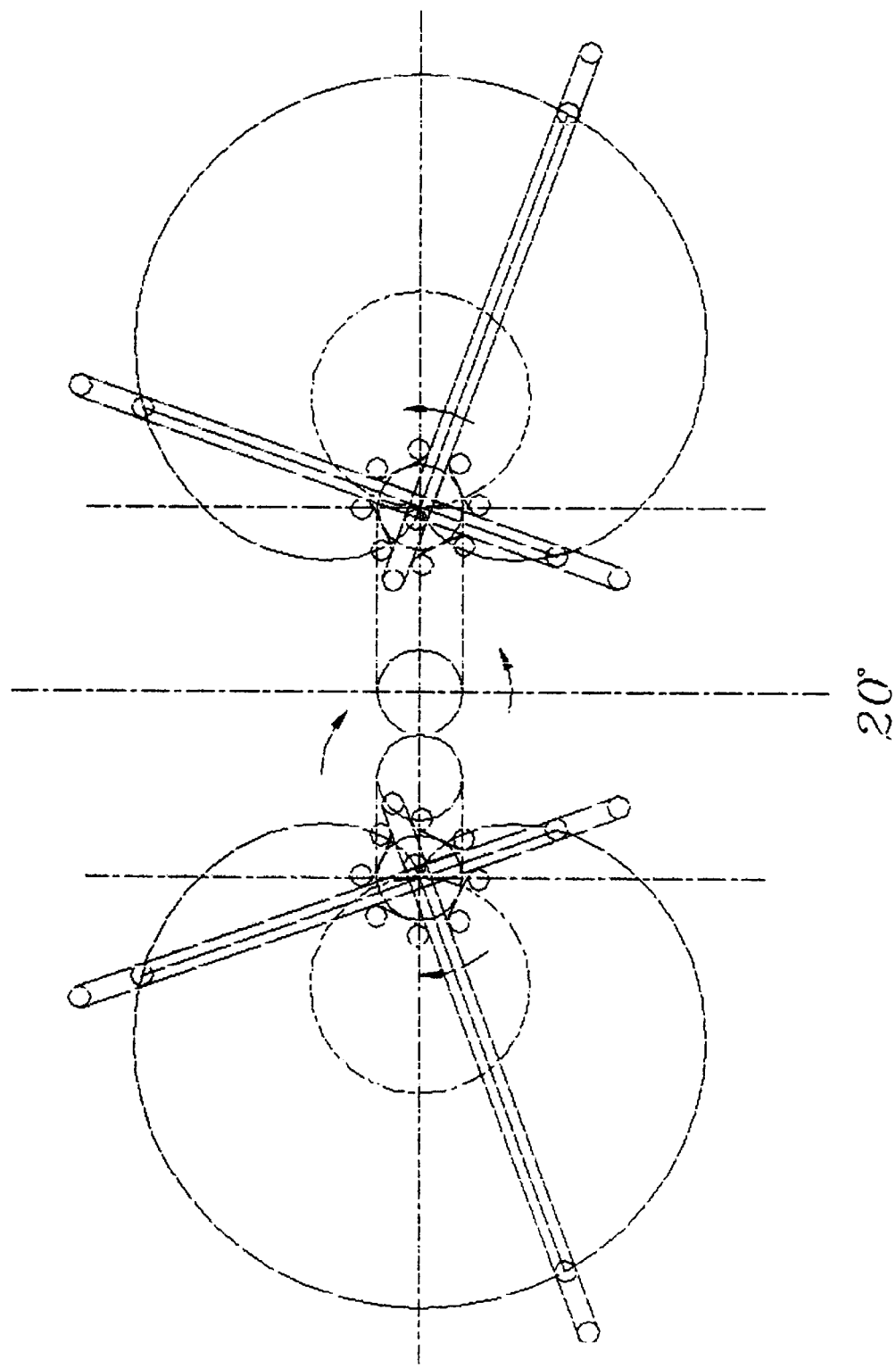
FIG. 18c is a representation of the projection on plane of the double two sails crosswise by an angle of 20 degrees.
Figure 18D:
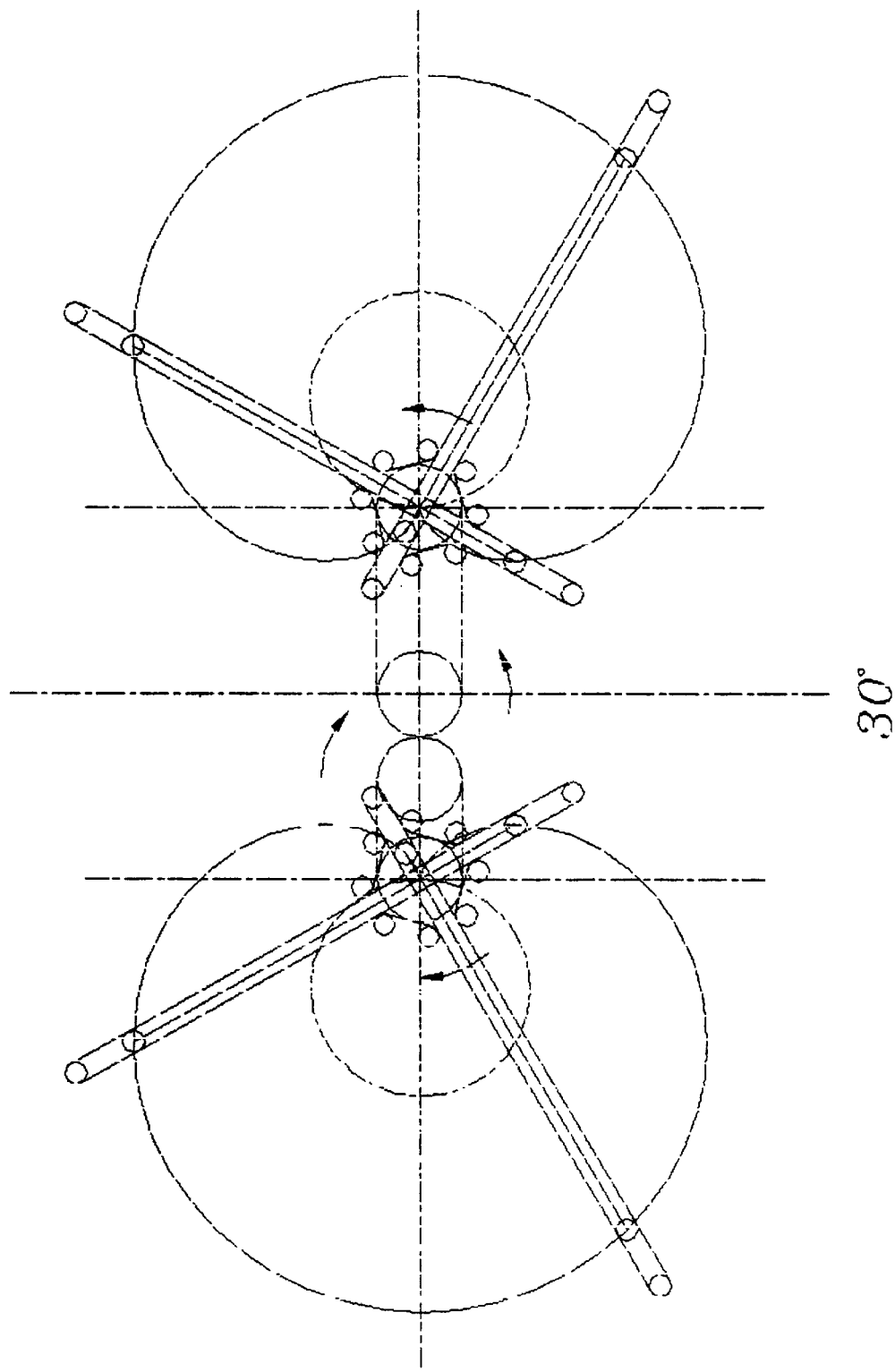
FIG. 18d is a representation of the projection on plane of the double two sails crosswise by an angle of 30 degrees.
Figure 18E:
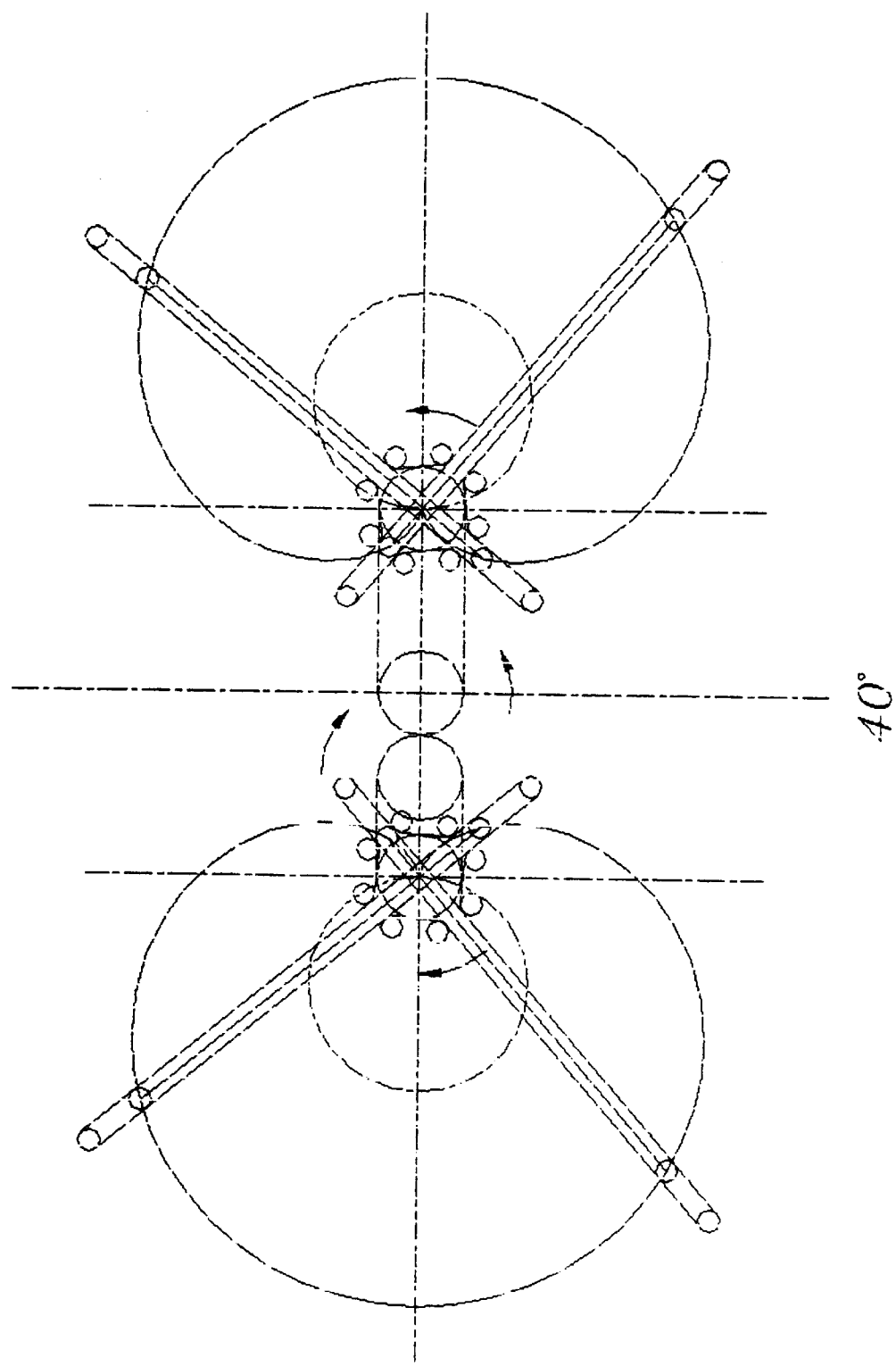
FIG. 18e is a representation of the projection on plane of the double two sails crosswise by an angle of 40 degrees.
Figure 18F:
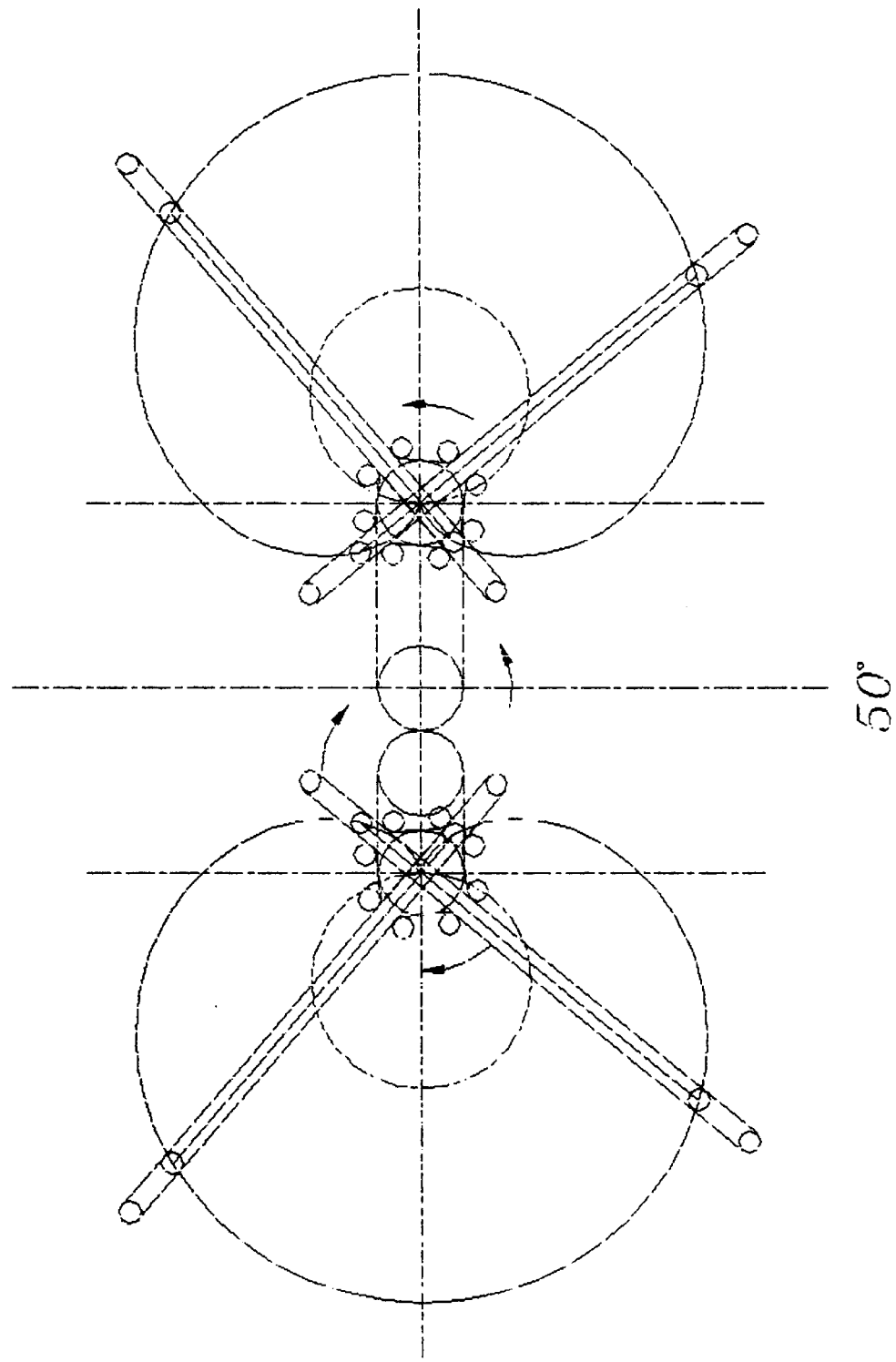
FIG. 18f is a representation of the projection on plane of the double two sails crosswise by an angle of 50 degrees.
Figure 18G:
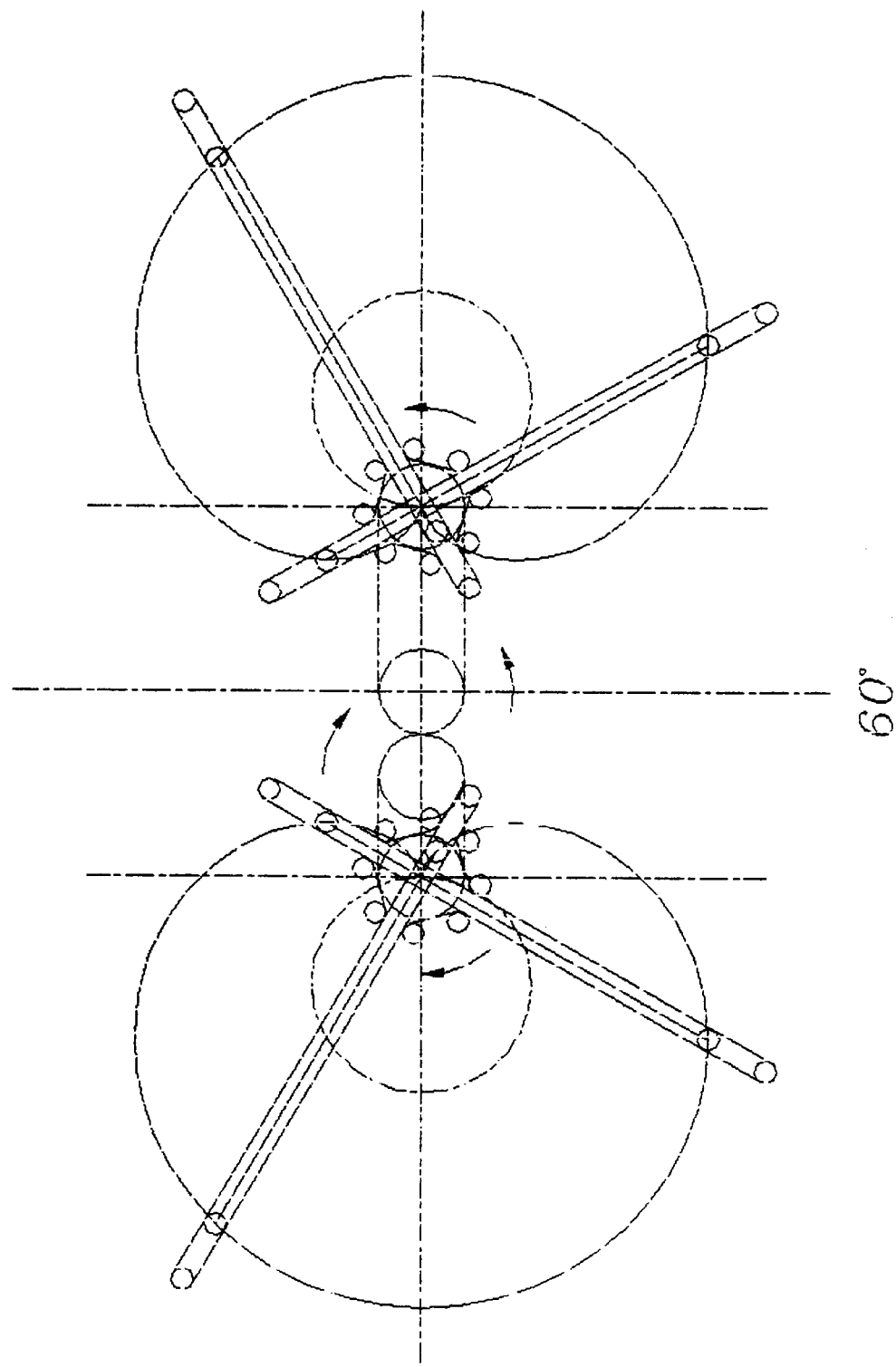
FIG. 18g is a representation of the projection on plane of the double two sails crosswise by an angle of 60 degrees.
Figure 18H:
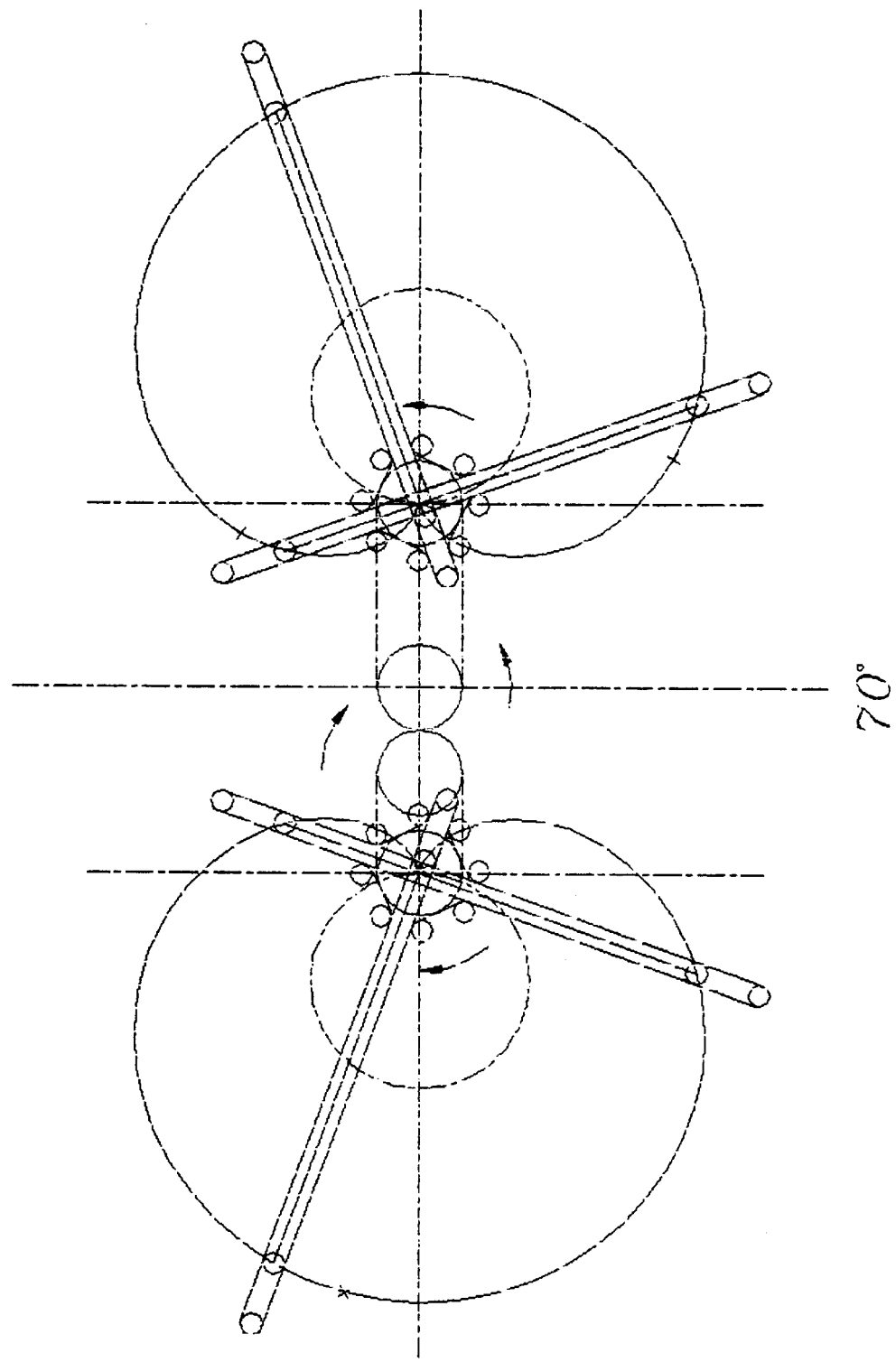
FIG. 18h is a representation of the projection on plane of the double two sails crosswise by an angle of 70 degrees.
Figure 18I:
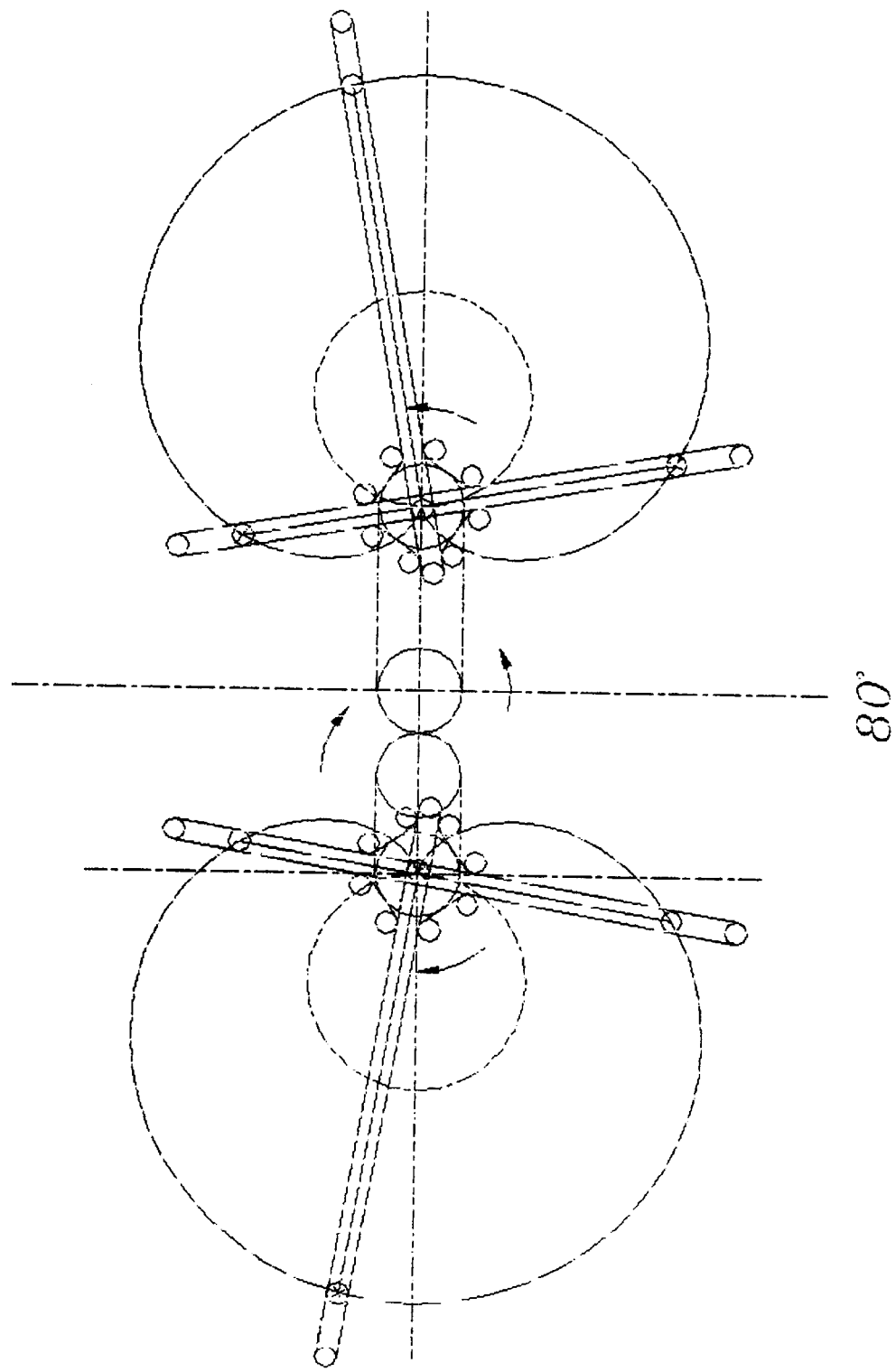
FIG. 18i is a representation of the projection on plane of the double two sails crosswise by an angle of 80 degrees.
Figure 18J:
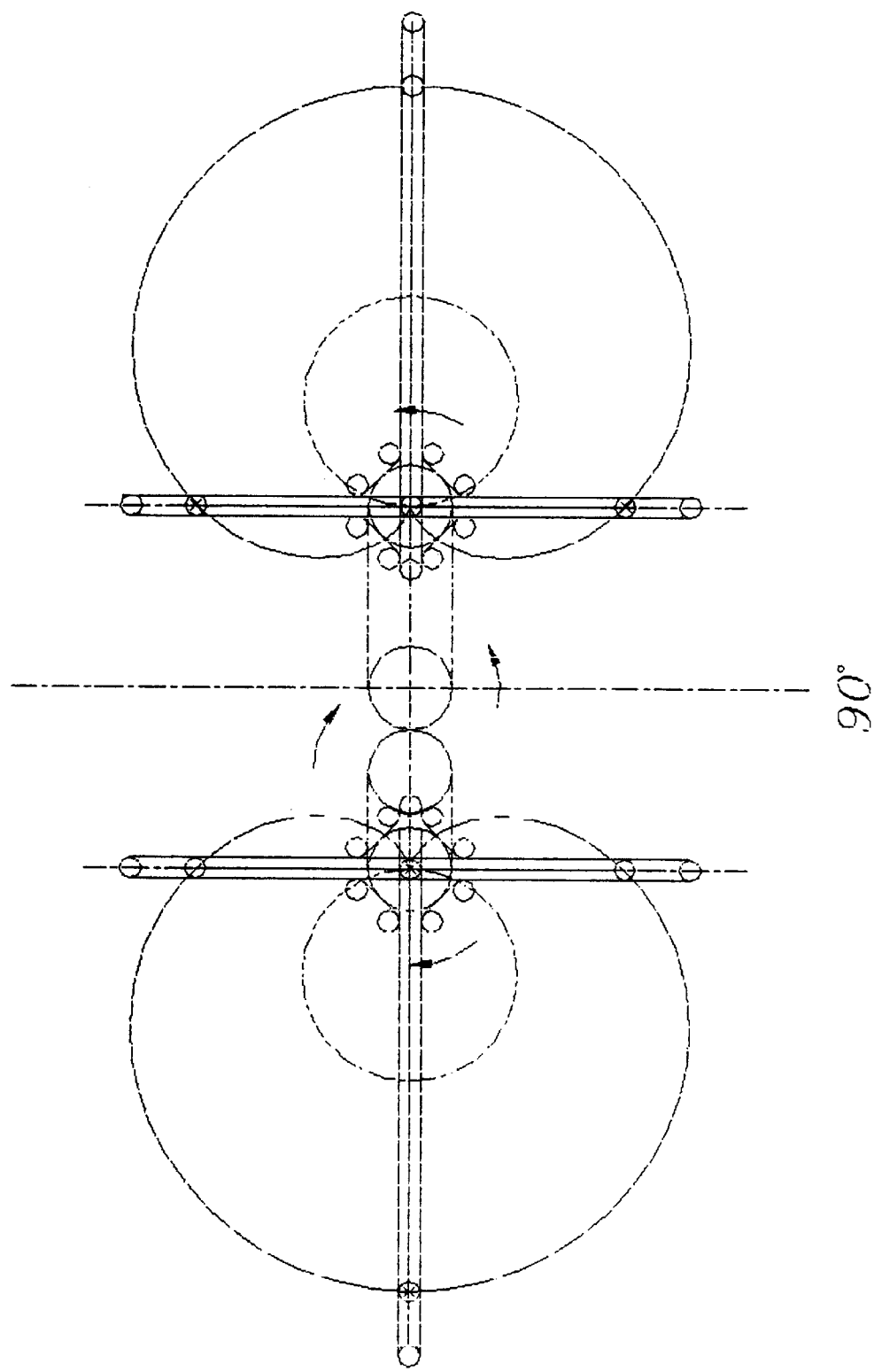
FIG. 18j is a representation of the projection on plane of the double two sails crosswise by an angle of 90 degrees.

A wind energy conversion system having two sails where the principal shaft of two conversion systems are coupled to a common electric generator is illustrated in FIG. 16 through FIG. 21a. The conversion system is composed of an above ground structure which supports two moving vertical surfaces and a generator assembly. The combination of the two vertical surfaces is shown in FIGS. 17a–18j. As each vertical surface revolves around through a shaft, its vertical center sways closer or away constrained by the cardioid shaped rail guides. The respective shafts are connected to a common generator via a principal shaft shown in FIG. 17d. It is obvious that a combination of two or more vertical surfaces could easily be used depending upon the quantity of power output required. A complete cycle illustrating the combined rotation and linear movements of the sail's vertical surfaces can be found in FIGS. 14a–14r. The graphic variations of the cardioid radius active and reactive zones are illustrated in FIG. 15.

Figure 19:
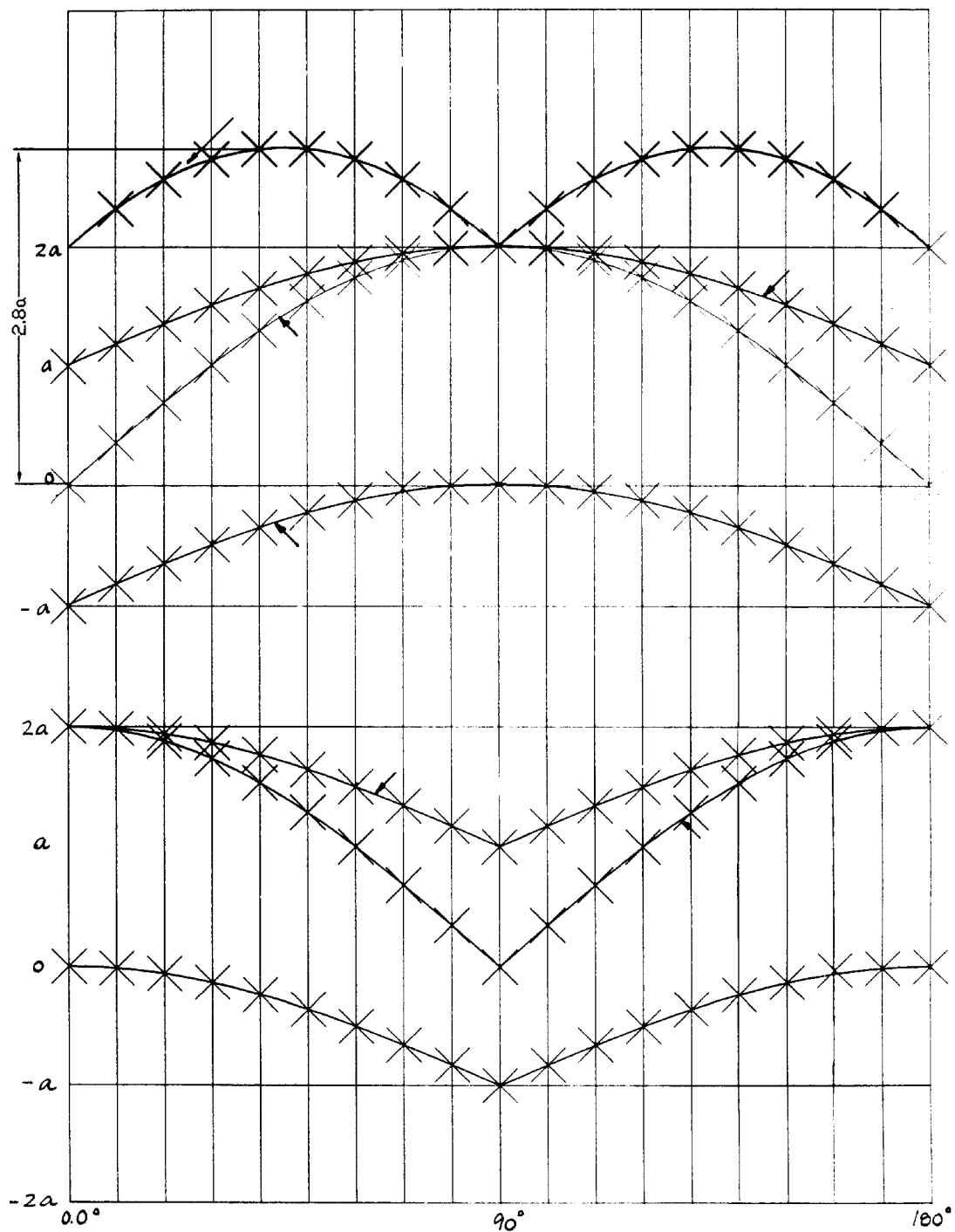
FIG. 19 is the graphic of the radius' variation in the system double two sails crosswise (C1).
Figure 20:
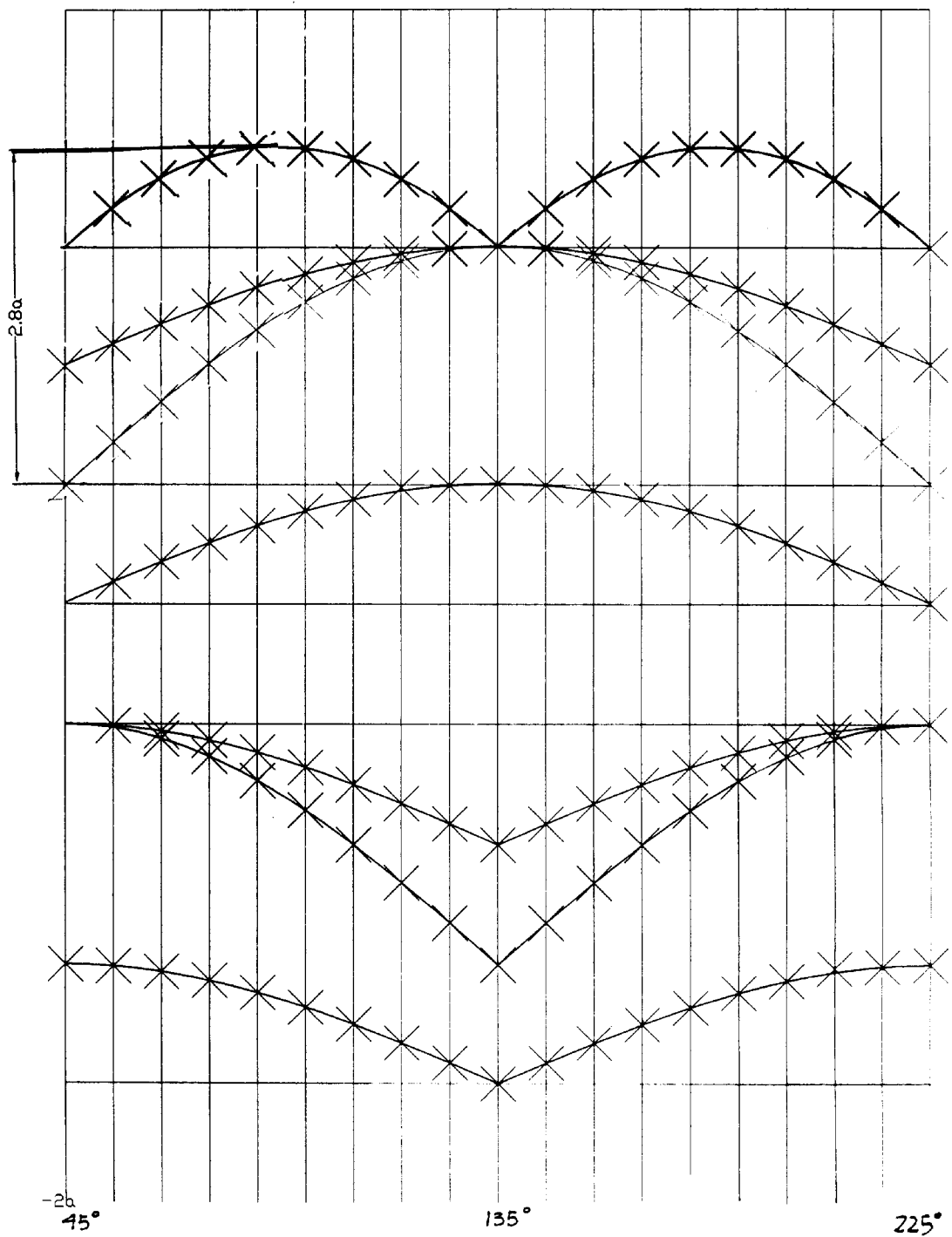
FIG. 20 is the graphic of the radius' variation in the system double two sails crosswise (C2).
Figure 21:
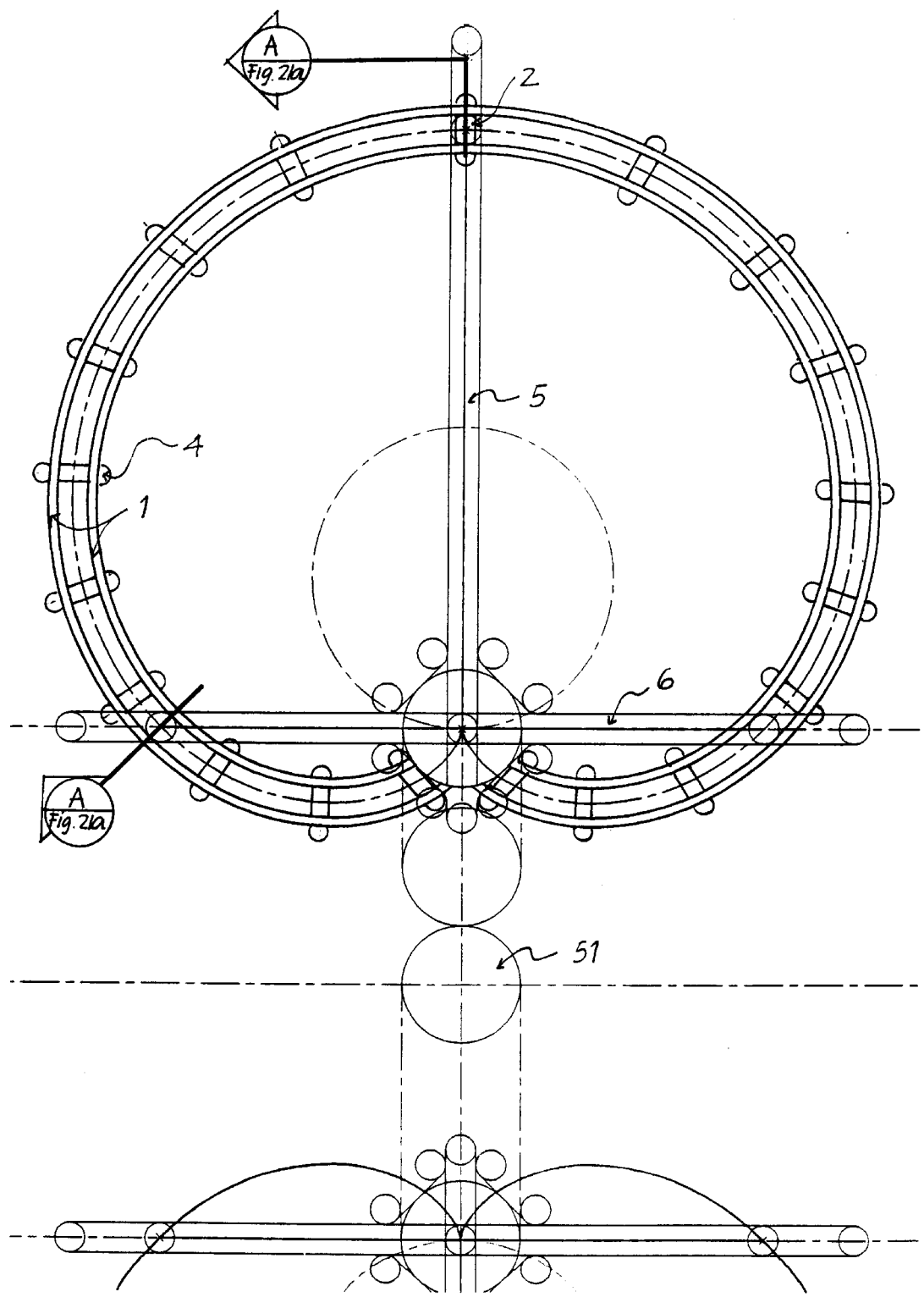
FIG. 21 is the plane of the inferior rail guide with the structural support.
Figure 21:
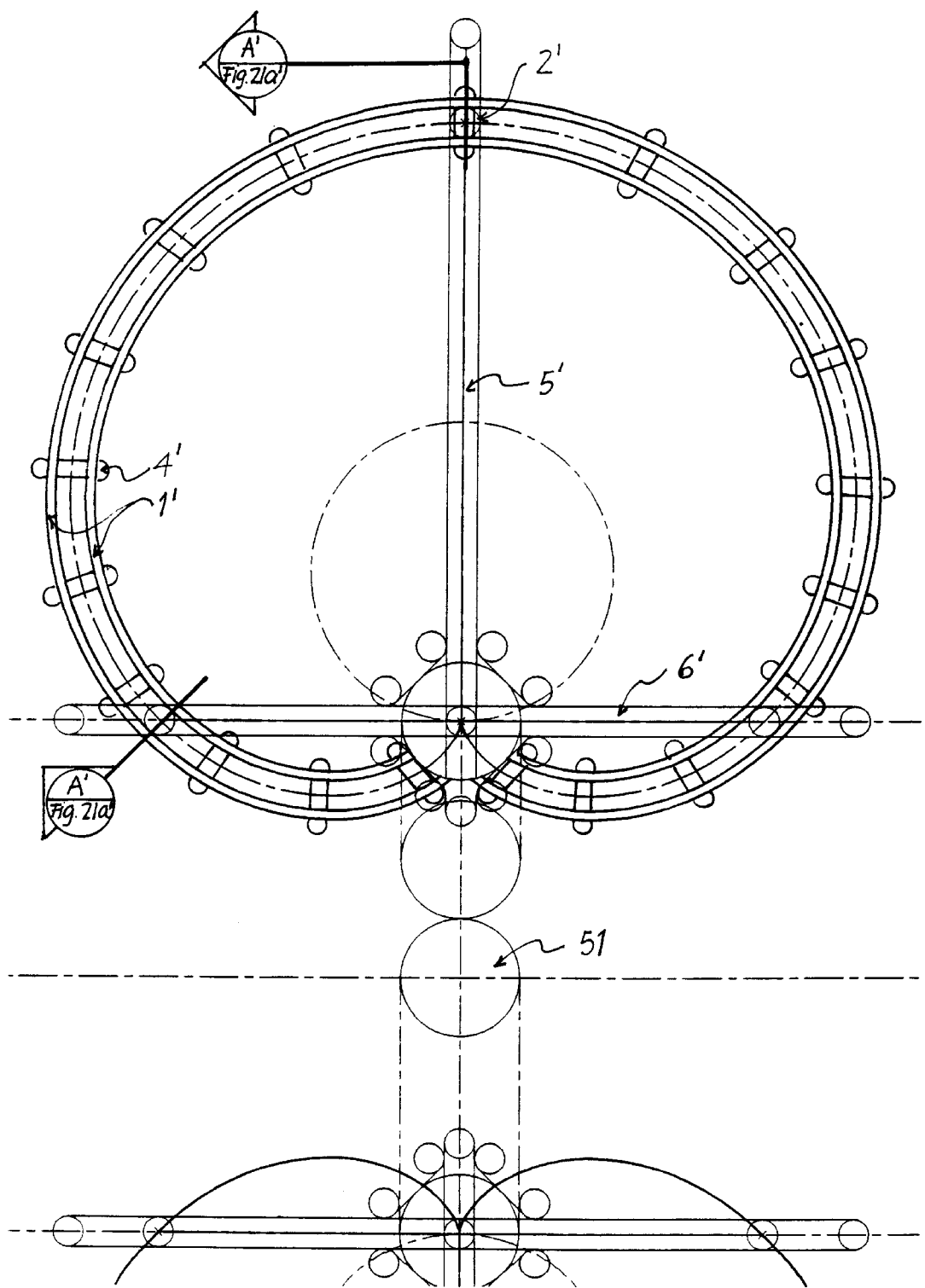
Figure 22:
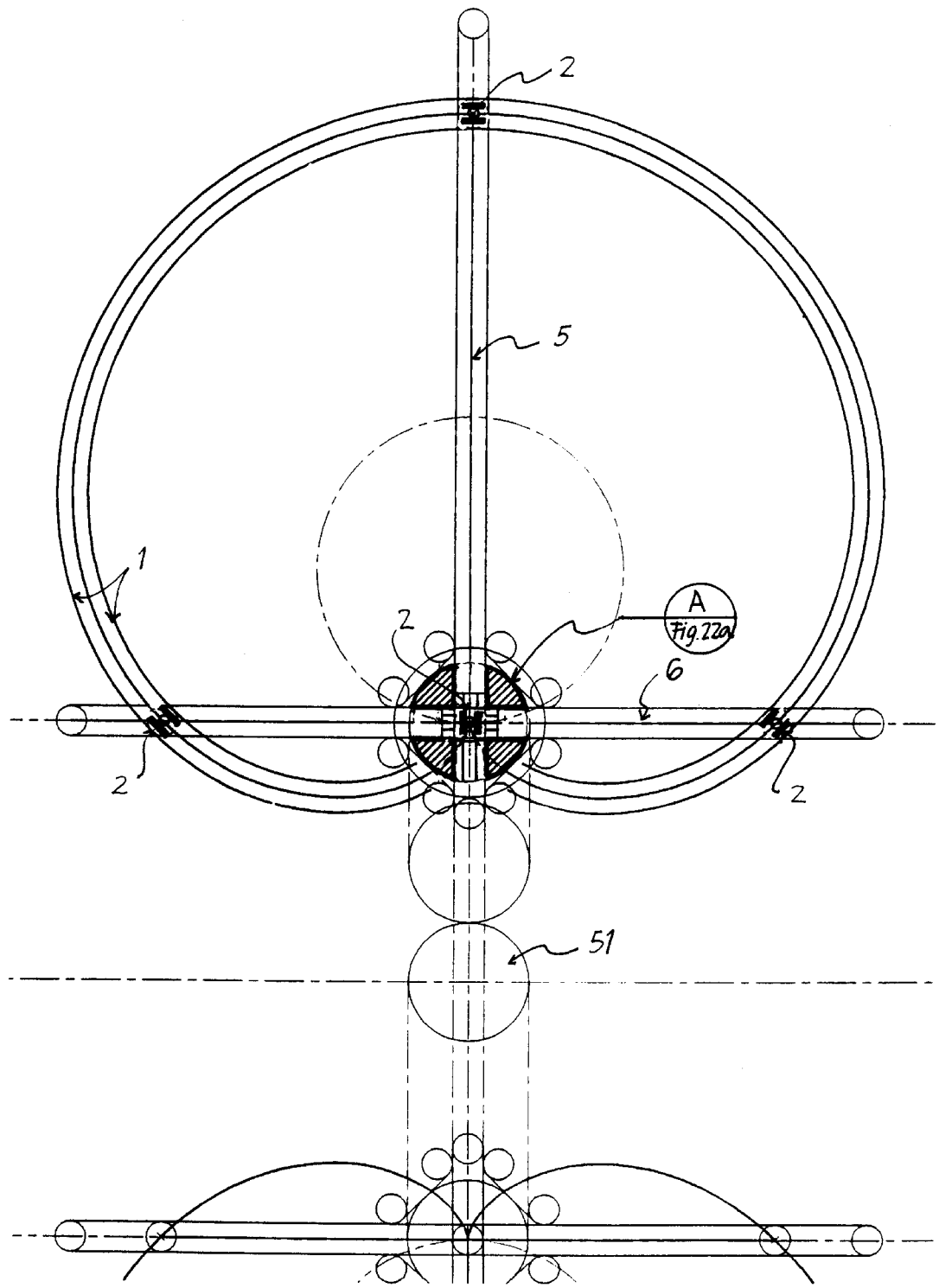
FIG. 22 is an horizontal section through the shaft at the same level with the rail guide (inferior and superior).
Figure 22A:
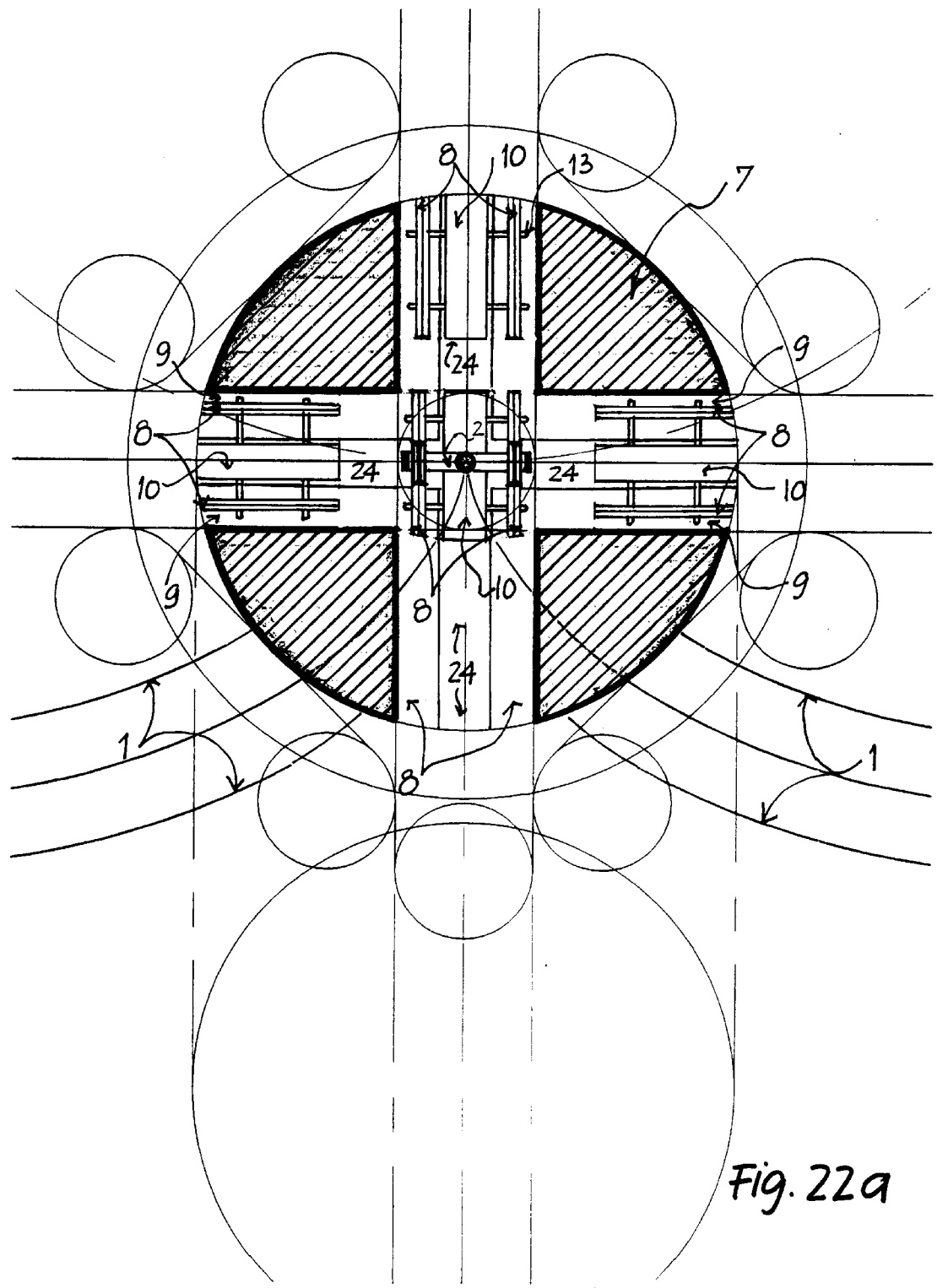
FIG. 22a is a detail-section through the opening of the shaft.
Figure 22D:
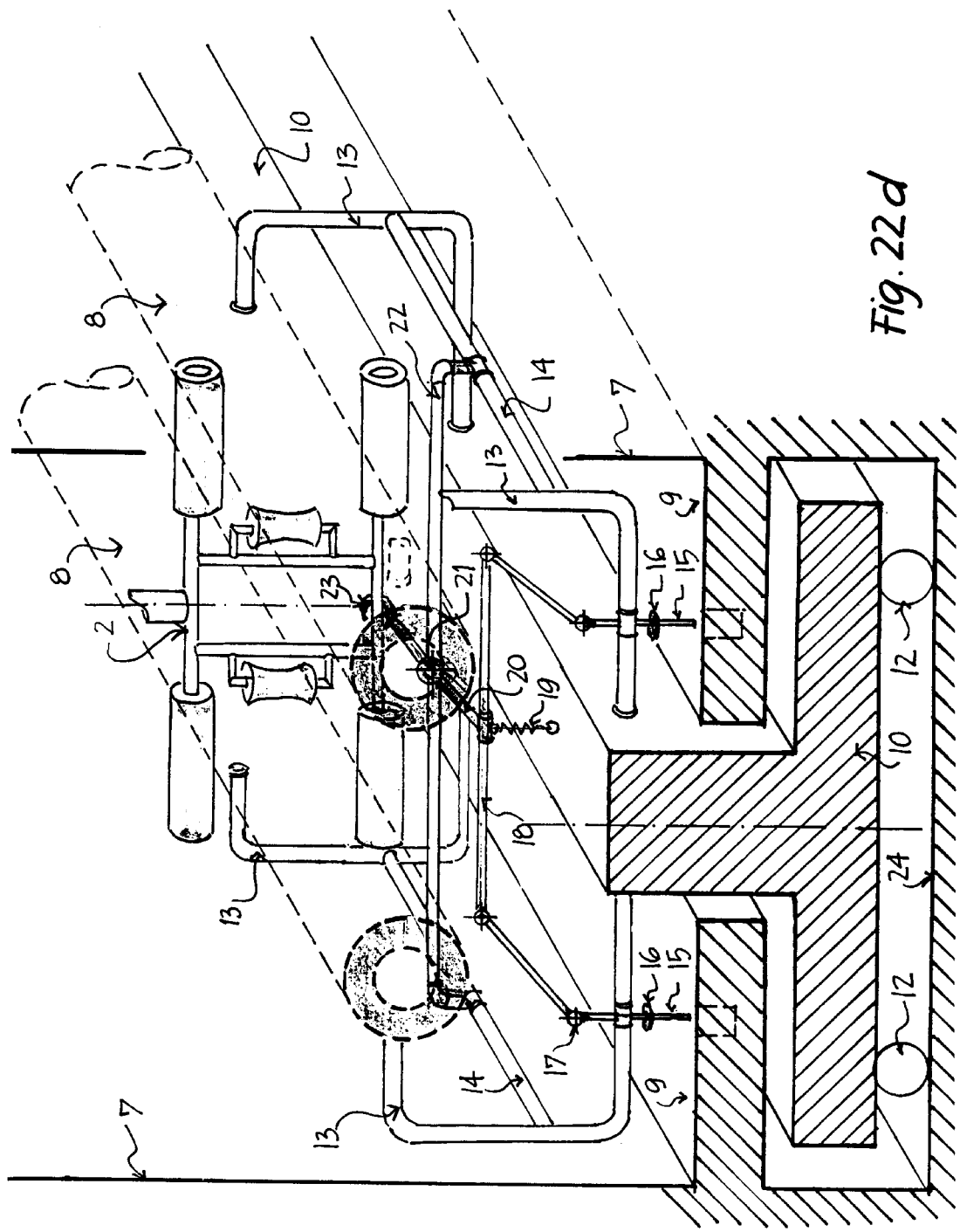
FIG. 22d is a 3D detail in the opening of the shaft in phase 2.
Figure 22E:
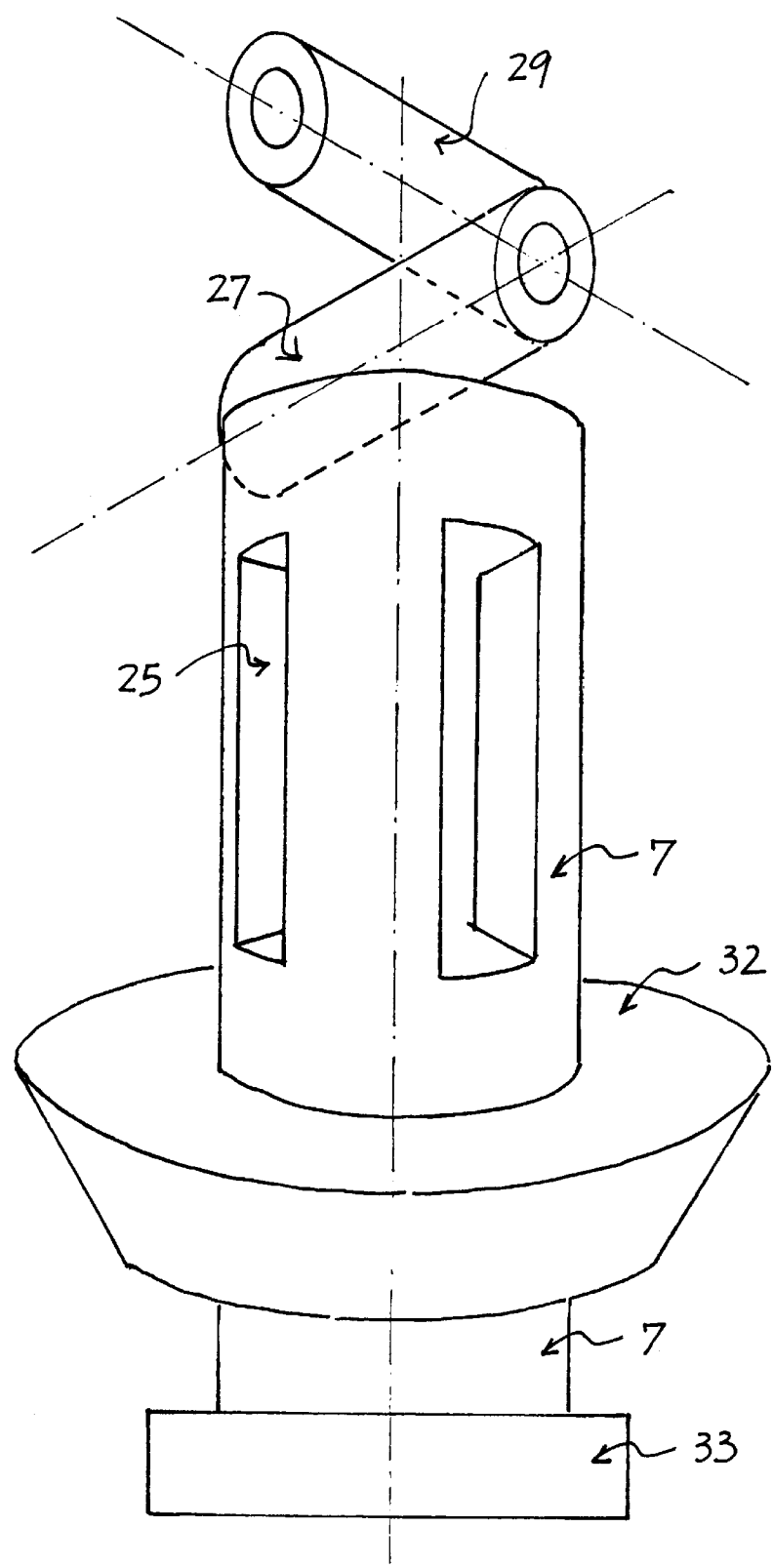
FIG. 22e is a 3D representation of the opening of the inferior shaft for the system double two sails Crosswise.
Figure 22F:
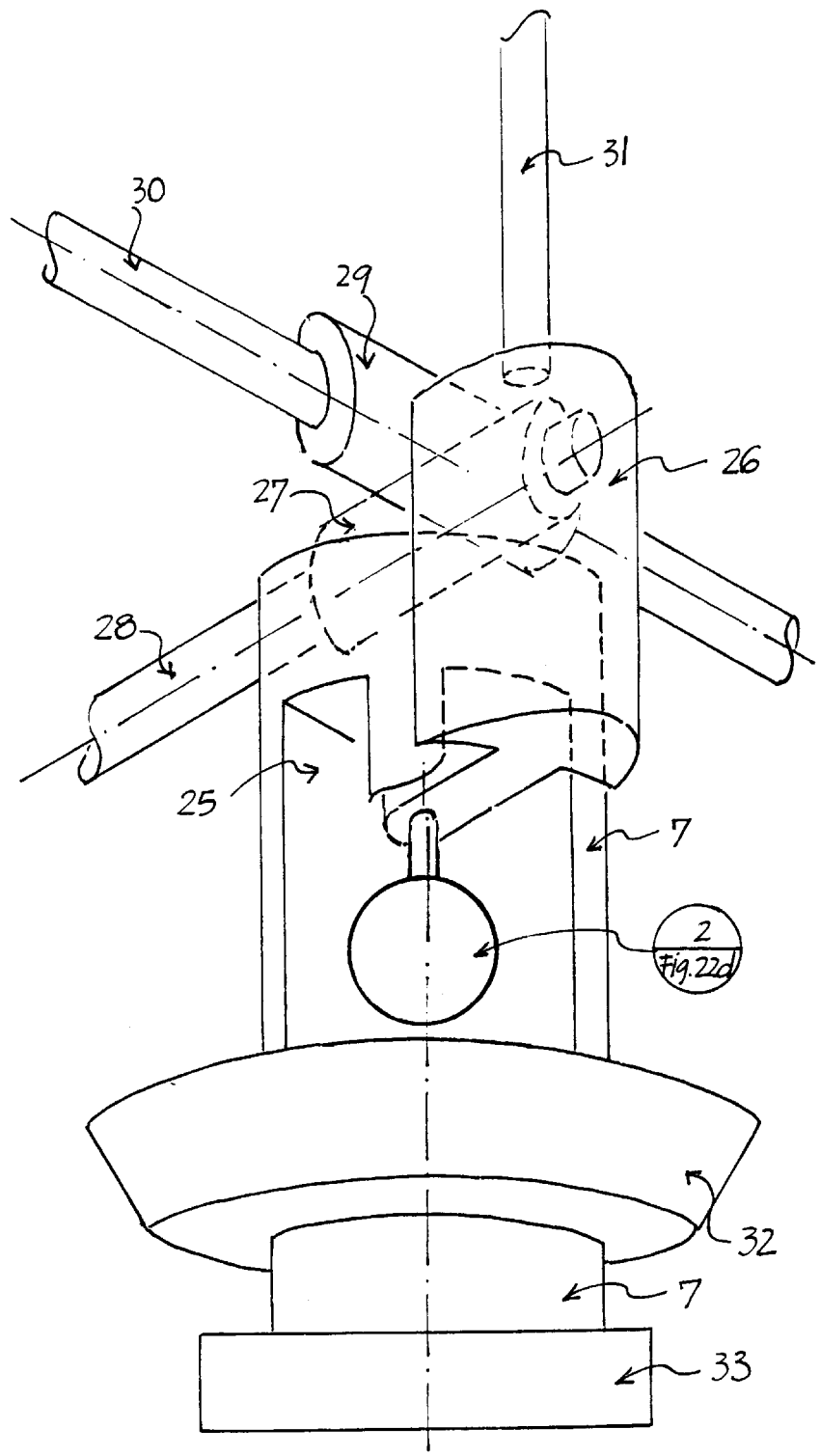
FIG. 22f is a 3D detail of the inferior shaft with the head of the arm A in action.
Figure 22G:
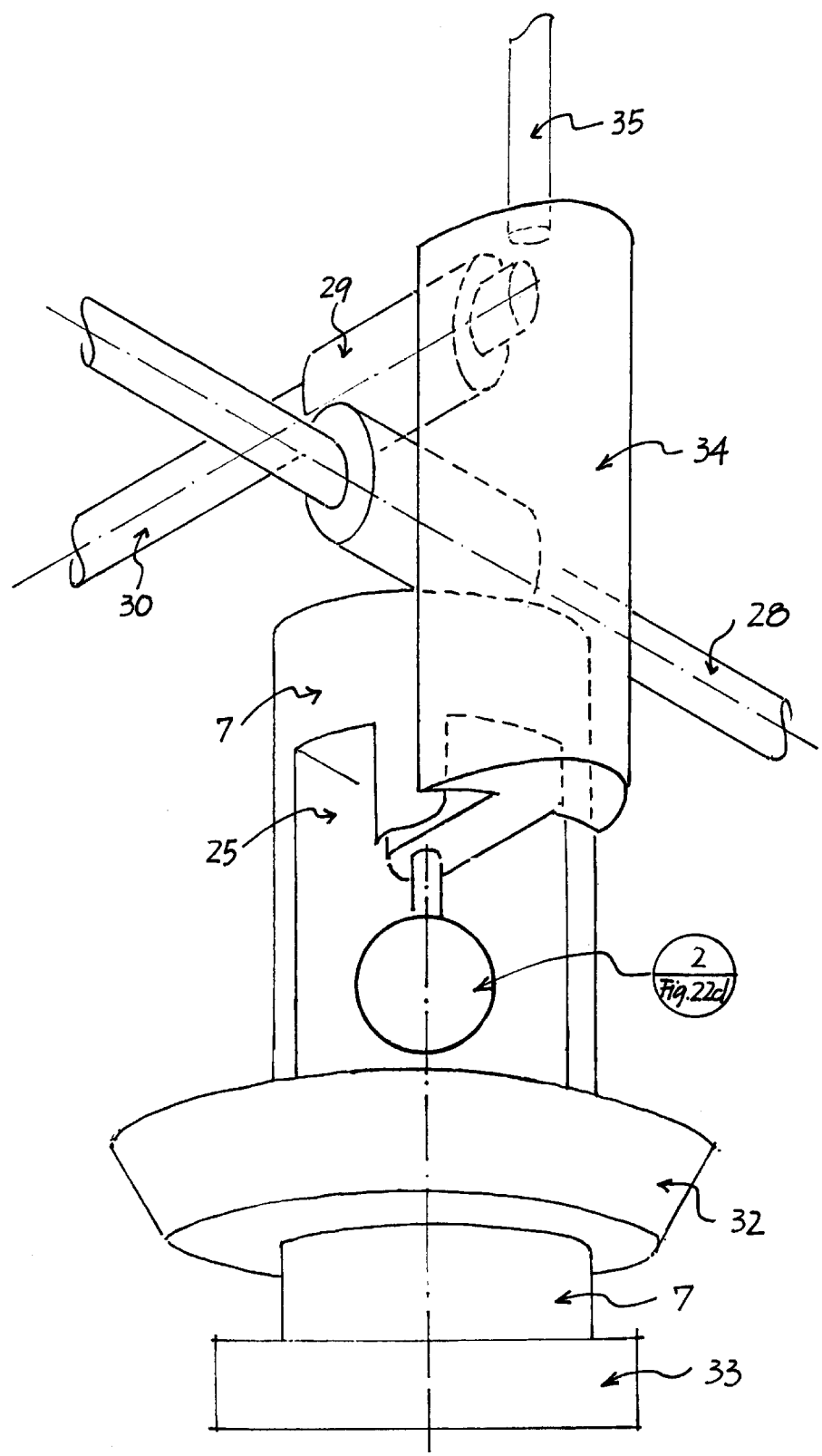
FIG. 22g is a 3D detail of the inferior shaft with the head of the arm B in action
Figure 22H:
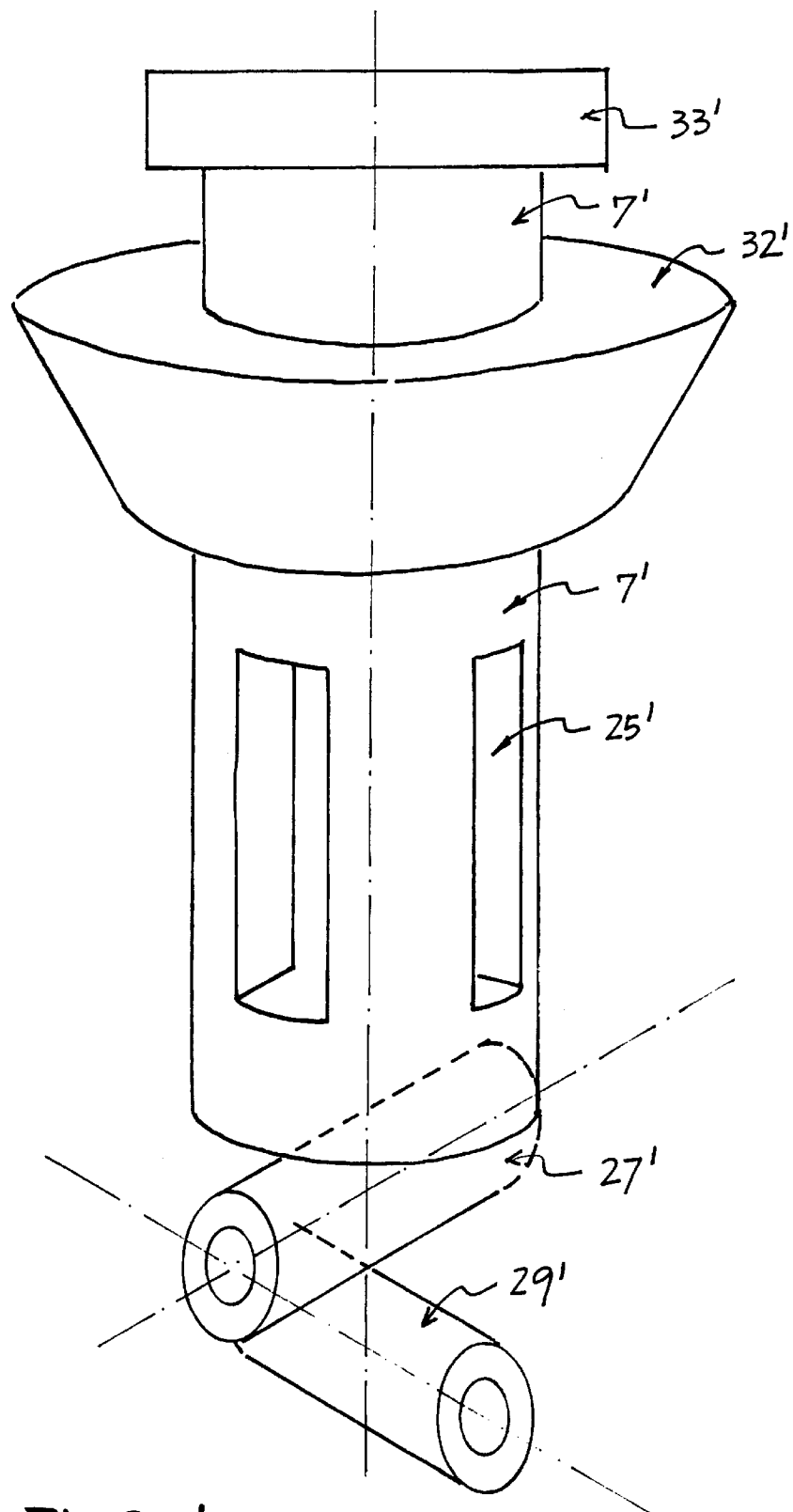
FIG. 22h is a 3D representation of the opening of the superior shaft for the system double two sails crosswise.
Figure 22I:
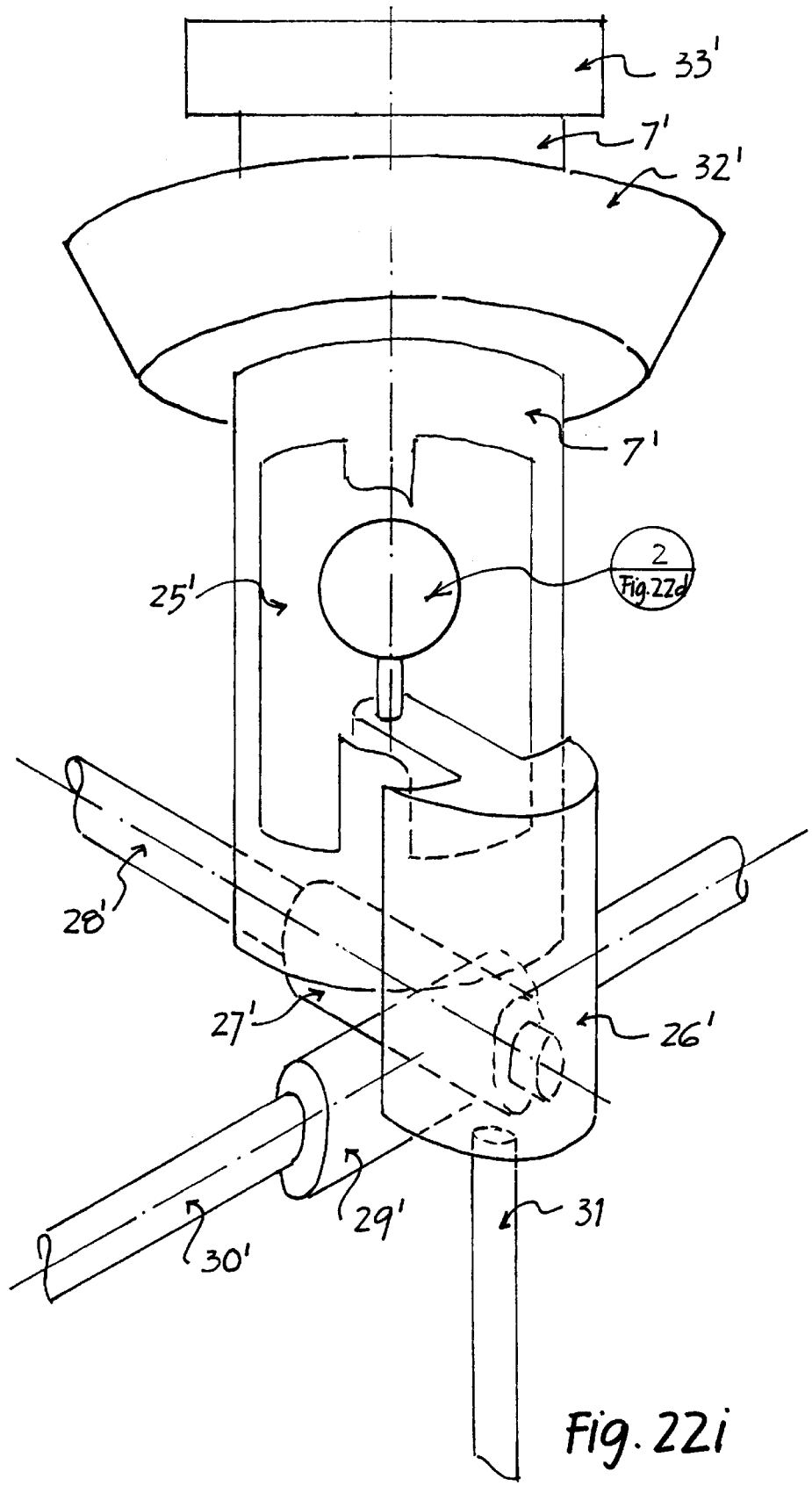
FIG. 22i is a 3D detail of the superior shaft with the head of the arm A in action.
Figure 22J:
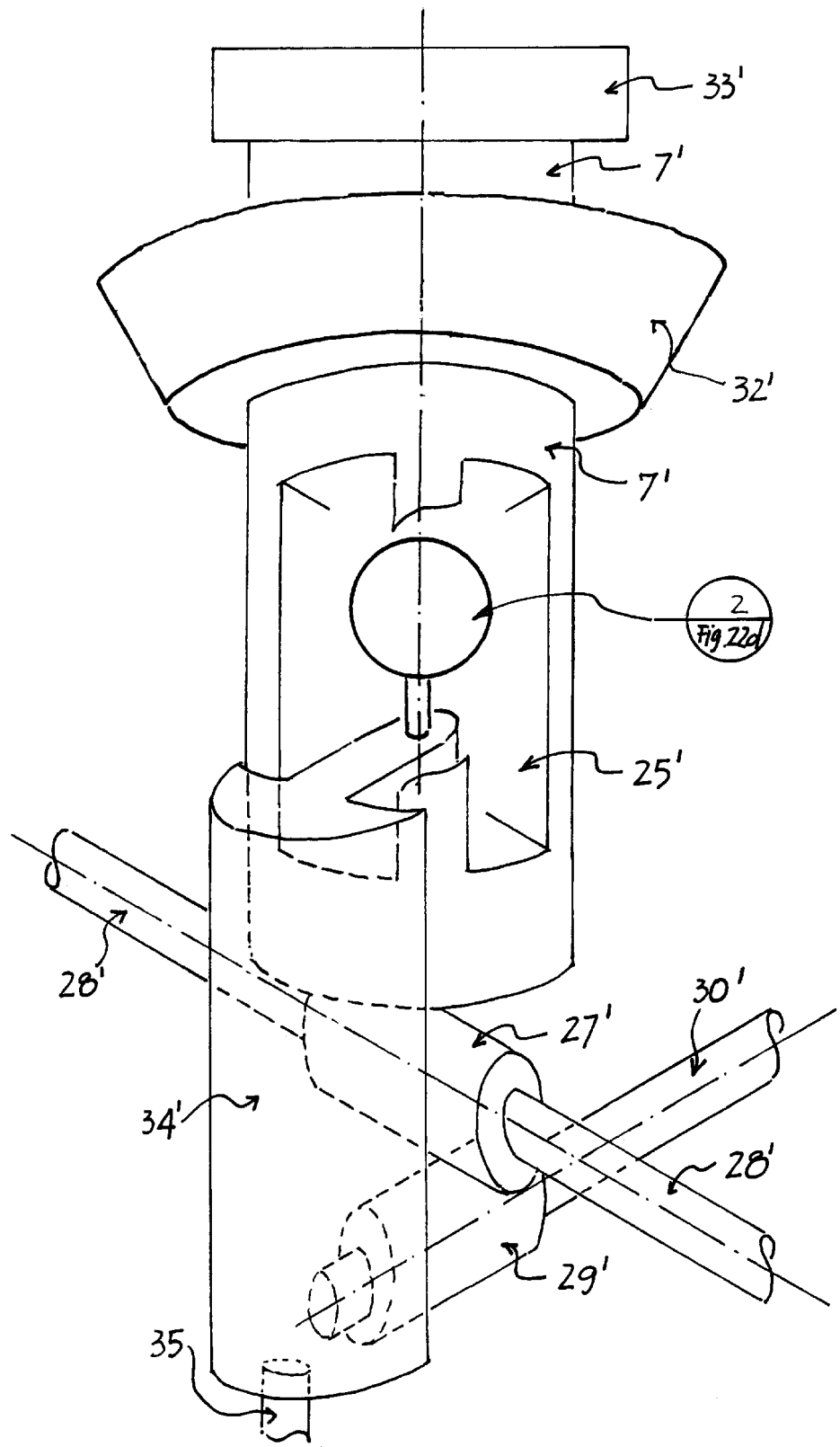
FIG. 22j is a 3D detail of the superior shaft with the head of the arm B in action.
Figure 22K:
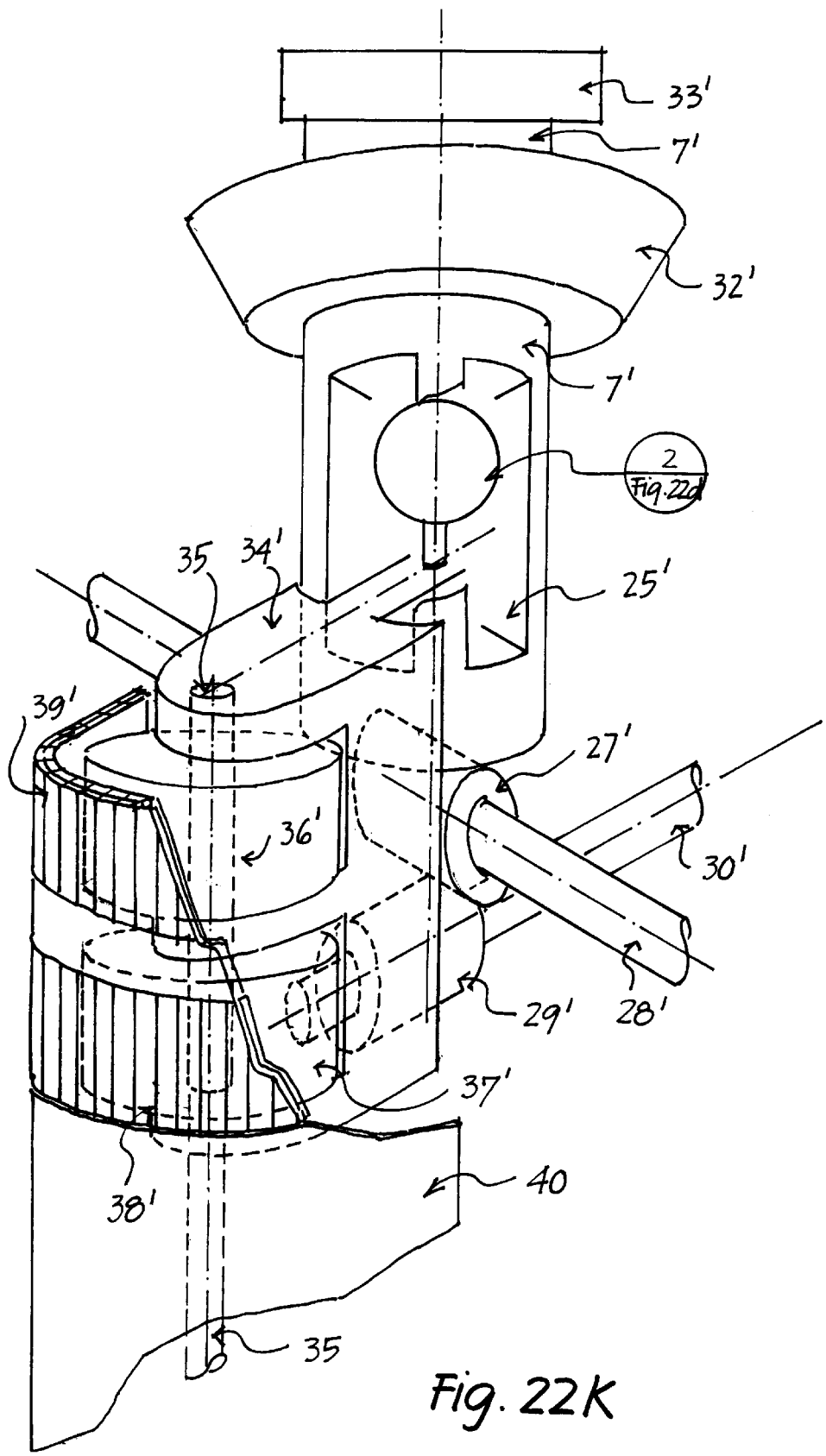
FIG. 22k is a 3D detail of the end of the superior arm B.
Figure 22L:
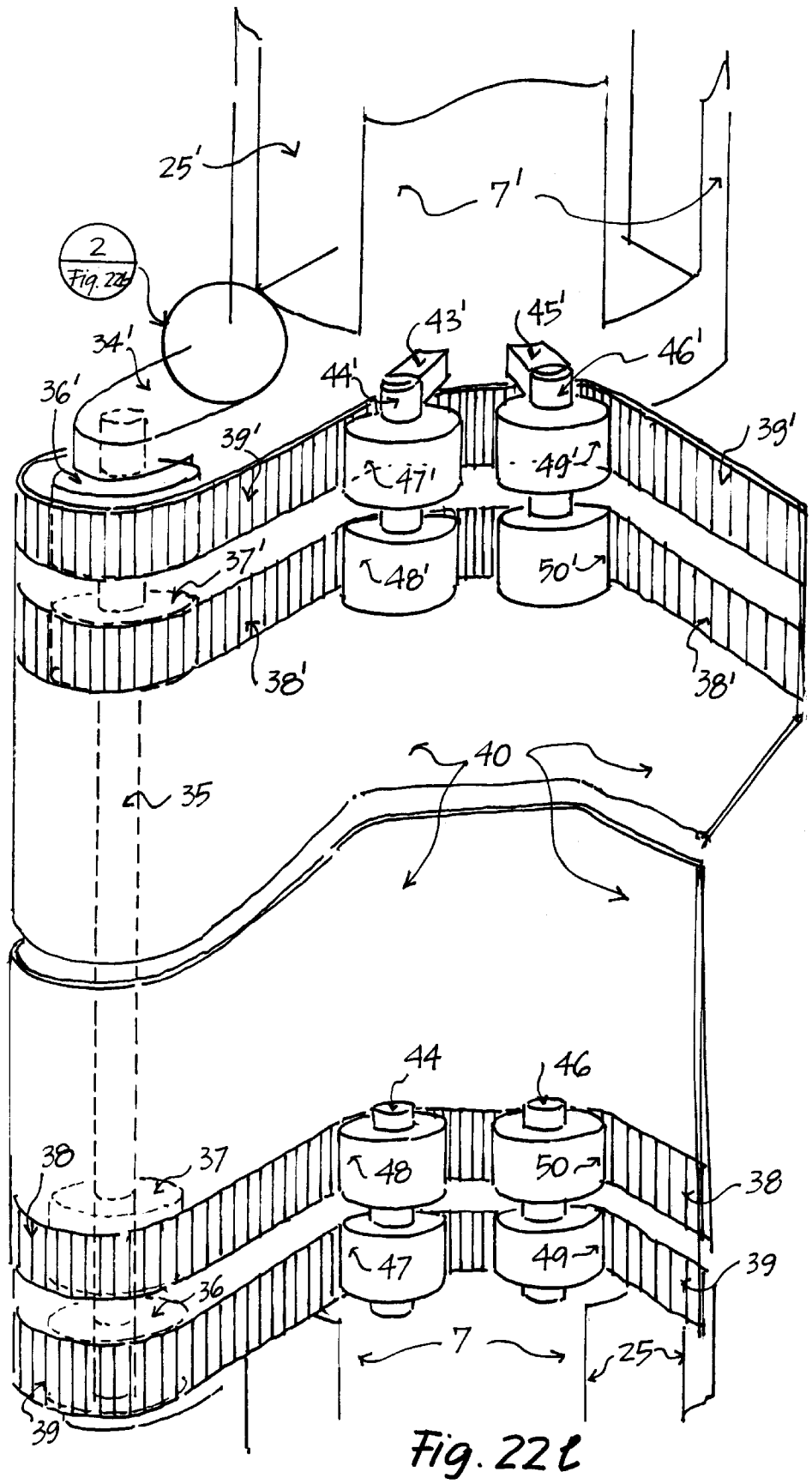
FIG. 22l is a 3D detail of the joint between the arm A and the arm B.
Figure 22M:
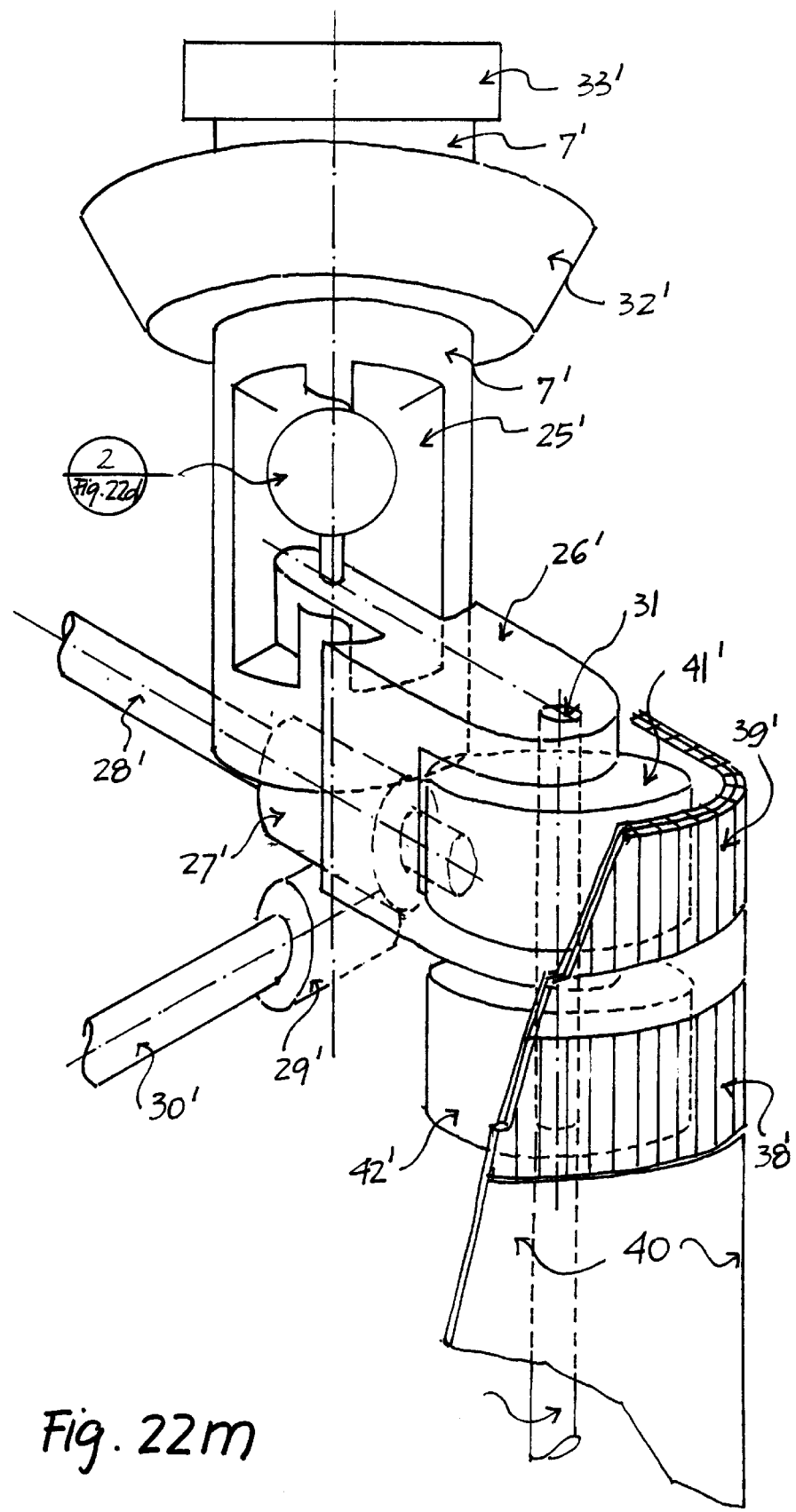
FIG. 22m is a 3D detail of the end of the superior arm A.
Figure 23:
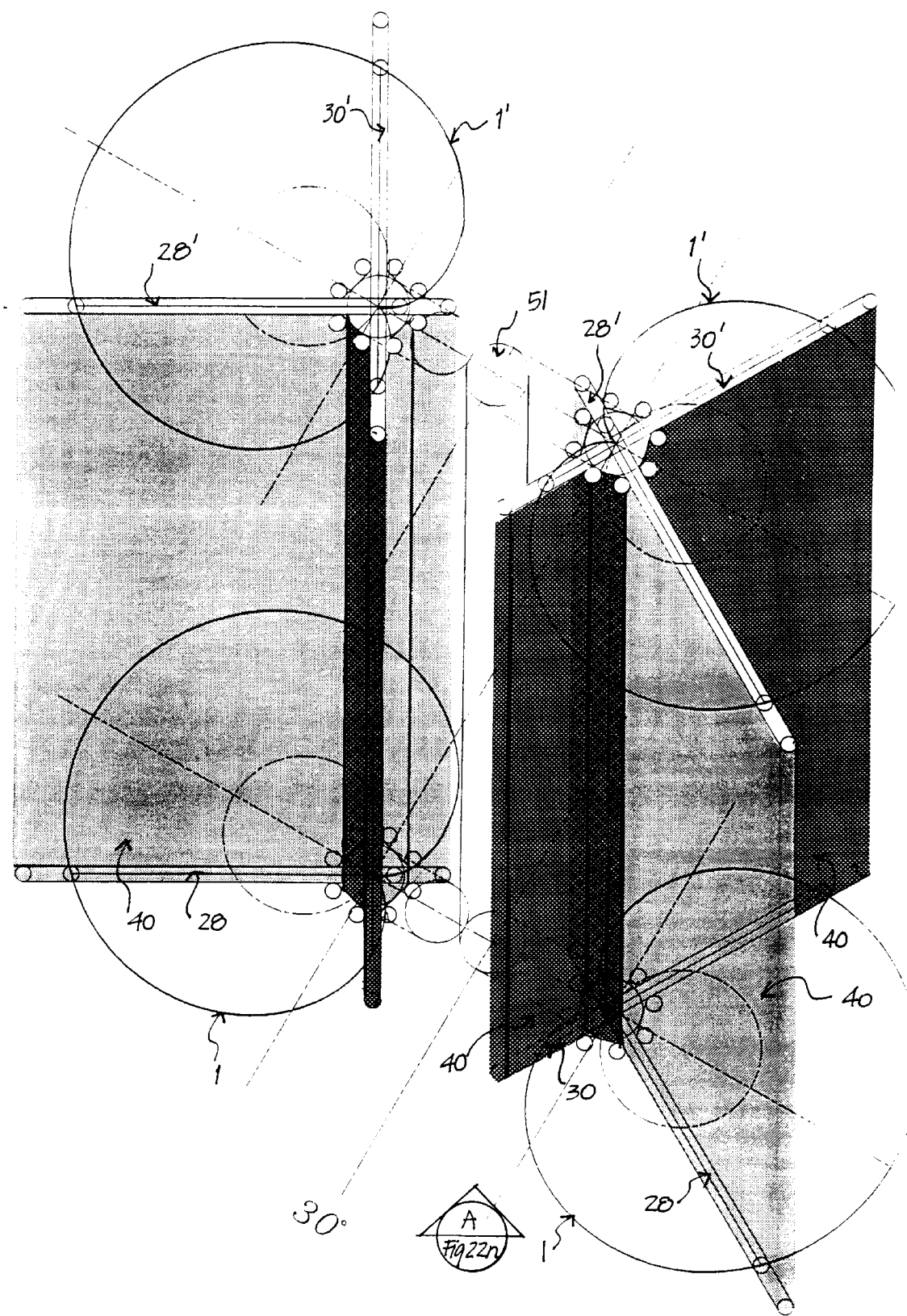
FIG. 23 is an ensemble view of the system double two sails Crosswise (C1 and C2).
Figure 24:
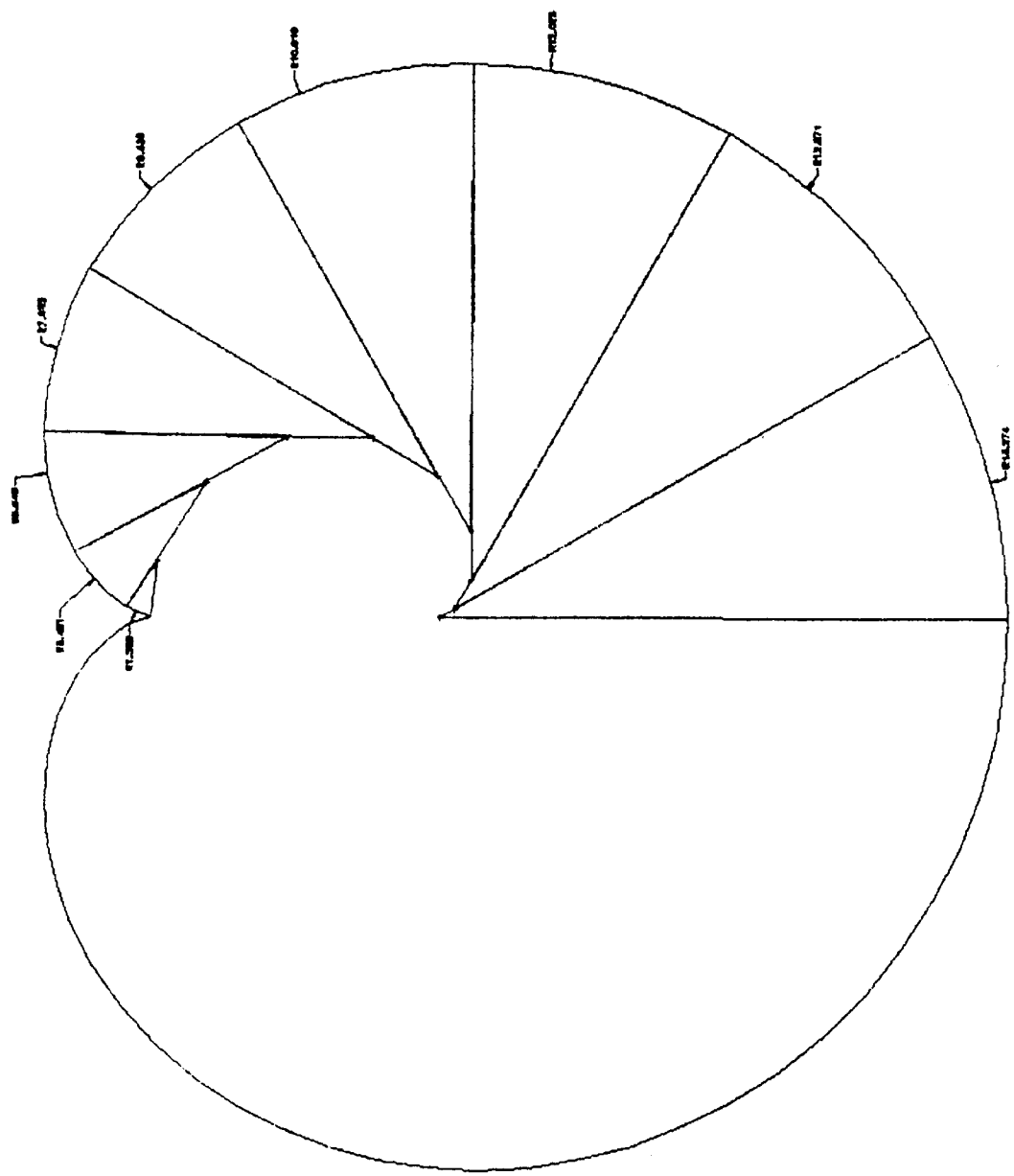
FIG. 24 is a representation of the Evolute.
Figure 25:
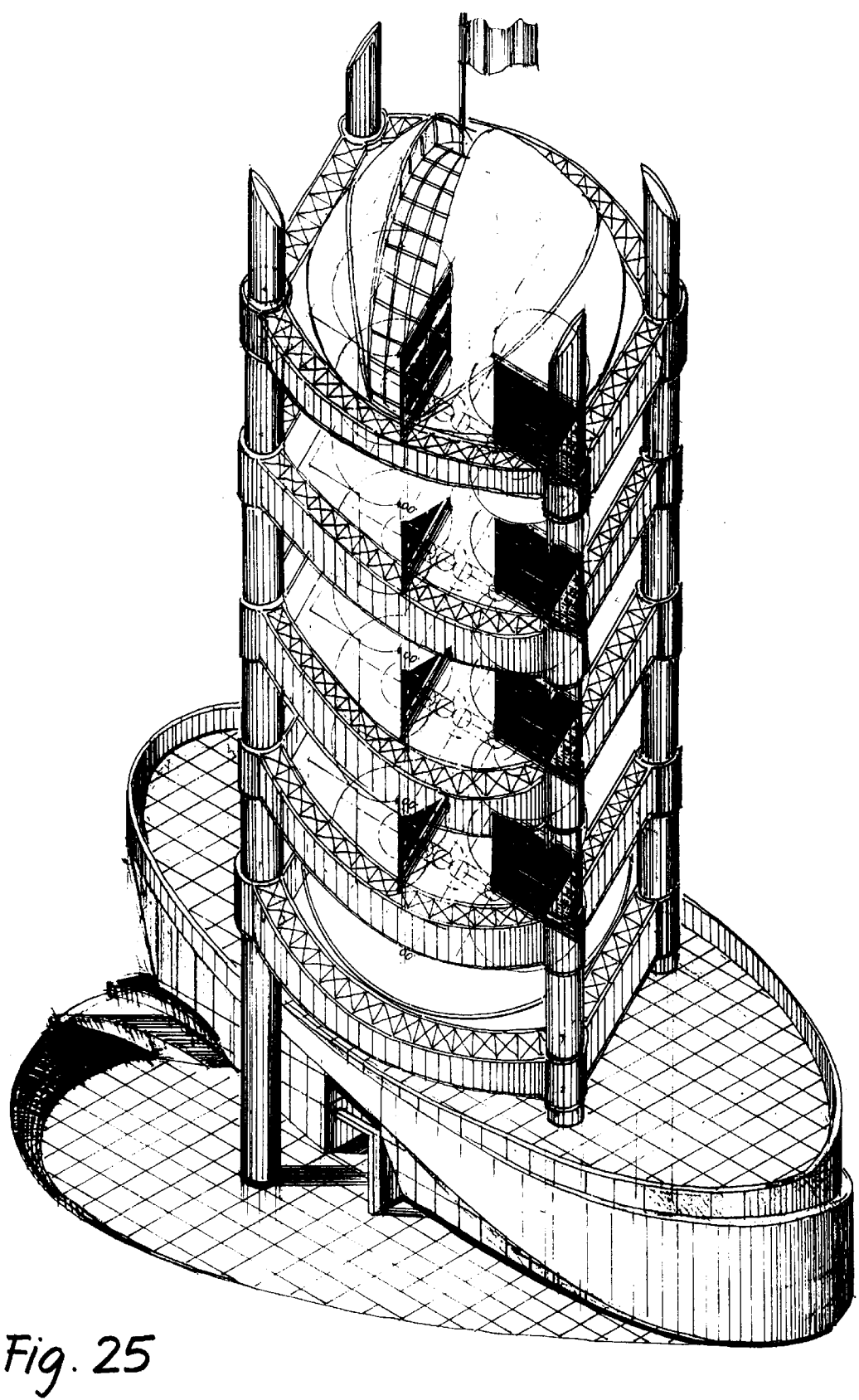
FIG. 25 is an architectural design module, option.
Figure 26:
FIG. 26 is an ensemble view of the architectural design modules, option.
Figure 27:
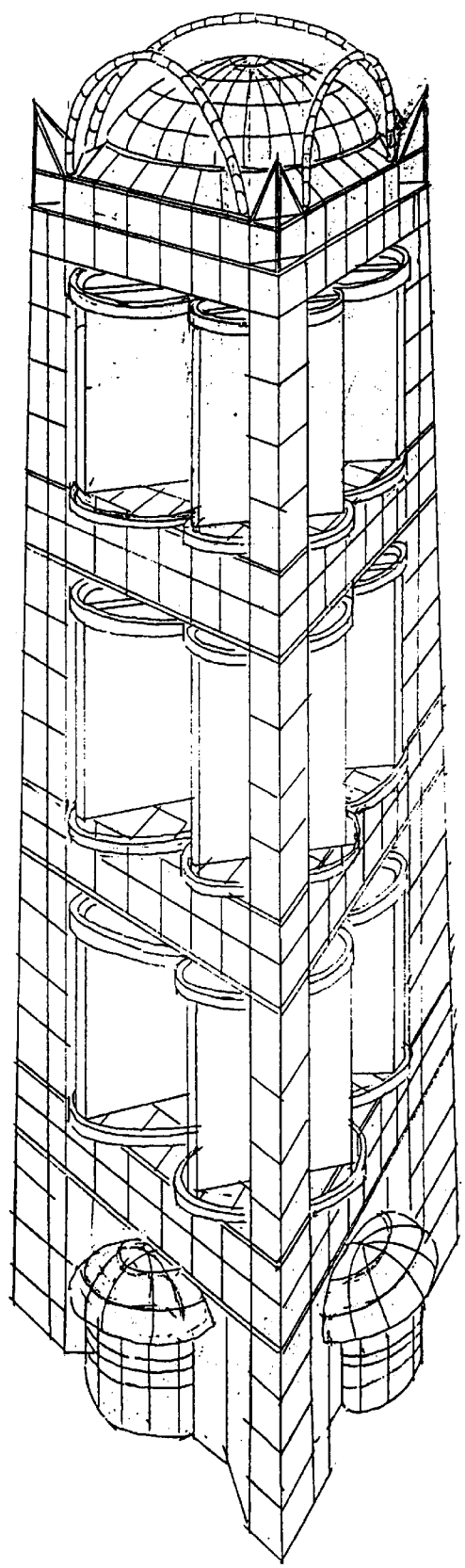
FIG. 27 is a architectural design module, option.
Figure 28:
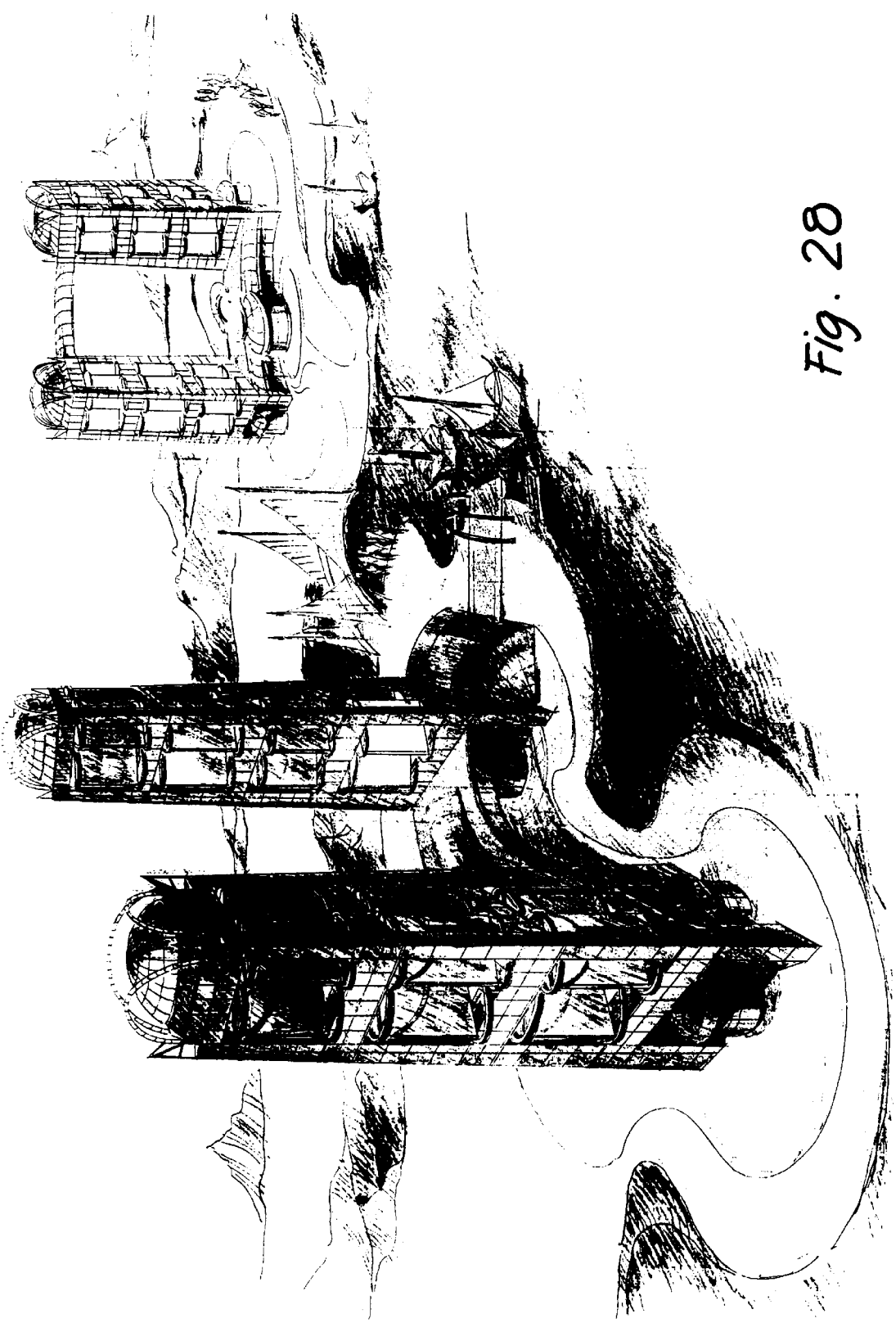
FIG. 28 is an ensemble view of the architectural design modules, option.

An alternative wind energy conversion system comprised of double two-sails, two perpendicular sliding frames, with each frame having parallel inferior arm and superior arm, two joints perpendicular to the arms, a wheel at each end of at least one of said arms is illustrated in FIG. 22a through FIG. 23a. The details of operation will not be explained since the principles of operation are similar to the first embodiment. A complete cycle illustrating the combined rotation and linear movements of the sail's vertical surfaces can be found in FIGS. 18a–18j. The graphic variations of the cardioid radius active and reactive zones are illustrated in FIGS. 19 and 20.

From the foregoing, while there has been described the preferred embodiments of the system, various modifications can be made such as combining the system with solar or fluid energy conversion systems without departing from the spirit and scope of the invention. The system as described reacts to a wind force, constrained to travel along a cardioid path and transfers and converts forces into useful energy via belts and sliding mechanisms.

We claim:

1. A wind energy conversion device having at least one system which comprises;
    a sail, reacting to the wind force, and having an inferior arm and superior arm and a wheel at each end at least one said arms;
    said wheels are constrained to move by at least one cardioid shaped rail guide;
    a principal shaft, situated at the cusp of said cardioid shaped rail guide, is coupled to an electric generator;
    at least one of said arms slides perpendicularly to the axis of rotation the principal shaft to transmit the cardioid movement of the sail into a rotational movement of the principal shaft.

2. The device of claim 1, where both arms have a wheel at each end, and both pair of wheels of each respective arms are constrained by respective parallel cardioid shaped rail guides.

3. The device of claim 1 or 2, where the principal shaft of two conversion systems are coupled to a common electric generator.

4. The device of claim 3, where the sail of the first system is perpendicular to the sail of the other system when one of said sail has one wheel at the cusp and the other wheel at the vertex of the cardioid shaped rail guide.

5. A wind energy conversion device having at least one system which comprises;
    Two perpendicular sliding frames, each frame having parallel inferior arm and superior arm, two joints perpendicular to these arms, and a wheel at each end of at least one of said arms;
    One piece of material which cover entirely both frames;
    Said wheel are constrained to move by at least one cardioid shaped rail guide;
    A principal shaft, situated at the cusp of said cardioid shaped rail guide, is coupled to an electric generator;
    At least one of said arms slides perpendicularly to the axis of rotation of the principal shaft to transmit the cardioid movement of the sail into a rotational movement of the principal shaft.

6. The device of claim 5, where all the inferior arms have a wheel at each end, the wheels of said inferior arms are all constrained by a first cardioid shaped rail guide, and where the superior arms have a wheel at each end, the wheel of said superior arms are all constrained by a second cardioid shaped rail guide parallel to the first cardioid shaped rail guide.

7. The device of claim 5 or claim 6, where the principal shaft of two conversion systems are coupled to a common electric generator.

8. The device of claim 7, where the frames of the fast system are perpendicular to the frames of the other system when one frame of each system has one wheel at the cusp and the other wheel at the vertex of each of the cardioid shaped rail guide.

9. The device of claim 5, 6 or 7, where the joints have roll to freely support the piece of material and free rolls support the piece of material; at the junction of the frames.

10. The device of any of the preceding claims, where several systems are grouped in a tower according to the wind pattern of a region and having solar panels covering the space between each system.

* * * * *